United States Patent
Shinchi et al.

(10) Patent No.: US 7,224,491 B2
(45) Date of Patent: May 29, 2007

(54) DATA COMMUNICATION APPARATUS, DATA COMMUNICATION SYSTEM, DATA COMMUNICATION METHOD, CONTROL PROGRAM, AND COMPUTER READABLE STORAGE MEDIUM STORED WITH CONTROL PROGRAM

(75) Inventors: Toshimi Shinchi, Osaka (JP); Junichi Nishiyama, Osaka (JP)

(73) Assignee: Minolta Co., Ltd., Osaka (JP)

( * ) Notice: Subject to any disclaimer, the term of this patent is extended or adjusted under 35 U.S.C. 154(b) by 998 days.

(21) Appl. No.: 10/105,520

(22) Filed: Mar. 26, 2002

(65) Prior Publication Data

US 2002/0140989 A1 Oct. 3, 2002

(30) Foreign Application Priority Data

Mar. 28, 2001 (JP) ............................. 2001-093959
Mar. 30, 2001 (JP) ............................. 2001-102240

(51) Int. Cl.
*H04N 1/00* (2006.01)
(52) U.S. Cl. ................. 358/400; 379/100.01; 358/1.15
(58) Field of Classification Search .......... 379/100.01, 379/100.06, 100.09; 358/400, 1.15, 1.16, 358/443, 407, 401
See application file for complete search history.

(56) References Cited

U.S. PATENT DOCUMENTS

| 6,105,060 A * | 8/2000 | Rothblatt ..................... 709/219 |
| 6,374,291 B1 * | 4/2002 | Ishibashi et al. ............ 709/206 |
| 6,717,688 B1 * | 4/2004 | Ogawa ....................... 358/1.15 |
| 6,868,502 B2 * | 3/2005 | Wei et al. .................... 713/340 |
| 2003/0123100 A1 * | 7/2003 | Tanimoto ..................... 358/402 |

FOREIGN PATENT DOCUMENTS

| JP | 6-216935 | 8/1994 |
| JP | 11-46292 | 2/1999 |
| JP | 11-55486 | 2/1999 |
| JP | 11-134263 | 5/1999 |
| JP | 11-298629 A | 10/1999 |
| JP | 2000-125056 | 4/2000 |
| JP | 2000-134399 | 5/2000 |
| JP | 2000-307794 | 11/2000 |

(Continued)

OTHER PUBLICATIONS

Office Action issued on Aug. 19, 2004, for Japanese Patent Application No. 2001-102240 filed on Mar. 30, 2001, 5 pages (including English translation).

(Continued)

*Primary Examiner*—Jerome Grant, II
(74) *Attorney, Agent, or Firm*—Morrison & Foerster LLP

(57) ABSTRACT

A data transmission apparatus including a multicasting means for executing multicasting transmission for a mixture of e-mails and facsimiles, a destination setting means for setting destinations of the multicasting transmission, a first adding means for, based on e-mail destinations set by the destination setting means, generating image data representing the e-mail destinations, and adding the image data to an image data to be transmitted as a facsimile by the multicasting transmission, and a second adding means for, based on facsimile destinations set by the destination setting means, generating character string data representing the facsimile destinations and adding the character string data to an e-mail to be transmitted by the multicasting transmission.

61 Claims, 52 Drawing Sheets

FOREIGN PATENT DOCUMENTS

| | | | |
|---|---|---|---|
| JP | 2001-117832 | | 4/2001 |
| JP | 2001333246 | * | 11/2001 |
| JP | 2002-183063 | | 6/2002 |
| JP | 2003-8820 | * | 1/2003 |
| JP | 2003244381 | * | 8/2003 |
| JP | 2003333270 | * | 11/2003 |
| WO | WO-00/45574 A1 | | 8/2000 |

OTHER PUBLICATIONS

Office Action issued on Dec. 12, 2005, for Japanese Patent Application No. 2001-102240 filed on Mar. 30, 2001, 5 pages (including English translation).

* cited by examiner

FIG. 8A

```
From : xx-xxxx-xxxx
To   :
        [mail] xxxx@xxxx.xx.xx
        [FAX]  xx-xxxx-xxxx
Cc   :
        [mail] xxxx@xxxx.xx.xx
        [FAX]  xx-xxxx-xxxx
```

FIG. 8B

```
From : xx-xxxx-xxxx
To   :
        [mail] xxxx@xxxx.xx.xx
        [FAX]  xx-xxxx-xxxx
Cc   :
        [mail] xxxx@xxxx.xx.xx
        [FAX]  xx-xxxx-xxxx
Bcc  :
        [FAX]  xx-xxxx-xxxx
```

FIG. 9A

```
From : xxxx@xxxx.xx.xx
Cc   : xxxx@xxxx.xx.xx
Bcc  :

FAX DESTINATIONS
To  : xx-xxxx-xxxx
Cc  : xx-xxxx-xxxx (BODY)
. . . . . . . . . . . . . . .
. . . . . . . . . . . . . . .
```

FIG. 9B

```
From : xxxx@xxxx.xx.xx
Cc   : xxxx@xxxx.xx.xx
Bcc  : xxxx@xxxx.xx.xx

FAX DESTINATIONS
To  : xx-xxxx-xxxx
Cc  : xx-xxxx-xxxx (BODY)
. . . . . . . . . . . . . . .
. . . . . . . . . . . . . . .
```

| FIG. 22A |
| FIG. 22B |

```
CONTROL CODE: 123

TITLE: RE: MEETING

FROM
     mfp@xxx.co.jp/tel 06.1234.5678/IP ADDRESS 200.200.200.
E-MAIL SENDER:     A@xxx.co.jp          COLOR 300 DPI    /123/01/
E-MAIL To:         B@xxx.co.jp          COLOR 300 DPI    /123/02/
E-MAIL Cc:         C@xxx.co.jp          COLOR 300 DPI    /123/03/
E-MAIL Bcc:        D@xxx.co.jp          COLOR 300 DPI    /123/04/
NORMAL FACSIMILE:  E tel 03- 1234-5678  MONOCHROME 200 DPI  /123/05/
CONFIDENTIAL PRINT: F IP ADDRESS 100.100.100.100  COLOR 600 DPI  /123/06/
FILE TRANSFER:     G ftp//300.300.300.300/123/07/XXX.TIF COLOR 600 DPI  /123/07/
```

FIG. 27

E-MAIL FOR E-MAIL To DESTINATION (ADDRESSED TO B)

To: B@xxx.co.jp
Cc: C@xxx.co.jp
From: mfp@xxx.co.jp
TITLE: RE: MEETING

SENDER: A@xxx.co.jp

BEING TRANSMITTED FROM MFP.

CONTROL CODE: 123

OTHER DESTINATIONS:

NORMAL FACSIMILE E 03-1234-5678

PLEASE ACCESS THE FOLLOWING FOR MULTICASTING RESPONSE
htt://100.100.100.100/123/02/

ATTACHED FILE

FIG. 28

E-MAIL FOR E-MAIL Bcc DESTINATION (ADDRESSED TO D)

---

To: B@xxx.co.jp
Cc: C@xxx.co.jp
Bcc: D@xxx.co.jp
From: mfp@xxx.co.jp
TITLE: RE: MEETING

---

SENDER: A@xxx.co.jp

BEING TRANSMITTED FROM MFP.

CONTROL CODE: 123

OTHER DESTINATIONS:

NORMAL FACSIMILE E 03-1234-5678

PLEASE ACCESS THE FOLLOWING FOR MULTICASTING RESPONSE
htt://100.100.100.100/123/04/

ATTACHED FILE

FIG. 31

FRONT-PAGE OF NORMAL FACSIMILE (ADDRESSED TO E)

TRANSMISSION DESTINATION: 03-1234-5678 SOURCE: 06-1234-5678

TRANSMITTED FROM MFP.

CONTROL CODE: 123

SENDER: A@xxx.co.jp

OTHER DESTINATIONS:

E-MAIL To: B@xxx.co.jp
E-MAIL Cc: C@xxx.co.jp

PLEASE ACCESS THE FOLLOWING FOR MULTICASTING RESPONSE.
http://100.100.100.100/123/05/

PAGE 2

IMAGE DATA

FIG. 32

FRONT-PAGE OF CONFIDENTIAL PRINTING (ADDRESSED TO F)

TRANSMISSION DESTINATION: 400.400.400.400 SOURCE: 200.200.200.200

BEING TRANSMITTED FROM MFP.

CONTROL CODE: 123

SENDER: A@xxx.co.jp

OTHER DESTINATIONS:

E-MAIL To:   B@xxx.co.jp
E-MAIL Cc:   C@xxx.co.jp
NORMAL FACSIMILE E 03-1234-5678

PLEASE ACCESS THE FOLLOWING FOR MULTICASTING RESPONSE.
http://100.100.100.100/123/06/

PAGE 2

IMAGE DATA

FIG. 34

FILE TRANSFER NOTIFICATION E-MAIL (ADDRESSED TO G, A Bcc DESTINATION)

Bcc:G@xxx.co.jp
From: mfp@xxx.co.jp
TITLE: RE: MEETING

SENDER: A@xxx.co.jp

THIS IS TO NOTIFY THAT AN IMAGE DATA WAS TRANSMITTED FROM MFP TO THE SERVER.
ftp://300.300.300.300/123/07/xxx.tif

CONTROL CODE: 123

OTHER DESTINATIONS:

E-MAIL To:  B@xxx.co.jp
E-MAIL Cc:  C@xxx.co.jp
NORMAL FACSIMILE E 03-1234-5678

PLEASE ACCESS THE FOLLOWING FOR MULTICASTING RESPONSE
htt://100.100.100.100/123/07/

| FIG. 35A |
|---|
| FIG. 35B |

FIG. 44

E-MAIL ATTACHED WITH A RESPONSE DATA AS AN IMAGE FILE

To: A@xxx.co.jp
Cc: C@xxx.co.jp
From: mfp@xxx.co.jp
TITLE: RE: MEETING

SENDER: B@xxx.co.jp

TRANSMITTED FROM MFP.

CONTROL CODE: 123

OTHER DESTINATIONS:

NORMAL FACSIMILE  E  03-1234-5678

PLEASE ACCESS THE FOLLOWING FOR MULTICASTING RESPONSE
htt://100.100.100.100/123-1/02/

ATTACHED FILE

| FIG. 46A |
| FIG. 46B |

FIG. 48

E-MAIL FOR E-MAIL To DESTINATION (ADDRESSED TO B)

---

To:B@xxx.co.jp
Cc:C@xxx.co.jp
From: mfp@xxx.co.jp
TITLE: RE: MEETING

---

SENDER: A@xxx.co.jp

TRANSMITTED FROM MFP.

OTHER DESTINATIONS:
NORMAL FACSIMILE E 03-1234-5678

THIS CAN BE MULTICASTED BY TRANSMITTING THE PORTION BELOW THE DOTTED LINE TO MFP. IF IT IS DELETED, THIS WILL NOT BE TRANSMITTED AS A RESPONSE. ALSO, NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) NORMAL FACSIMILE: 102.102.102.102, A, 300, COLOR

------------ CONTROL CODE 123 ------------

To: A@xxx.co.jp, A4, 300, COLOR
Cc: C@xxx.co.jp, A4, 300, COLOR
NORMAL FACSIMILE: 0312345678, A4, 200, MONOCHROME

[ATTACHED FILE]

FIG. 49

E-MAIL FOR E-MAIL Cc DESTINATION (ADDRESSED TO C)

To:B@xxx.co.jp
Cc:C@xxx.co.jp
From: mfp@xxx.co.jp
TITLE: RE: MEETING

SENDER: A@xxx.co.jp

TRANSMITTED FROM MFP.

OTHER DESTINATIONS:
NORMAL FACSIMILE E 03-1234-5678

THIS CAN BE MULTICASTED BY TRANSMITTING THE PORTION BELOW THE DOTTED LINE TO MFP. IF IT IS DELETED, THIS WILL NOT BE TRANSMITTED AS A RESPONSE. ALSO, NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) NORMAL FACSIMILE: 102.102.102.102, A, 300, COLOR

------------ CONTROL CODE 123 --------------------

To: A@xxx.co.jp, A4, 300, COLOR
Cc: B@xxx.co.jp, A4, 300, COLOR
NORMAL FACSIMILE: 0312345678, A4, 200, MONOCHROME

ATTACHED FILE

FIG. 50

E-MAIL FOR E-MAIL Bcc DESTINATION (ADDRESSED TO D)

To:B@xxx.co.jp
Cc:C@xxx.co.jp
Bcc: D@xxx.co.jp
From: mfp@xxx.co.jp
TITLE: RE: MEETING SENDER: A@xxx.co.jp

TRANSMITTED FROM MFP.

OTHER DESTINATIONS:
NORMAL FACSIMILE E 03-1234-5678

THIS CAN BE MULTICASTED BY TRANSMITTING THE PORTION BELOW
THE DOTTED LINE TO MFP. IF IT IS DELETED, THIS WILL NOT BE
TRANSMITTED AS A RESPONSE. ALSO, NEW RESPONSE DESTINATIONS
CAN BE ADDED. FOR ADDING, WRITE IN THE ORDER OF ATTRIBUTE OF
DESTINATION, DESTINATION, SIZE, RESOLUTION, AND COLOR/MONOCHROME.

(EXAMPLE) NORMAL FACSIMILE: 102.102.102.102, A, 300, COLOR

-------------- CONTROL CODE 123 --------------

To: A@xxx.co.jp, A4, 300, COLOR

ATTACHED FILE

FIG. 52

FRONT-PAGE OF NORMAL FACSIMILE (ADDRESSED TO E)

CONTROL CODE 123

THE RESPONSE DATA CAN BE MULTICASTED TO THE MARKED DESTINATIONS BY TRANSMITTING IT BY FACSIMILE TO MFP (06-1234-5678) USING THIS SHEET AS THE FRONT-PAGE.

☐ PLEASE CHECK THE MARK AREA BELOW.

☐ To: A@xxx.co.jp, A4, 300, COLOR
☐ Cc: B@xxx.co.jp, A4, 300, COLOR
☐ Cc: C@xxx.co.jp, A4, 300, COLOR NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) Cc: P@xxx.co.jp, A4, 300, COLOR

☐ : , , ,
☐ : , , ,
☐ : , , ,

PAGE 2

TRANSMISSION DESTINATION: 03-1234-5678　TRANSMISSION SOURCE: 06-1234-5678
SENDER: A@xxx.co.jp

IMAGE DATA

FIG. 53

FRONT-PAGE OF CONFIDENTIAL PRINT (ADDRESSED TO F)

CONTROL CODE 123

THE RESPONSE DATA CAN BE MULTICASTED TO THE MARKED DESTINATIONS BY TRANSMITTING IT BY FACSIMILE TO MFP (06-1234-5678) USING THIS SHEET AS THE FRONT-PAGE.

☐ PLEASE CHECK THE MARK AREA BELOW.

☐ To: A@xxx.co.jp, A4, 300, COLOR
☐
☐

NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) Cc: P@xxx.co.jp, A4, 300, COLOR

☐ : , , ,
☐ : , , ,
☐ : , , ,

PAGE 2

TRANSMISSION DESTINATION: 400.400.400.400  TRANSMISSION SOURCE: 200.200.200.200
TRANSMITTED FROM MFP. SENDER:A@xxx.co.jp

IMAGE DATA

FIG. 55

E-MAIL ADVISING RESPONSE DATA, RESPONSE DESTINATION INSTRUCTION, AND PROPERTY INSTRUCTION FROM E-MAIL To DESTINATION (B)

To:mfp@xxx.co.jp
From:B@xxx.co.jp
TITLE: RE: MEETING

-------- CONTROL CODE 123 --------

To: A@xxx.co.jp, A4, 300, COLOR
Cc: C@xxx.co.jp, A4, 300, COLOR
NORMAL FACSIMILE: 0312345678, A4, 200, MONOCHROME

ATTACHED FILE

FIG. 56

FACSIMILE DATA ADVISING RESPONSE DATA, RESPONSE DESTINATION INSTRUCTION, AND PROPERTY INSTRUCTION FROM FACSIMILE DATA DESTINATION

CONTROL CODE 123

THE RESPONSE DATA CAN BE MULTICASTED TO THE MARKED DESTINATIONS BY TRANSMITTING IT BY FACSIMILE TO MFP (06-1234-5678) USING THIS SHEET AS THE FRONT-PAGE.

☐ PLEASE CHECK THE MARK AREA BELOW.

☑ To: A@xxx.co.jp, A4, 300, COLOR
☐ Cc: B@xxx.co.jp, A4, 300, COLOR
☐ Cc: C@xxx.co.jp, A4, 300, COLOR NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) Cc: P@xxx.co.jp, A4, 300, COLOR

☐ Cc: C@xxx.co.jp, A4, 400, MONOCHROME
☐ : , , ,
☐ : , , ,

PAGE 2

IMAGE DATA

FIG. 57

E-MAIL ATTACHED WITH RESPONSE DATA AS AN IMAGE FILE

To:A@xxx.co.jp
Cc:C@xxx.co.jp
From: mfp@xxx.co.jp
TITLE: RE: MEETING

SENDER: B@xxx.co.jp

BEING TRANSMITTED FROM MFP.

OTHER DESTINATIONS:
NORMAL FACSIMILE E 03-1234-5678

THIS CAN BE MULTICASTED BY TRANSMITTING THE PORTION BELOW THE DOTTED LINE TO MFP. IF IT IS DELETED, THIS WILL NOT BE TRANSMITTED AS A RESPONSE. ALSO, NEW RESPONSE DESTINATIONS CAN BE ADDED. FOR ADDING, WRITE IN THE ORDER OF ATTRIBUTE OF DESTINATION, DESTINATION, SIZE, RESOLUTION, AND COLOR/MONOCHROME.

(EXAMPLE) NORMAL FACSIMILE: 102.102.102.102, A, 300, COLOR

------------------ CONTROL CODE 123-1 ------------------

To: B@xxx.co.jp, A4, 300, COLOR
Cc: C@xxx.co.jp, A4, 300, COLOR
NORMAL FACSIMILE: 0312345678, A4, 200, MONOCHROME

ATTACHED FILE

DATA COMMUNICATION APPARATUS, DATA COMMUNICATION SYSTEM, DATA COMMUNICATION METHOD, CONTROL PROGRAM, AND COMPUTER READABLE STORAGE MEDIUM STORED WITH CONTROL PROGRAM

This application is based on Japanese Patent Application No. 2001-93959 filed on Mar. 28, 2001 and Japanese Patent Application No. 2001-102240 filed on Mar. 30, 2001, the contents of which are hereby incorporated by reference.

BACKGROUND OF THE INVENTION

1. Field of the Invention

The invention relates to data communication apparatus, data communication system, data communication method, control program, and computer readable storage medium stored with control program.

2. Description of the Related Art

Various types of facsimile machines, digital copying machines, and image reading devices capable of transmitting image data attached to electronic mail ("e-mail") to desired destinations and also capable of transmitting image data using facsimile protocols to desired destinations have been proposed in recent years.

For example, Japanese Kokai publication of unexamined patent application, H11-55486 discloses a facsimile machine capable of selecting a mixture of facsimile transmission destinations and e-mail transmission destinations as destinations of multicasting transmission.

Since the destinations for multicasting are grouped by transmission protocol in case of the facsimile machine disclosed by the above publication, there is no way for a person who received a multicasted facsimile of finding out other destinations for the same message, or for a person who received a multicasted e-mail of finding out other destinations for the same message in facsimile if a mixture of facsimile and e-mail destinations exists in the destinations of a multicasting transmission.

Therefore, if there is a need for a data recipient to send a response concerning the received data to all the recipients of the same data, the person has to ask the sender of the message if there were any other recipients of the multicasted message and, if there were indeed, ask about the recipients' e-mail addresses and facsimile telephone numbers. Such an inquiry process is cumbersome.

A method of multicasting service has also been known, in which e-mail is sent out to a plurality of addresses simultaneously. Under such a scheme, a multicasted e-mail recipient can send a response by e-mail to other recipients receiving the same multicasted message. For example, Japanese Kokai publication of unexamined patent application, H6-216935 discloses a technology for a multicasted e-mail recipient to transmit a response to other recipients of the same.

Multicasting is also applied to facsimile transmission, in which facsimile data is transmitted to a plurality of recipients simultaneously.

However, in case of the technologies disclosed by those publications, it is difficult for a person who received multicasted data in e-mail to send a response to recipients who received the same data in facsimile, or a person who received multicasted data in facsimile to send a response to recipients who received the same data in e-mail, if the original transmission was done in both facsimile and e-mail.

Such a problem concerning responses to data occurs not only when there is a mixture of facsimile transmission and e-mail transmission, but also when multicasted data is converted into data of a plurality of formats corresponding to different communication systems in general.

For example, multi-functional peripherals (MFP) that have become popular in recent years are used not only to transmit image data obtained by reading documents as facsimile data but also to transmit it by e-mail as attached image file. Consequently, there is the same problem that, when image data is multicasted by MFP, e-mail recipients cannot send response data to facsimile recipients, while facsimile recipients also cannot send response data to e-mail recipients.

SUMMARY OF THE INVENTION

It is an object of the present invention to provide a means of allowing e-mail recipients and facsimile recipients to share common multicasting destination information.

It is another object of the present invention to provide a technology that allows a recipient of a multicasted data, which has been converted into data of a plurality of formats corresponding to different communication systems, to multicast a response to other recipients using other forms of communication systems.

It is another object of the present invention to provide a technology that allows a recipient of multicasted data, which is obtained by reading a document and converted into data of a plurality of formats corresponding to different communication systems, to multicast a response to other recipients who are using other forms of communication systems.

More specifically, it is an object of the present invention to provide a data transmission apparatus including a multicasting means for executing multicasting transmission for a mixture of e-mails and facsimiles, a destination setting means for setting destinations of the multicasting transmission, a first adding means for, based on e-mail destinations set by the destination setting means, generating image data representing the e-mail destinations and adding the image data to an image data to be transmitted as a facsimile by the multicasting transmission, and a second adding means for, based on facsimile destinations set by the destination setting means, generating character string data representing the facsimile destinations and adding the character string data to an e-mail to be transmitted by the multicasting transmission.

A further object of the present invention is to provide a data transmission method including the steps of executing multicasting transmission for a mixture of e-mails and facsimiles, setting destinations of the multicasting transmission, generating, based on e-mail destinations set in the step of setting destinations, image data representing the e-mail destinations and adding the image data to an image data to be transmitted as a facsimile by the multicasting transmission, and generating, based on facsimile destinations set in the step of setting destinations, character string data representing the facsimile destinations and adding the character string data to an e-mail to be transmitted by the multicasting transmission.

Still a further object of the present invention is to provide a data transmission program for causing a computer to execute process of the steps of executing multicasting transmission for a mixture of e-mails and facsimiles, setting destinations of the multicasting transmission, generating, based on e-mail destinations set in the step of setting destinations, image data representing the e-mail destinations and adding the image data to an image data to be transmitted as a facsimile by the multicasting transmission, and generating, based on facsimile destinations set in the step of setting destinations, character string data representing the facsimile destinations and adding the character string data to an e-mail to be transmitted by the multicasting transmission.

Still a further object of the present invention is to provide a computer readable storage medium that stores therein the aforesaid data transmission program.

Still a further object of the present invention is to provide a data transmission apparatus with a first transmission means for transmitting data via Internet and a second transmission means for transmitting data using facsimile protocol via telephone line. The data transmission apparatus includes a first destination setting means for setting a first destination related to the first transmission means, a second destination setting means for setting a second destination related to the second transmission means, a multicasting means for multicasting data to the first destination and the second destination using the first transmission means and the second transmission means, and a destination adding means for adding second destination information to data being transmitted to the first destination, and adding first destination information to data being transmitted to the second destination when multicasting transmission is executed using the first transmission means and the second transmission means.

Still a further object of the present invention is to provide a data communication apparatus including a transmission means for multicasting specific data to a plurality of destinations corresponding to different communication system, a receiving means for receiving response data transmitted by some of the destinations in response to the multicasted specific data, a response data transmission means for multicasting the response data to response destinations that include some of or all of the destinations to which the specific data was multicasted by the transmission means, and a conversion means for converting the specific data and the response data to data of a plurality of kinds of formats corresponding to communication systems to which the destinations and the response destinations respectively correspond.

Still a further object of the present invention is to provide a data communication system with a plurality of kinds of equipment corresponding to different communication systems, and a data communication apparatus for multicasting specific data to the equipment. The data communication apparatus includes a transmission means for multicasting the specific data to the equipment, a receiving means for receiving response data transmitted by some of the equipment in response to the multicasted specific data, a response data transmission means for multicasting the response data to response destinations that include some of or all of the equipment, and a conversion means for converting the specific data and the response data to data of a plurality of kinds of formats corresponding to communication systems to which the equipment correspond. Each of the equipment includes a multicasting transmission data receiving means for receiving the specific data multicasted by the transmission means of the data communication apparatus, and an equipment response data transmission means for transmitting the response data corresponding to the multicasted specific data to the data communication apparatus.

Still a further object of the present invention is to provide a data communication method including the steps of converting a specific data into data of a plurality of kinds of formats used by data communication systems corresponding to a plurality of destinations to which the specific data is multicasted, multicasting the specific data converted into the plurality of kinds of formats to the destinations, receiving response data transmitted from some of the destinations in response to the multicasted specific data, converting the response data into data of a plurality of kinds of formats corresponding to communication systems to which response destinations including some of or all of the destinations correspond, and multicasting the response data converted into data of a plurality of kinds of formats to a plurality of response destinations.

Still a further object of the present invention is to provide a control program for causing a computer to execute process of the steps of multicasting specific data to a plurality of destinations corresponding to different communication systems, receiving response data transmitted from some of the destinations in response to the multicasted specific data, multicasting the response data to response destinations including some of or all of the destinations to which the specific data was multicasted in the step of multicasting specific data, and converting the specific data and the response data to data of a plurality of kinds of formats corresponding to communication systems to which the destinations and the response destinations correspond.

Still a further object of the present invention is to provide claim a computer readable storage medium that stores therein the aforesaid control program.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 8A shows an example of facsimile image prepared for To destinations and Cc destinations;

FIG. 8B shows an example of facsimile image prepared for Bcc destinations;

FIG. 9A shows an example of e-mail prepared for To destinations and Cc destinations;

FIG. 9B shows an example of e-mail prepared for Bcc destinations;

FIG. 27 shows an example of e-mail for a "To" destination in the second embodiment;

FIG. 28 shows an example of e-mail for a "Bcc" destination in the second embodiment;

FIG. 31 shows an example of facsimile data in the second embodiment;

FIG. 32 shows an example of print data in the second embodiment;

FIG. 34 shows an example of notification e-mail in the second environment;

FIG. 44 shows an example of e-mail to which response data is attached as an image file according to the second embodiment;

FIG. 48 shows an example of e-mail for a "To" destination in the third embodiment;

FIG. 49 shows an example of e-mail for a "Cc" destination in the third embodiment;

FIG. 50 shows an example of e-mail for a "Bcc" destination in the third embodiment;

FIG. 52 shows an example of facsimile data in the third embodiment;

FIG. 53 shows an example of print data in the third embodiment;

FIG. 55 shows an example of e-mail containing response data, response instructions, and properties instructions;

FIG. 56 shows an example of facsimile data containing response data, response instructions, and properties instructions; and FIG. 57 shows an example of e-mail to which response data is attached as an image file according to the third embodiment.

DETAILED DESCRIPTION OF THE PREFERRED EMBODIMENT

The embodiments of this invention will be described below with reference to the accompanying drawings.

Figure 1:
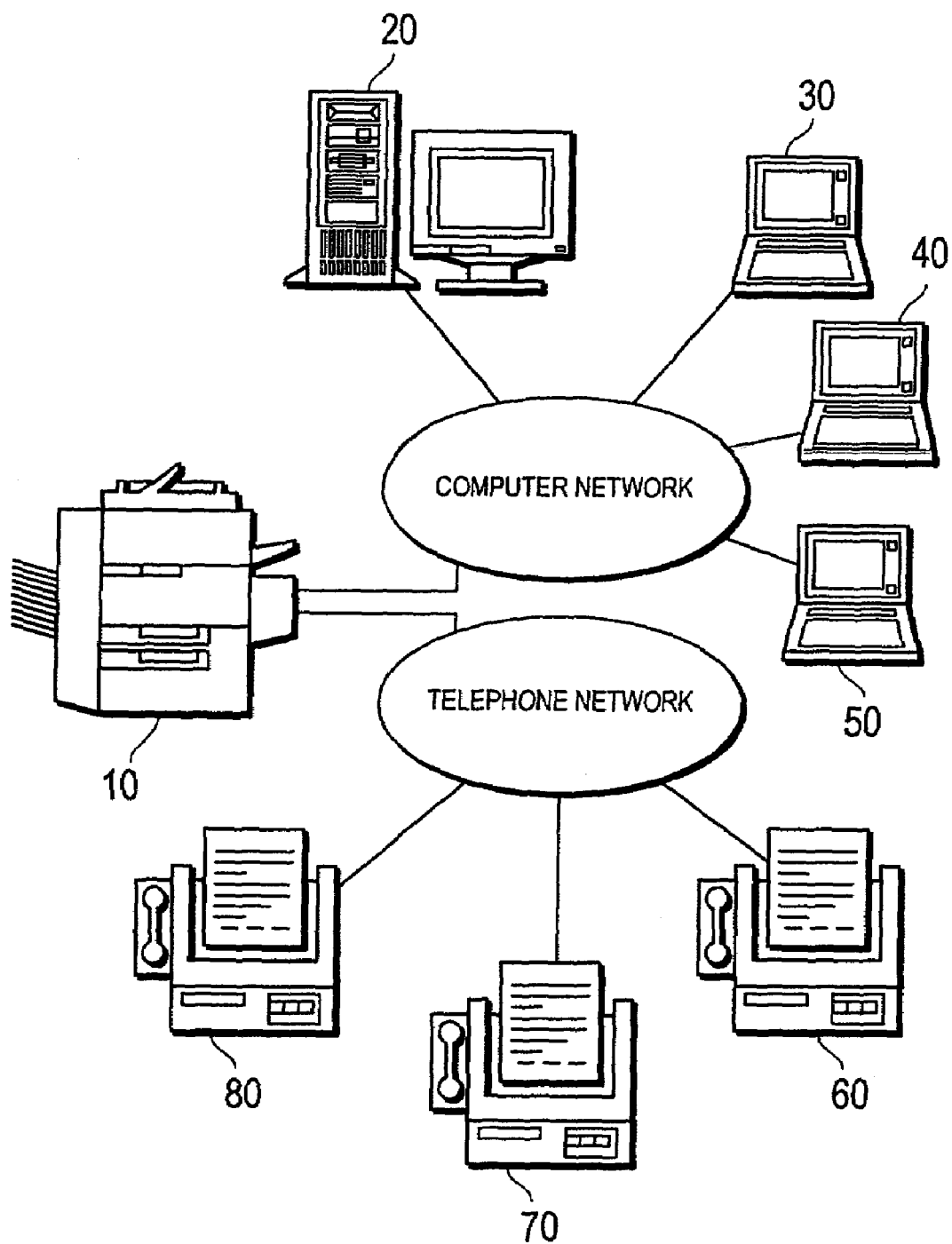
FIG. 1 is a conceptual diagram of assistance in explaining a data transmission apparatus according to the first embodiment of the present invention.

A data transmission apparatus 10 according to the first embodiment shown in FIG. 1 is a digital copying machine capable of functioning as a scanner for outputting image data obtained by reading documents as files. The data transmission apparatus 10 has a capability of transmitting image files attached to e-mails and also a capability of transmitting the image files as facsimiles, wherein the device is connected to a computer network and a telephone network.

The computer network is, for example, a local area network (LAN), a wide area network (WAN), the Internet, or an arbitrary combination thereof, to which a mail server 20, and client computers 30, 40, 50 are connected. The telephone network is, for example, a public telephone network, to which facsimile machines 60, 70, 80 are connected.

Figure 2:
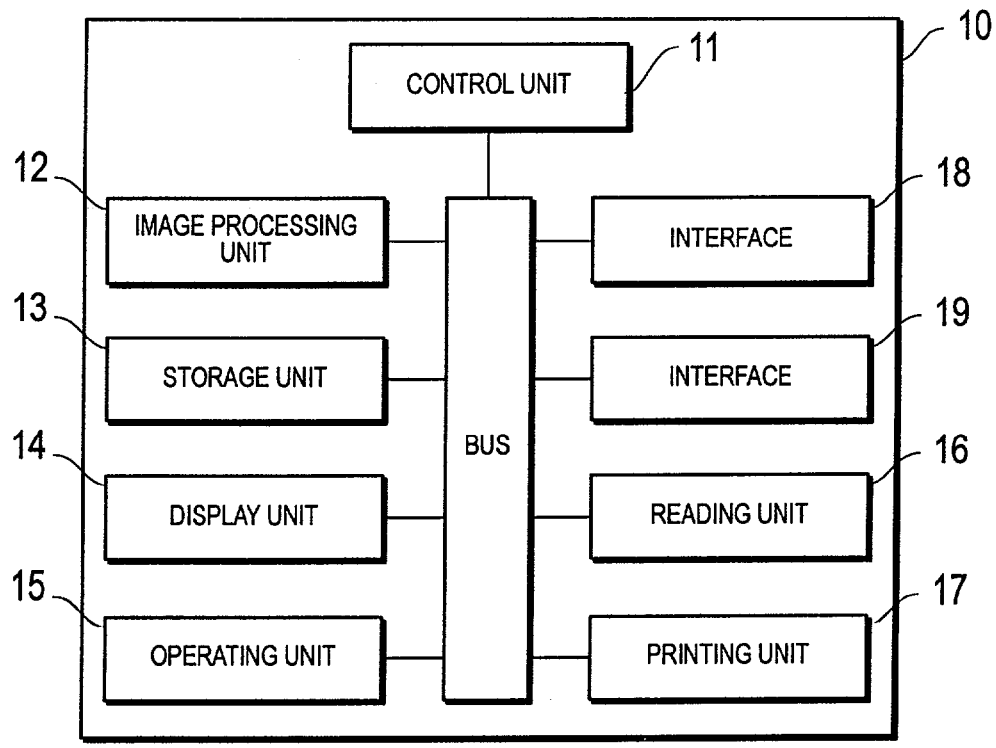
FIG. 2 is a block diagram of the data transmission apparatus.

The data communication apparatus 10 includes, as shown in FIG. 2, a control unit 11, an image processing unit 12, a storage unit 13, a display unit 14, an operating unit 15, a reading unit 16, a printing unit 17, and interfaces 18 and 19, all of which are interconnected via bus.

The control unit 11 is a central processing unit that controls units 12 through 19 based on control program. The control program includes a program for client computers that uses the communication service of the mail server 20 and a data transmission program.

The program for client computers that uses the communication service of the mail server 20 is, for example, a program that uses SMTP (Simple Mail Transfer Protocol). An e-mail is transmitted to the mail server 20 that corresponds to the domain name written on the destination mail address and is stored in a mailbox assigned for the user's name (mail account) written on the destination e-mail address.

The data transmission program causes the control unit 11 to execute: a multicasting transmission step for multicasting a mixture of e-mails and facsimiles; a destination setting step for setting up multicasting destinations; a first adding step for generating image data that represents destinations based on e-mail destinations set by the destination setting step and adding the generated image data to an image data to be transmitted by facsimile multicasting; and a second adding step for generating character string data that represents destinations based on facsimile destinations set by the destination setting step and adding the generated image to an e-mail message to be multicasted.

Therefore, the e-mail recipients can identify the destinations of the facsimile transmission from its text, while the facsimile recipients can identify the destinations of the e-mail transmission from the added image data. In other words, both the e-mail recipients and the facsimile recipients can share the destination information for the multicasting transmission.

The image processing unit 12 executes the format conversion that converts the image file format to the data transmission format. In terms of format conversion items, an image compression mode concerning facsimile transmission and a document format concerning e-mail attachment file are available, either of which can be specified by the transmission source user.

The image compression mode can be, for example, the MH (Modified Huffman) mode, the MR (Modified Read) mode, or the MMR (Modified Modified Read) mode. The document format can be, for example, the TIFF (Tagged Image File Format), which is a file format for images, or the PDF (Portable Document Format), which is a file format for document display.

The storage unit 13 includes, for example, a read only memory such as a ROM, a high-speed random access device such as a RAM, and a large capacity random access memory such as a hard disk drive. The storage unit 13 has an area for temporarily storing programs and various setting data, as well as for storing image files obtained by reading documents, received facsimile image files, and e-mails, and a working area for executing the programs.

Figure 3:
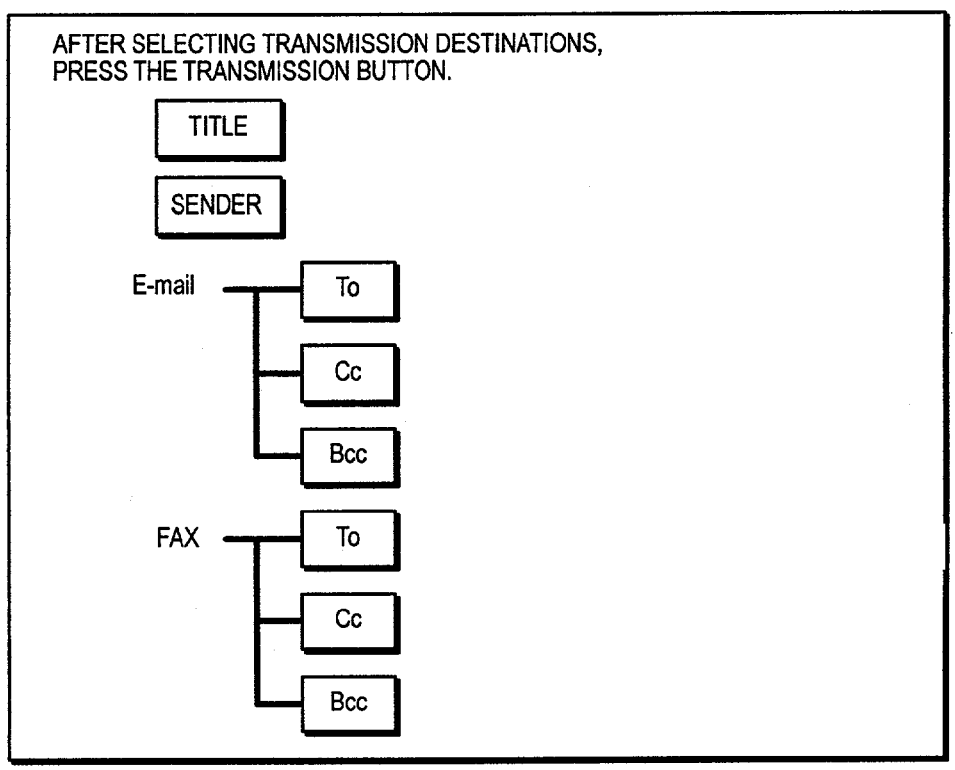
FIG. 3 shows a destination-designating screen of a liquid crystal display panel of the data transmission apparatus.
Figure 4:
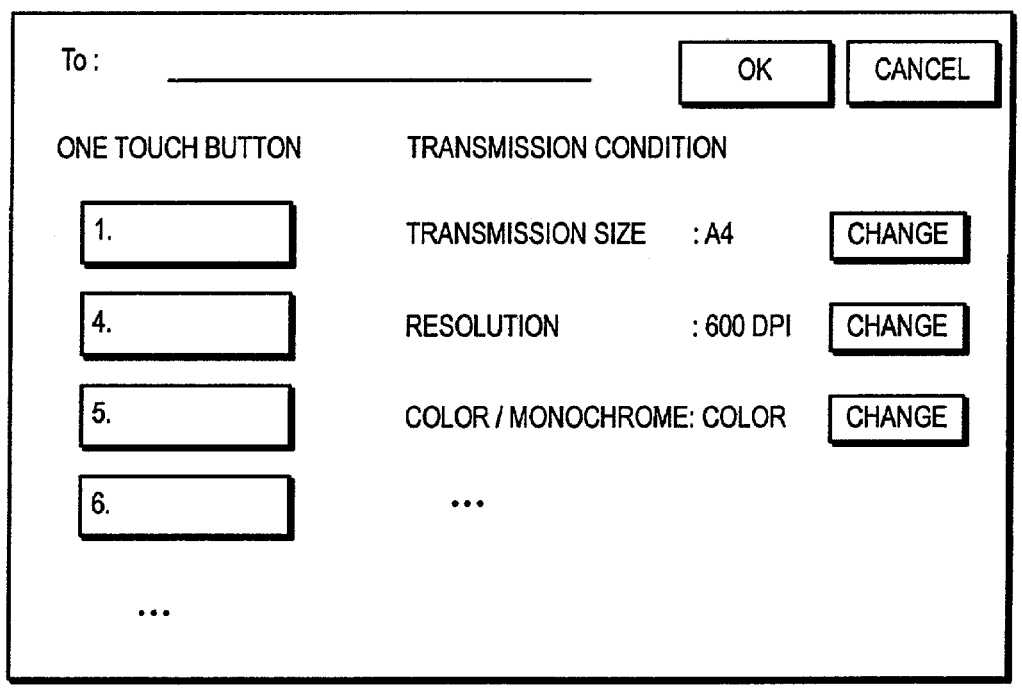
FIG. 4 shows a condition setting screen of the liquid crystal display panel of the data transmission apparatus.

The display unit 14 has a liquid crystal display panel and is used for displaying various messages. The operating unit 15 has a plurality of keys and a touch panel provided on the liquid crystal display panel, and is used for inputting various items into the data transmission apparatus 10. The liquid crystal display panel has a destination-designating screen as shown in FIG. 3 and a condition setting screen as shown in FIG. 4.

The destination-designating screen is used for inputting destination data sorted by destination attribute for e-mail and facsimile transmissions. The destination attribute includes the "To" destination, i.e., direct destination, the "Cc" destination, i.e., a destination to which a copy is distributed, and the "Bcc" destination, i.e., a destination to which a copy is distributed without disclosing its distributions to other destinations. The "other destinations" in the definition of the Bcc destinations above include other Bcc destinations in addition to To destinations and Cc destinations. The condition setting screen is used for inputting various transmission conditions such as image sizes, resolutions, and color modes (distinction between color or monochromatic).

The reading unit 16 is a scanner equipped with a CCD (Charge Coupled Device) image sensor for reading original documents to form image data and an ADF (Automatic Document Feeder) for reading a plurality of documents continuously. The reading unit 16 can be set for color modes and a plurality of resolutions.

The printing unit 17 is for example, an image forming device of an electronic photograph type, and is used for outputting image files received through a computer network and a telephone network as well as image files generated by the reading unit 16 on paper.

The interface 18 includes a network interface card (NIC) and is used for sending and receiving e-mails. The interface 19 is for telephone network and is used for sending and receiving facsimiles.

Figure 5:
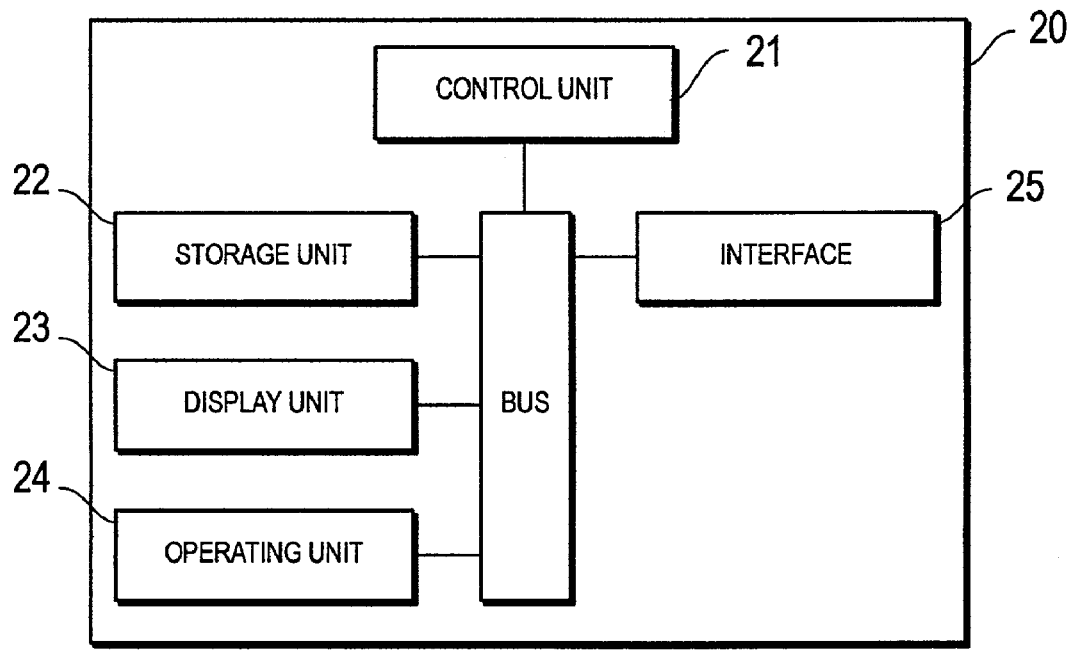
FIG. 5 is a block diagram of a mail server and a client computer for receiving electronic mail transmitted by the data transmission apparatus.

The mail server 20 and the client computers 30, 40, 50 that receive e-mails from the data transmission apparatus 10 are generally the same computers except that the programs installed in them may be different. Then, the mail server 20 and the client computers 30, 40, 50 each has a control unit 21, a storage unit 22, a display unit 23, a operating unit 24 and an interface 25, which are interconnected via a bus as shown in FIG. 5.

The control unit 21 is a central processing unit for controlling the units 22 through 25. The storage unit 22 includes, for example, a read only memory such as a ROM, a high speed random access memory such as a RAM, and a large capacity random access memory such as a hard disk drive, and is used for storing programs and various data as well as a temporary working area for executing the programs.

The display unit 23 is, for example, a display device having a CRT (Cathode-Ray Tube) or a liquid crystal panel. The operating unit 24 includes, for example, a keyboard and a mouse. The interface 25 includes a NIC.

The mail server 20 has a server program installed for providing communication service for sending and receiving e-mails and, for example, uses SMTP and POP (Post Office Protocol). On the other hand, the client computers 30, 40, 50 each has a client computer program installed for using communication service of the mail server 20, is a POP client computer, for example, and downloads e-mails stored in the predetermined mail box of the mail server 20.

Figure 6:
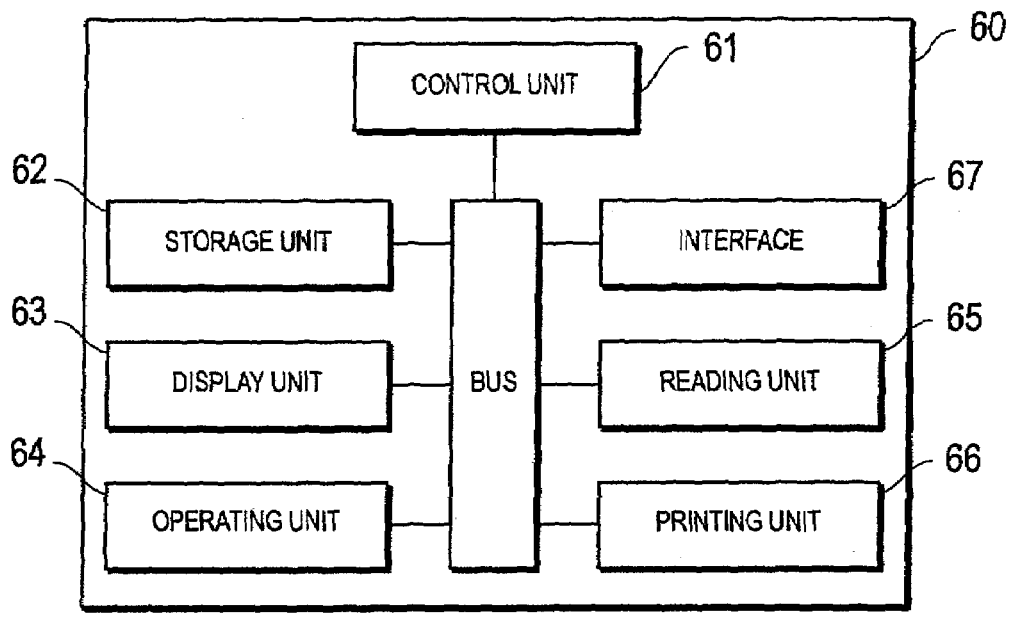
FIG. 6 is a block diagram of a facsimile machine used for receiving images transmitted by the data transmission apparatus.

The facsimile machines 60, 70, 80 that receive images transmitted by the data transmission apparatus 10 each has a control unit 61, a storage unit 62, a display unit 63, an operating unit 64, a reading unit 65, a printing unit 66, and an interface 67, which are interconnected via a bus as shown in FIG. 6.

The control unit 61 is a central processing device for controlling the units 62 through 67 according to a program. The program is an image-processing program for compressing image data delivered by the reading unit 65 and converting it into a designated data transmission format.

The storage unit 62 includes, for example, a read only memory such as a ROM, a high speed random access memory such as a RAM, and a large capacity random access memory such as a hard disk drive. The storage unit 62 has a temporary storage area for storing programs and various setting data, image files obtained by reading documents and facsimile images files received, and a working area for executing the programs.

The display unit 63 has a liquid crystal panel for displaying various messages. The operating unit 64 has a plurality of keys and a touch panel provided on the liquid crystal display panel.

The reading unit 65 is a scanner equipped with a CCD image sensor and an ADF. The printing unit 66 is, for example, an image forming device of an electronic photograph type, and is used for outputting received facsimile image files onto printing paper.

The interface 67 is for a telephone network and is used for sending and receiving facsimiles.

Figure 7:
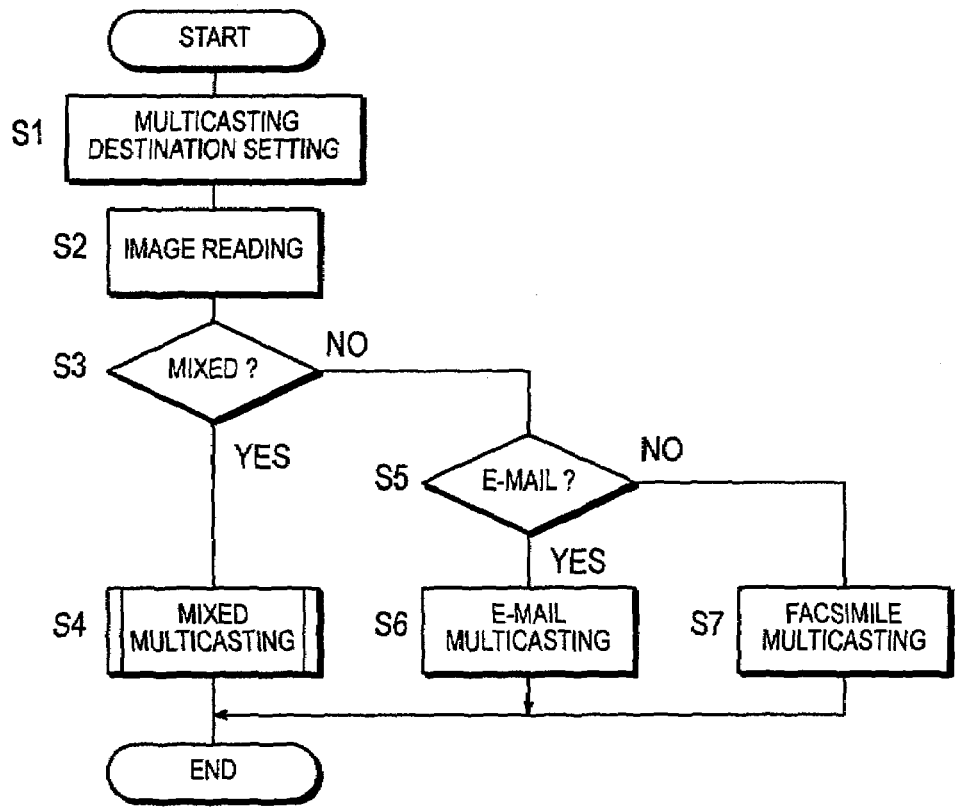
FIG. 7 is a flowchart of general operations executed by a control unit of the data transmission apparatus based on a data transmission program.

The procedures of multicasting process to be executed by the control unit 11 of the data transmission apparatus 10 based on the data transmission program will be describe below referring to FIG. 7.

The control unit 11 receives the destinations and transmission condition for a multicasting transmission set by the user using the display unit 14 and the operating unit 15, prepares a setting file based on the destinations and transmission, and stores it to the temporary storage area of the storage unit 13 (step S1). More specifically, the destination-designating screen (see FIG. 3) and the condition setting screen (see FIG. 4) are displayed on the display unit 14, and input and, if any, changes of the "To," "Cc," and "Bcc" destinations concerning e-mail and facsimile transmissions inputted by the user using the operating unit 15 are received, and a setting file is generated based on these destinations and transmission conditions.

Then, image reading of a document laid on the ADF is executed by the reading unit 16 according to an instruction of the control unit 11 (step S2).

Next, the setting file is referenced in order to make a judgment whether there is a mixture of multicasting destinations for transmitting image files attached to e-mails and multicasting destinations for transmitting facsimiles (step S3). In other words, a judgment is made whether both e-mail destinations and facsimile destinations are set in the step S1. If it is judged that there is a mixture, a mixed multicasting process is executed (step S4).

In a mixed multicasting process, an image data that contains To destinations and Cc destinations for e-mail transmission, for example, an image data shown in FIG. 8A, is generated as a facsimile front-page image for To destinations or Cc destinations for facsimile transmission. As shown in the drawing, the front-page image contains the To destinations and Cc destinations for facsimile transmission as well. Moreover, as for Bcc destinations, an image data containing the Bcc destinations, for example, an image data shown in FIG. 8B, is prepared as a front-page image.

On the other hand, as for the To destinations and Cc destinations for e-mail transmission, an e-mail message with a text containing the To destinations and Cc destinations for facsimile transmission, for example, an e-mail message shown in FIG. 9A is prepared. As shown in the figure, the header of this e-mail contains the To destinations and Cc destinations for e-mail transmission. As for the Bcc destinations, an e-mail message with a header containing the Bcc destination data, for example, an e-mail message shown in FIG. 9B is prepared.

If it is judged that there is no mixture of destinations in the step S3, another judgment is made as to whether e-mail is applied (step S5). If it is judged that e-mail is applied, ordinary e-mail multicasting is executed (step S6). If it is judged that e-mail is not applied, ordinary facsimile multicasting is executed (step S7).

Figure 10:
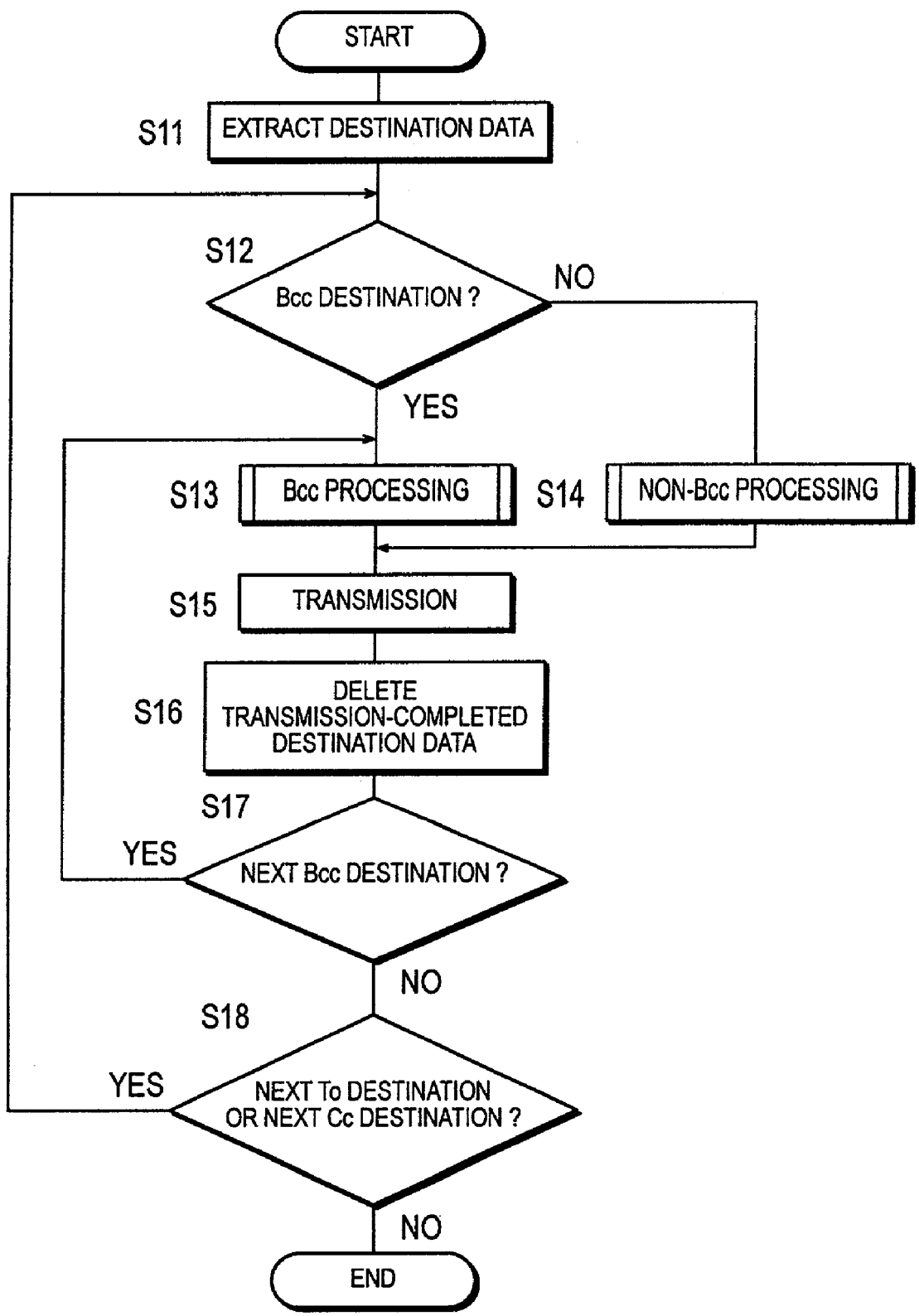
FIG. 10 is a flowchart of mixed multicasting process of the step S4 in FIG. 7.

Next, referencing FIG. 10, the mixed multicasting process of the step S4 is described in detail.

First, destination data are extracted from the setting file prepared in the step S1, and stored into the temporary storage area and the first working area of the storage unit 13 held by the instruction of the control unit 11 by attribute of the destinations (step S11). Next, a judgment is made whether Bcc destinations exist in the destination data stored in the temporary storage area (step S12). If it is judged that Bcc destinations exist, one of the Bcc destinations is selected and the Bcc process to the selected destination is executed (step S13). If it is judged that no Bcc destination exists, one of the To destinations or the Cc destinations is selected and the non-Bcc process is executed for the selected destination (step S14).

Next, the transmission process is executed for the selected destination (step S15). Specifically, if the selected destination is an e-mail address, an e-mail attached with the document image file is transmitted to the mail server 20 connected to the computer network via the interface 18 controlled by the control unit 11. On the other hand, if the selected destination is a facsimile telephone number (FAX number), a facsimile image file containing the document image file is transmitted to the facsimile machines 60, 70, 80 connected to the telephone network via the interface 19 controlled by the control unit 11.

Next, the (selected) destination to which the transmission has been made is deleted from the destination data stored in the temporary storage area (step S16). Then, a judgment is made whether a Bcc destination to be processed next exists in the destination data stored in the temporary storage area (step S17). If it is judged that a Bcc destination exists, the process returns to the step S13. Consequently, the Bcc process is repeated again.

If it is judged that no Bcc destination to be processed next exists, or transmissions to all Bcc destinations have be completed, a further judgment is made whether a next To destination or a next Cc destination exists in the destination data stored in the temporary storage area (step S18). If it is judged that a next To destination or a next Cc destination exists, the process returns to the step S12. Thus, non-Bcc processes are repeated until there is no more destination data exists in the temporary storage area.

Figure 11:
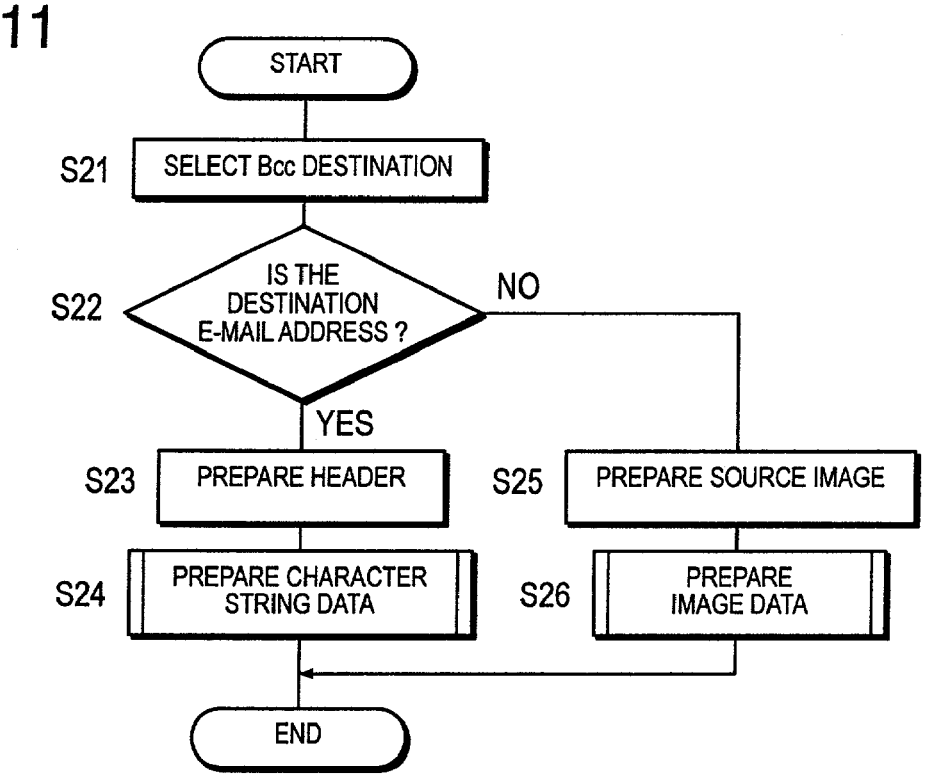
FIG. 11 is a flowchart of the Bcc process of the step S13 in FIG. 10.

Next, the Bcc process of the step S13 is described in detail referring to FIG. 11.

First, one of the Bcc destinations stored in the temporary storage area is selected (step S21). Next, a judgment is made whether the selected Bcc destination is an e-mail address (step S22).

If it is judged that the selected Bcc destination is an e-mail address, an e-mail header for ordinary multicasting transmission is prepared based on the selected Bcc destination and the To destination and Cc destination data stored in the first working area (step S23). Therefore, the e-mail header contains the data for the selected Bcc destination.

The character string data preparation process is executed (step S24). The character string data preparation process is a process of adding the facsimile To destination and Cc destination data stored in the first working area to the e-mail body.

On the other hand, if the selected Bcc destination is not an e-mail address, i.e., it is a FAX number, a source image (front page image of an ordinary multicasting facsimile) is prepared based on the selected Bcc destination and the facsimile To destination and Cc destination data stored in the first working area (step S25). Thus, the source image contains the selected Bcc destination data.

The image data preparation process is then executed (step S26). The image data preparation process is a process of adding the image data containing the e-mail To destination and Cc destination data stored in the first working area to the source image.

Figure 12:
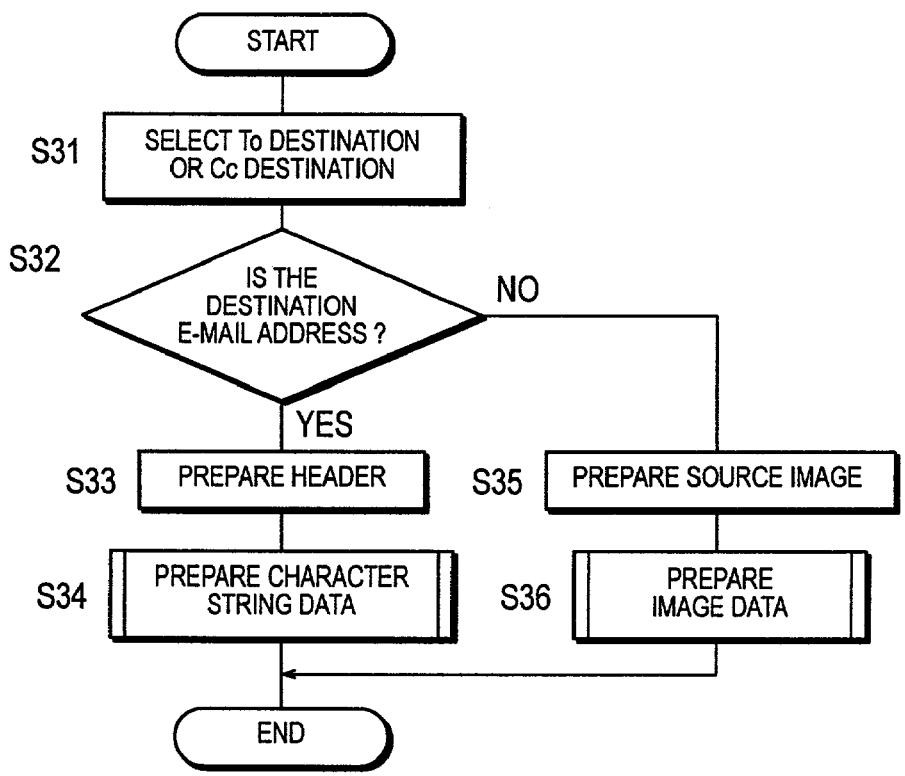
FIG. 12 is a flowchart of the non-Bcc process of the step S14 in FIG. 10.

Next, the non-Bcc process of the step S14 will be described in detail referring to FIG. 12.

First, one of the To destinations or the Cc destinations stored in the temporary storage area is selected (step S31). Next, a judgment is made whether the selected destination is an e-mail address (step S32).

If it is judged that the selected destination is an e-mail address, an e-mail header for ordinary multicasting transmission is prepared based on the To destination and Cc destination data stored in the first working area (step S33). Therefore, the header does not contain the data for the selected Bcc destination. The character string data preparation process is then executed (step S34).

On the other hand, if the selected destination is not an e-mail address, i.e., it is a FAX number, a source image is prepared based on the facsimile To destination and Cc destination data stored in the first working area (step S35). Therefore, the source image does not contain the selected Bcc destination data. Then, image data preparation process is executed (step S36).

Figure 13:
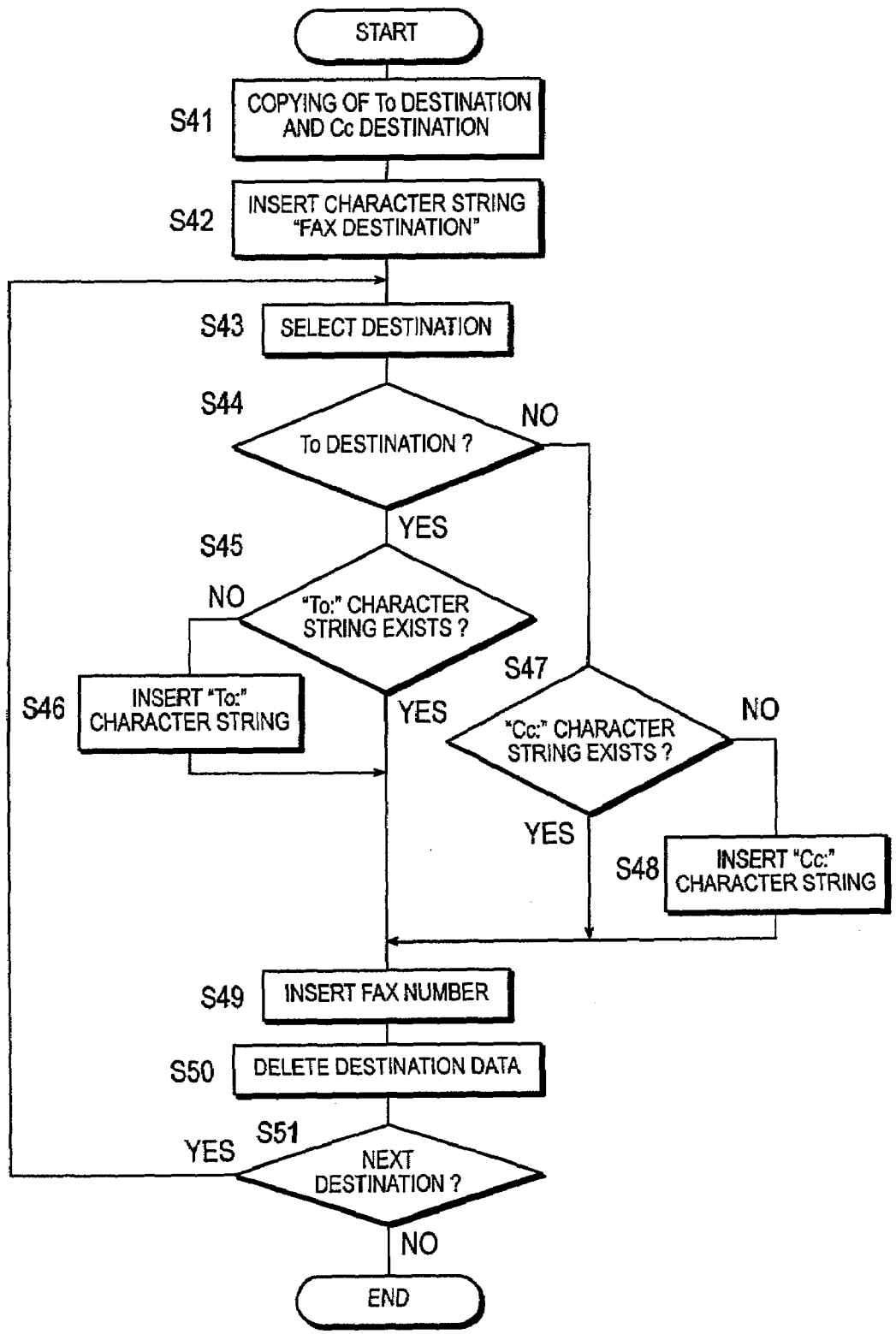
FIG. 13 is a flowchart of the character string process of the step S24 in FIG. 11 and the step S34 in FIG. 12.

Next, the character string data preparation process of the step S24 in FIG. 11 and the step S34 in FIG. 12 will be described in detail referring to FIG. 13.

First, the facsimile To destination and Cc destination data stored in the first working area are copied into the second working area of the storage unit 13 held by the instruction of the control unit 11 (step S41), and the character string "FAX destination" is inserted into the e-mail body (step S42). Then, one of the facsimile To destinations or the Cc destinations stored in the second working area is selected (step S43).

Next, a judgment is made whether the selected destination is a To destination (step S44). If it is judged that the selected destination is a To destination, a judgment is further made as to whether there exists a character string "To:" in the e-mail body (step S45). If it is judged that the character string "To:" does not exist, the character string "To:" is inserted into the e-mail body (step S46), and the process advances to the step S49. On the other hand, if it is judged that the character string "To:" exists, the process goes straight to the step S49.

If it is judged that the selected destination is not a To destination in the step S44, a further judgment is made as to whether there exists a character string "Cc:" in thee-mail body (step S47). If it is judged that the character string "Cc:" does not exist, the character string "Cc:" is inserted into the e-mail body (step S48), and the process advances to the step S49. On the other hand, if it is judged that-the character string "Cc:" exists, the process goes straight to the step S49.

In the step S49, a character string consisting of the FAX number of the selected destination and is inserted into the e-mail body. The selected destination is then deleted from the destination data stored in the second working area (step S50).

Next, a judgment is made whether a next destination exists in the second working area (step S51). If it is judged that a next destination exists, the process returns to the step S43. Consequently, the steps S43 through S51 are repeated until all the character strings consisting of the facsimile To destinations and Cc destinations are inserted into the e-mail body.

Figure 14:
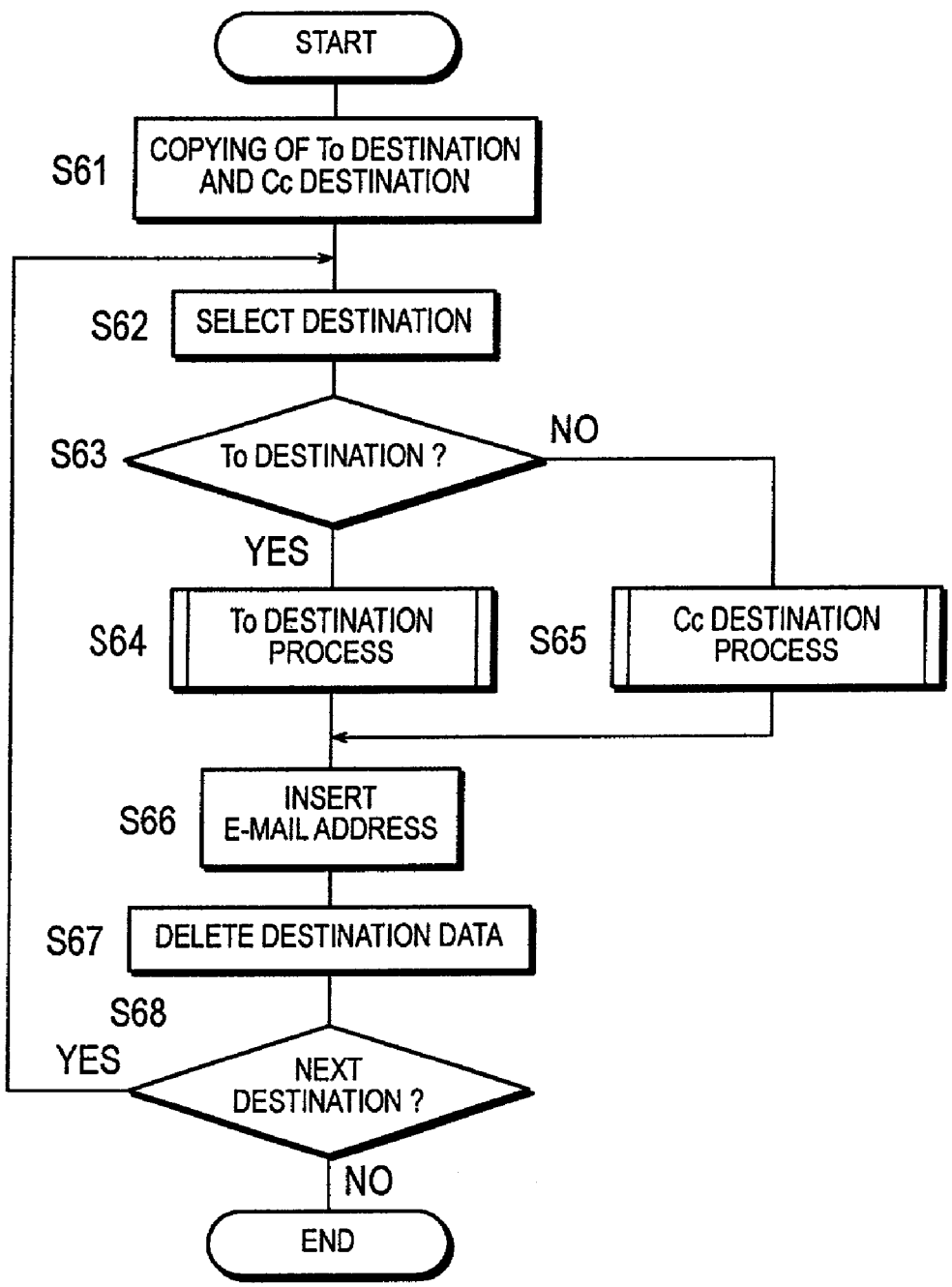
FIG. 14 is a flowchart of the image data process of the step S26 of FIG. 11 and the step S36 in FIG. 12.

Next, the image data preparation process of the step S26 in FIG. 11 and the step S36 in FIG. 12 will be described in detail with reference to FIG. 14.

First, the e-mail To destination and Cc destination data stored in the first working area are copied in the second working area (step S61). One of the e-mail To destinations or Cc destinations stored in the second working area is selected (step S62).

Next, a judgment is made whether the selected destination is a To destination (step S63). If it is judged that the selected destination is a To destination, the To destination process is executed (step S64), and the process advances to the step S66.

Figure 15:
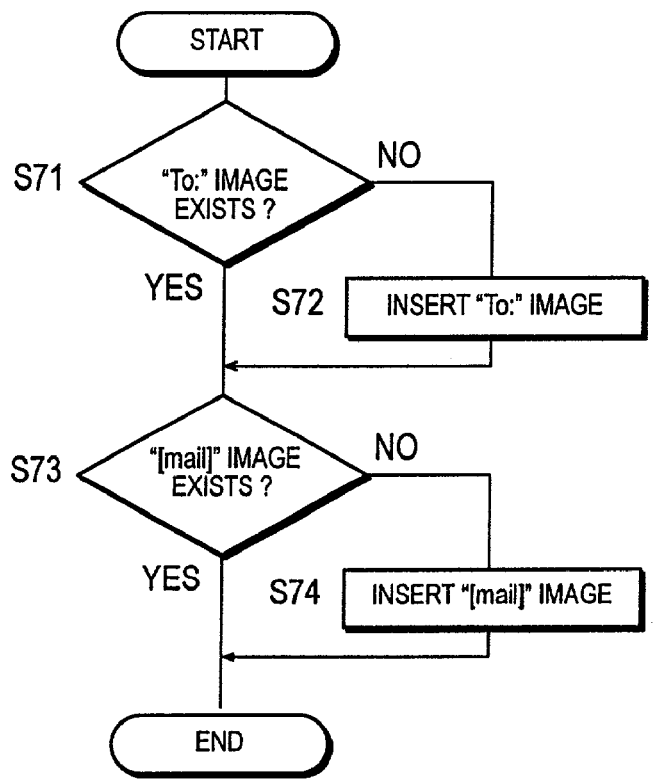
FIG. 15 is a flowchart of the To destination process of the step S64 in FIG. 14.

In the To destination process, if the image "To:" does not exist (step S71: NO), the image "To:" is inserted into the source image (step S72); furthermore, if the image "[mail]" does not exist (step S73: NO), the image "[mail]" is inserted into the source image (step S74) as shown in FIG. 15. In a word, the To destination process is a process of adding the title for an e-mail To destination to the source image.

In the step S63, if it is judged that the selected destination is not a To destination, the Cc destination process is executed (step S65), and the process advances to the step S66.

Figure 16:
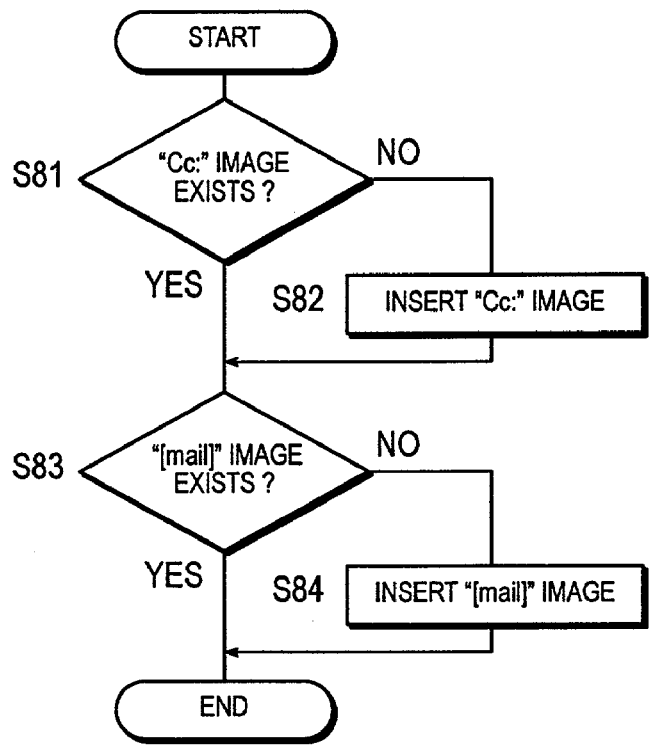
FIG. 16 is a flowchart of the Cc destination process of the step S65 in FIG. 14.

In the Cc destination process, if the image "Cc:" does not exist (step S81: NO), the image "Cc:" is inserted into the source image (step S82); furthermore, if the image "[mail]" does not exist (step S83: NO), the image "[mail]" is inserted into the source image (step S84) as shown in FIG. 16. In a word, the Cc destination process is a process of adding the titles for an e-mail Cc destination to the source image.

In the step S66, an image data consisting of the e-mail address of the selected destination is generated and inserted into the source image. The selected destination data is then deleted from the destination data stored in the second working area (step S67).

Next, a judgment is made whether a next destination exists in the second working area (step S68). If it is judged that a next destination exists, the process returns to the step S62. Consequently, the steps S62 through S68 are repeated until all the image data consisting of the e-mail To destinations and Cc destinations are inserted into the facsimile front-page image.

As described in the above, according to the first embodiment, the e-mail recipients can identify the destinations of facsimile transmissions from the e-mail body, while the facsimile recipients can identify the destinations of e-mail transmissions from the additional image data. Thus, the e-mail recipients and the facsimile recipients can share the information of the multicasting transmission destinations.

Next, the second embodiment of the present invention is as follows.

Figure 17:
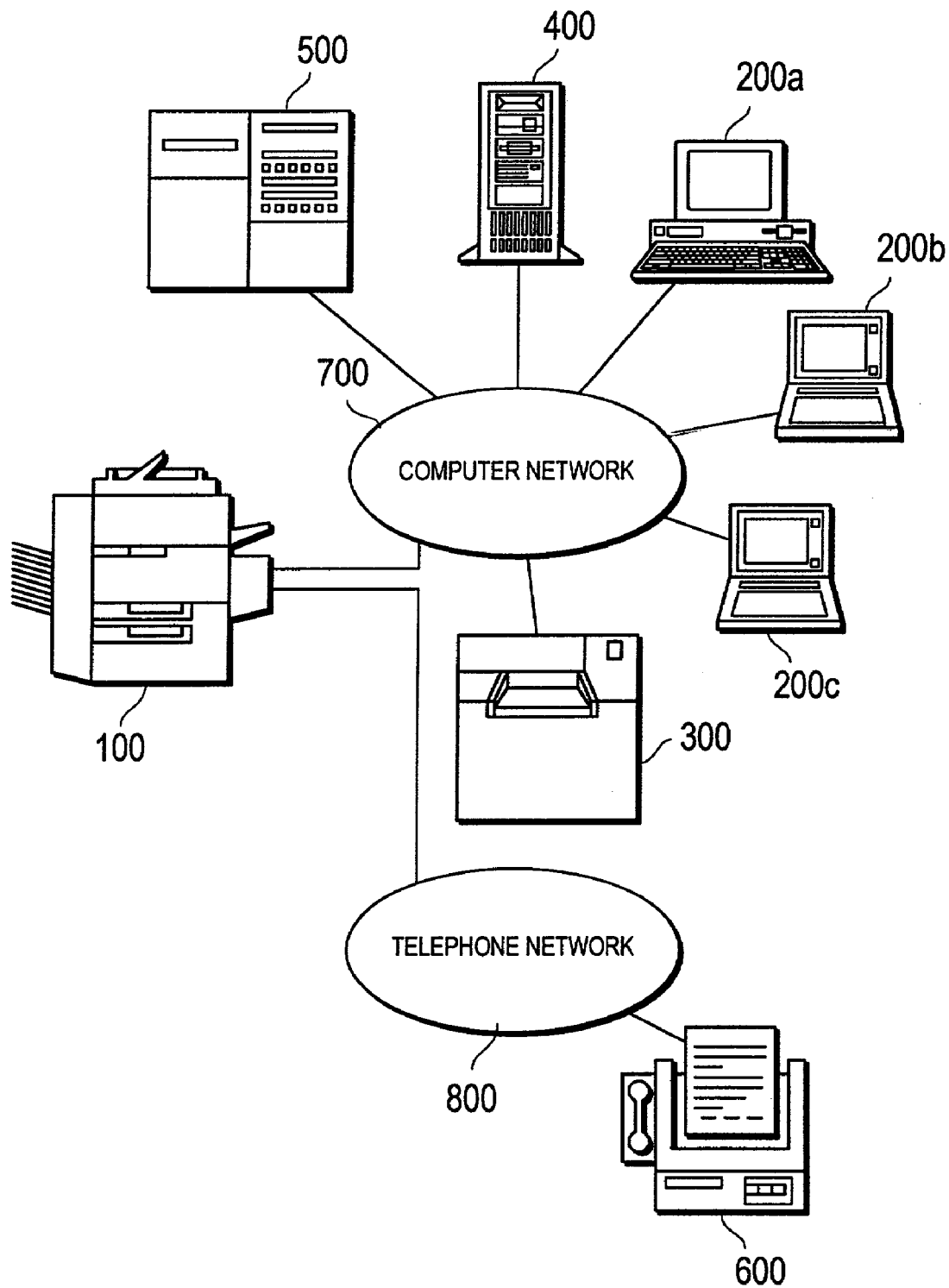
FIG. 17 is a schematic diagram of a data communication system according to the second embodiment of the present invention.

FIG. 17 is a block diagram of an example of a data communication system according to the second embodiment.

A data communication apparatus 100 shown in FIG. 17 is connected to a computer network 700 and a telephone network 800. The computer network 700 is either LAN (local area network), WAN (wide area network), or the Internet. On the other hand, the telephone network 800 is, for example, a public telephone network.

The data communication apparatus 100 is equipment with a scanning function of reading documents to obtain image data, and is preferably multi-function peripheral equipment. The data communication apparatus 100 is capable of transmitting the image data obtained by reading documents after converting the image data into various formats.

More specifically, the data communication apparatus 100 is capable of converting the image data obtained by reading a document into an image file to be attached to an e-mail, and transmitting the e-mail attached with the image file via the computer network 700. The e-mail transmitted from the data communication apparatus 100 is stored in the mailbox of the mail server 400. Computers (client computers) 220a, 200b, 200c obtain e-mail from mailboxes.

The data communication apparatus 100 is also capable of transmitting the image data obtained by reading a document to a printer 300 as a print job, transferring an image file to an FTP server 500 using the FTP (file transfer protocol), and transmitting image data obtained by reading a document to a facsimile machine 600 as facsimile data.

The data communication apparatus 100 is further capable of multicasting image data converted into data of a plurality of formats. The multicasting in the second embodiment is generally transmitting specified data based on a single data source to a plurality of destinations simultaneously.

Figure 18:
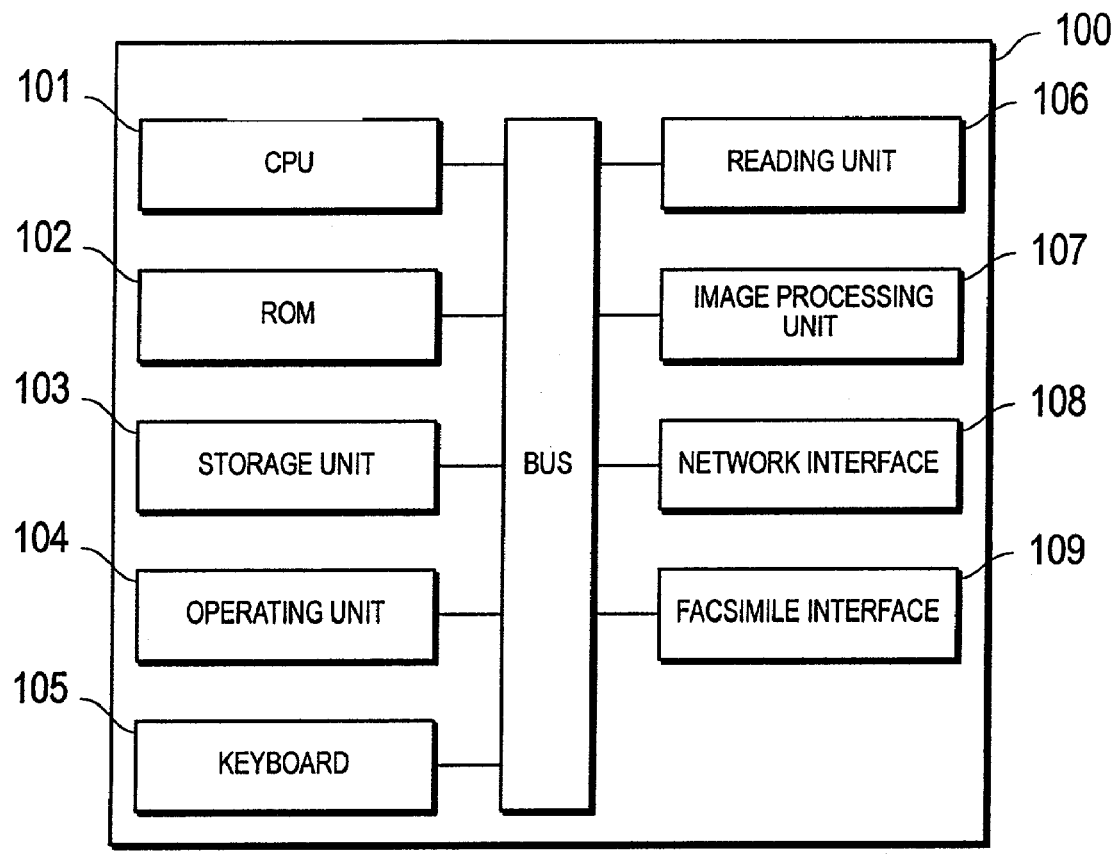
FIG. 18 is a block diagram of the data communication apparatus shown in FIG. 17.

FIG. 18 is a block diagram of an example construction of the data communication apparatus.

The data communication apparatus 100 includes a CPU 101, a ROM 102, a storage unit 103, an operating panel 104, a keyboard 105, a reading unit 106, an image processing unit 107, a network interface 108, and facsimile interface 109, all of which are interconnected via a bus.

The CPU 101 is in charge of control and arithmetic operations. The ROM 102 stores programs. The storage unit 103 includes, for example, a RAM for storing data temporarily as a working area, and a hard disk for storing programs and various data. The operating panel 104 is used for entering various inputs and displaying, and includes a touch panel and mechanical keys. The keyboard 105 is for entering character and code inputs.

The reading unit 106 is a scanner engine and is used for obtaining image data by reading documents. The image processing unit 107 performs various image processing. Specifically, the image-processing executed by the image processing unit 107 includes a process of converting image data obtained by the reading unit 106 as well as response data for the image data into various formats corresponding to different communication systems.

The network interface 108 is an interface for communicating via the computer network 700. The network interface 108 is more specifically an interface for communicating with the computers 200a, 200b, 200c, the printer 300, the mail server 400, and the FTP server 500. On the other hand, the facsimile interface 109 is an interface for communicating via the telephone network 800, and more specifically an interface for communicating with the facsimile machine 600.

Next, the construction of the computers 200a, 200b, 200c, the mail server 400, and the FTP server 500 will be described below. Since the computers 200a, 200b, 200c have similar construction, the computer 200a will be used as an example.

Figure 19:
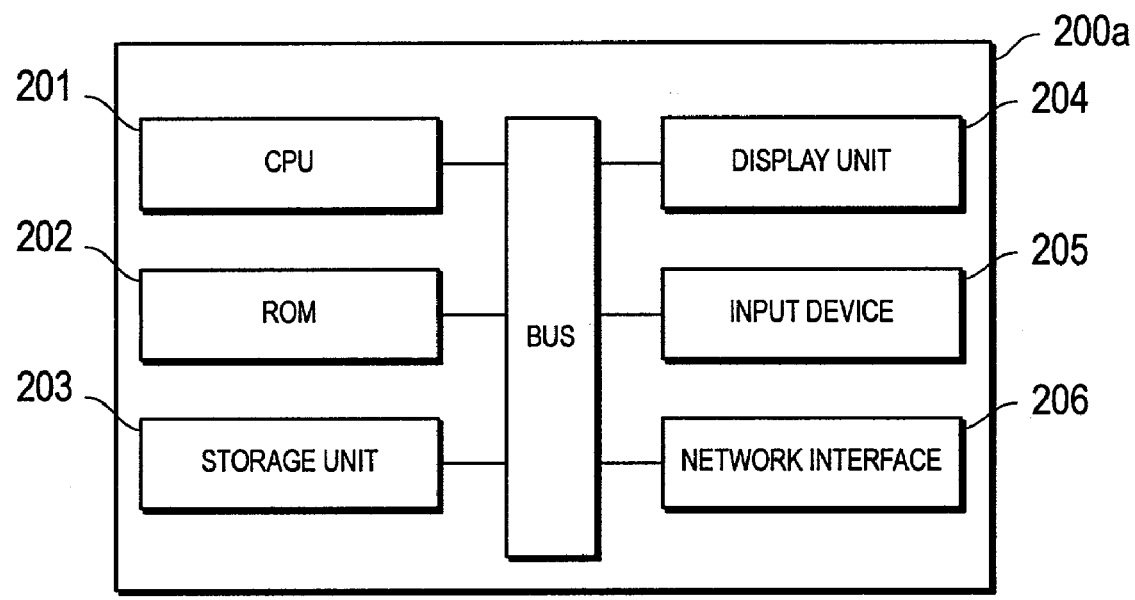
FIG. 19 is a block diagram of the computer shown in FIG. 17.

FIG. 19 is a block diagram of an example construction of the computer 200a. The computer 200a includes a CPU 201, a ROM 202, a storage unit 203, a display unit 204, an input device 205, and a network interface 206. The CPU 201 is in charge of control and arithmetic operations. The ROM 202 stores programs. The storage unit 203 includes, for example, a RAM for storing data temporarily as a working area, and a hard disk for storing programs and various data.

The hard disk has an e-mail program installed in it. The e-mail program is a program for preparing, editing, sending and receiving e-mails, replying to e-mails, and storing/organizing received e-mails. A browser, which is a program for communicating with other equipment by means of HTTP (Hypertext Transfer Protocol), can also be installed on the hard disk. The display unit 204 can display various kinds of information.

The input device 205 includes a keyboard and a pointing device such as a mouse. When the computer 200a receives an image data attached to an e-mail and a response data is prepared in response to it, the input device 205 is used for designating the destinations to which the response data is to be multicasted. The network interface 206 is an interface for communicating via the computer network 700.

The computer 200a, the mail server 400, and the FTP server 500 all have basically identical construction except the installed programs. The mail server 400 has an installed program for transferring e-mails and for controlling e-mails for each mailbox. The FTP server 500 has an installed program for receiving files transferred by means of file transfer protocols.

Figure 20:
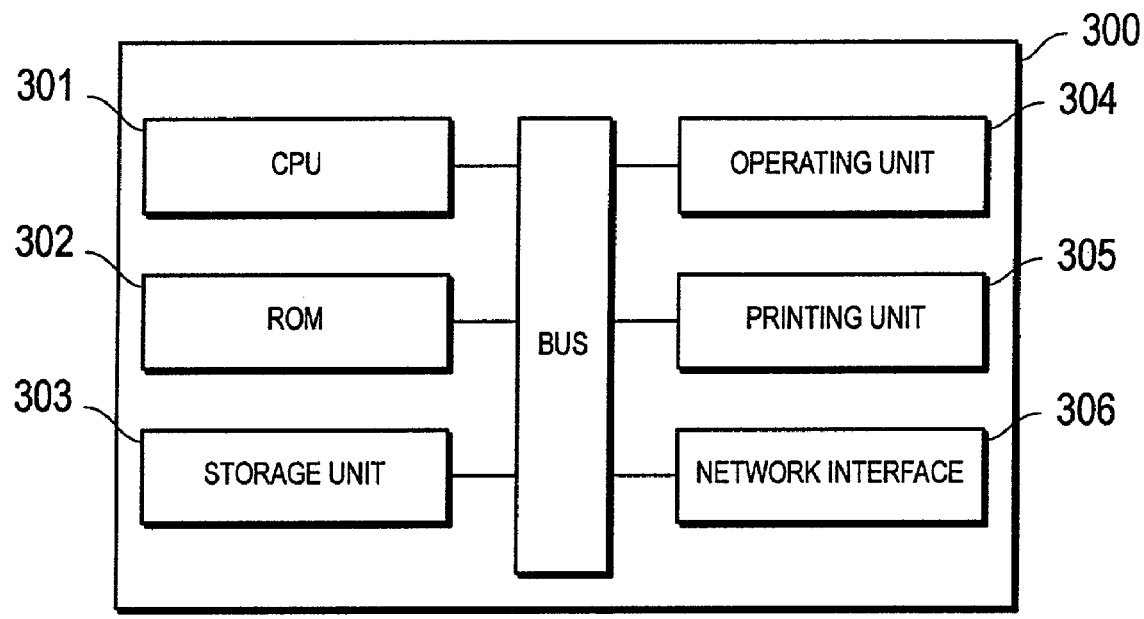
FIG. 20 is a block diagram of the printer shown in FIG. 17.

FIG. 20 is a block diagram of an example construction of the printer. The printer 300 includes a CPU 301, a ROM 302, a storage unit 303, an operating panel 304, a printing unit 305, and a network interface 306.

The printer 300 not only has a normal printing function, in which it starts to print automatically when it receives a print job, but also a confidential printing function, which is used for keeping confidentiality of printing. The confidential printing function allows the printing unit to start printing only when a predetermined keyword is inputted. Thus, it can prevent the contents of what is being printed out and the fact of printing itself from being disclosed to people other than those who know the keyword. Since the construction of the printer 300 is the same as conventional printers, its detail description is omitted here.

Figure 21:
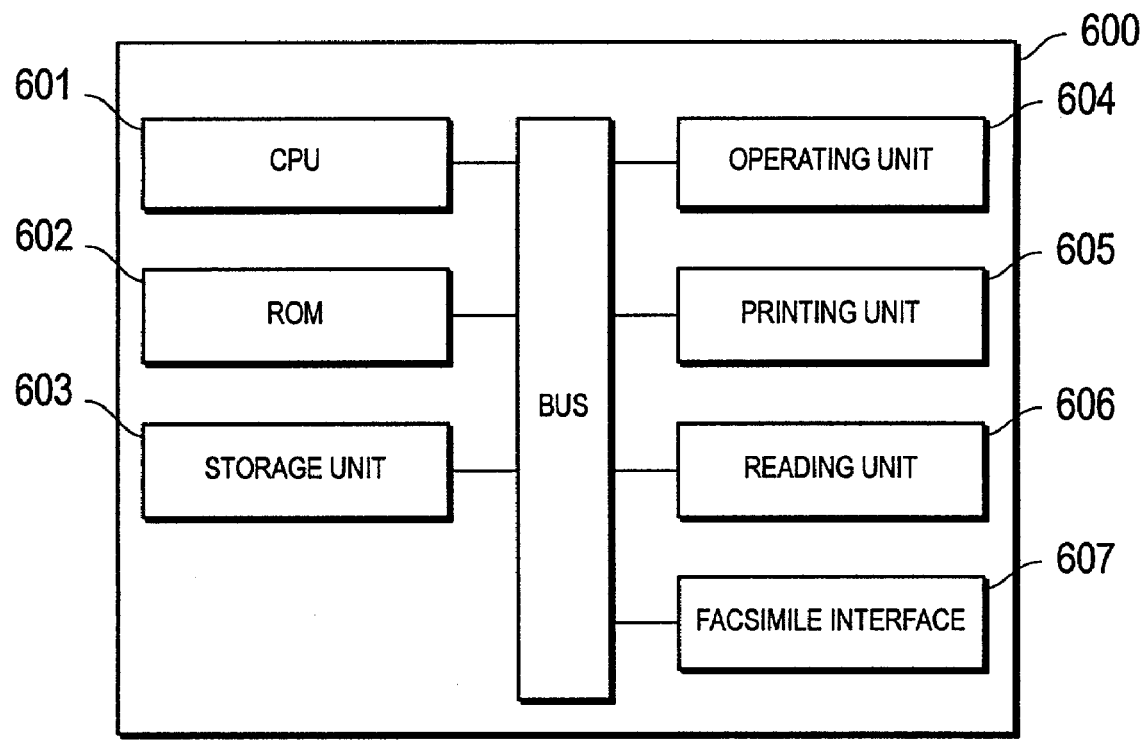
FIG. 21 is a block diagram of the facsimile machine shown in FIG. 17.

FIG. 21 is a block diagram of an example construction of the facsimile machine. The facsimile machine 600 includes a CPU 601, a ROM 602, a storage unit 603, an operating panel 604, a printing unit 605, a reading unit 606, and a network interface 607.

The facsimile machine 600 has a confidential facsimile output function. The confidential facsimile output function is a function to start printing based on the facsimile data when a predetermined keyword is inputted. Since the construction of the facsimile machine 600 is the same as conventional facsimile machines, its detail description is omitted here.

The data communication system as constituted above executes it process as described below. The following description deals with the process divided into two parts: the image data multicasting process and the process of multicasting response data to a plurality of response destinations in response to multicasted image data (hereinafter called "multicasting response process").

First, the image data multicasting process will be described.

Figures 22, 22A:
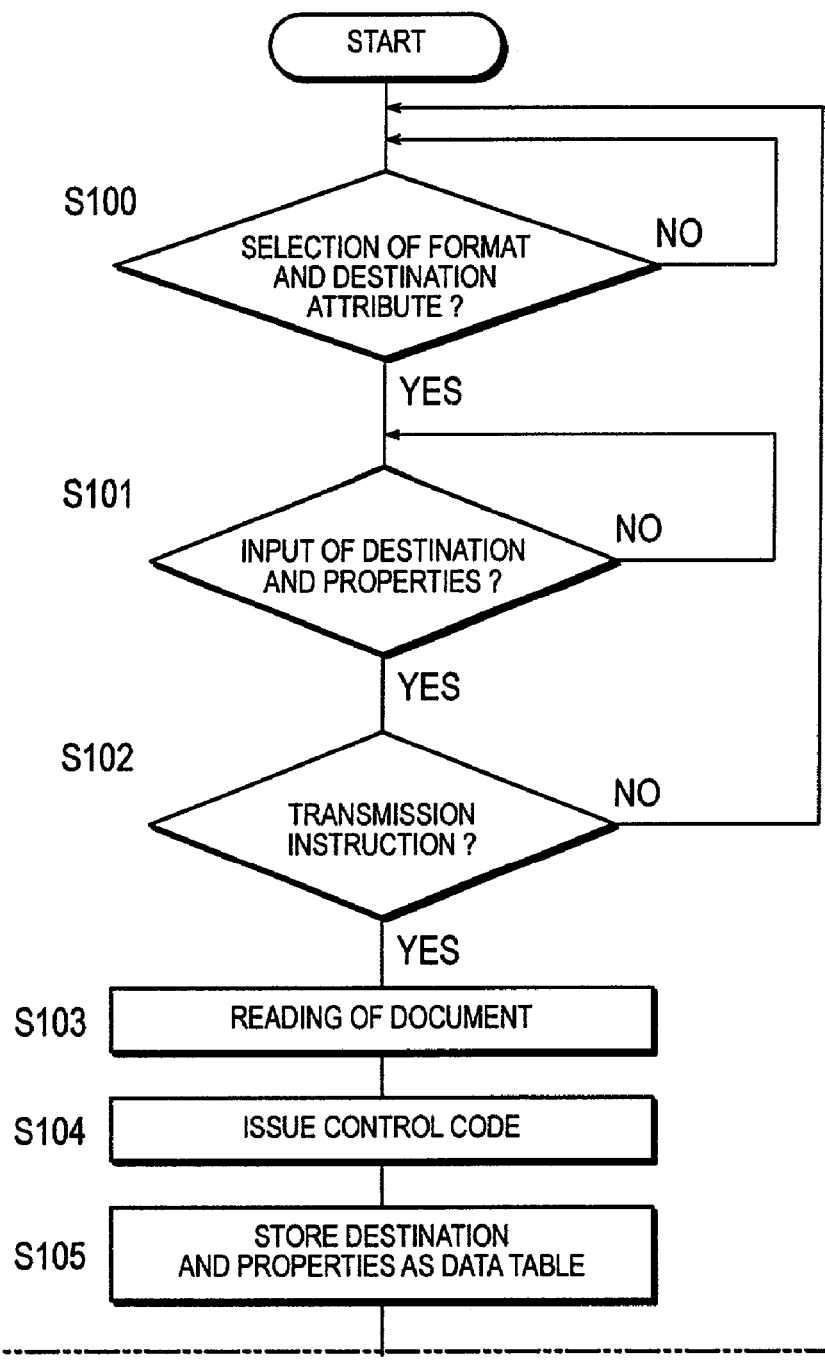
FIG. 22A and FIG. 22B are flowcharts of multicasting process of the data communication apparatus.
Figure 22B:
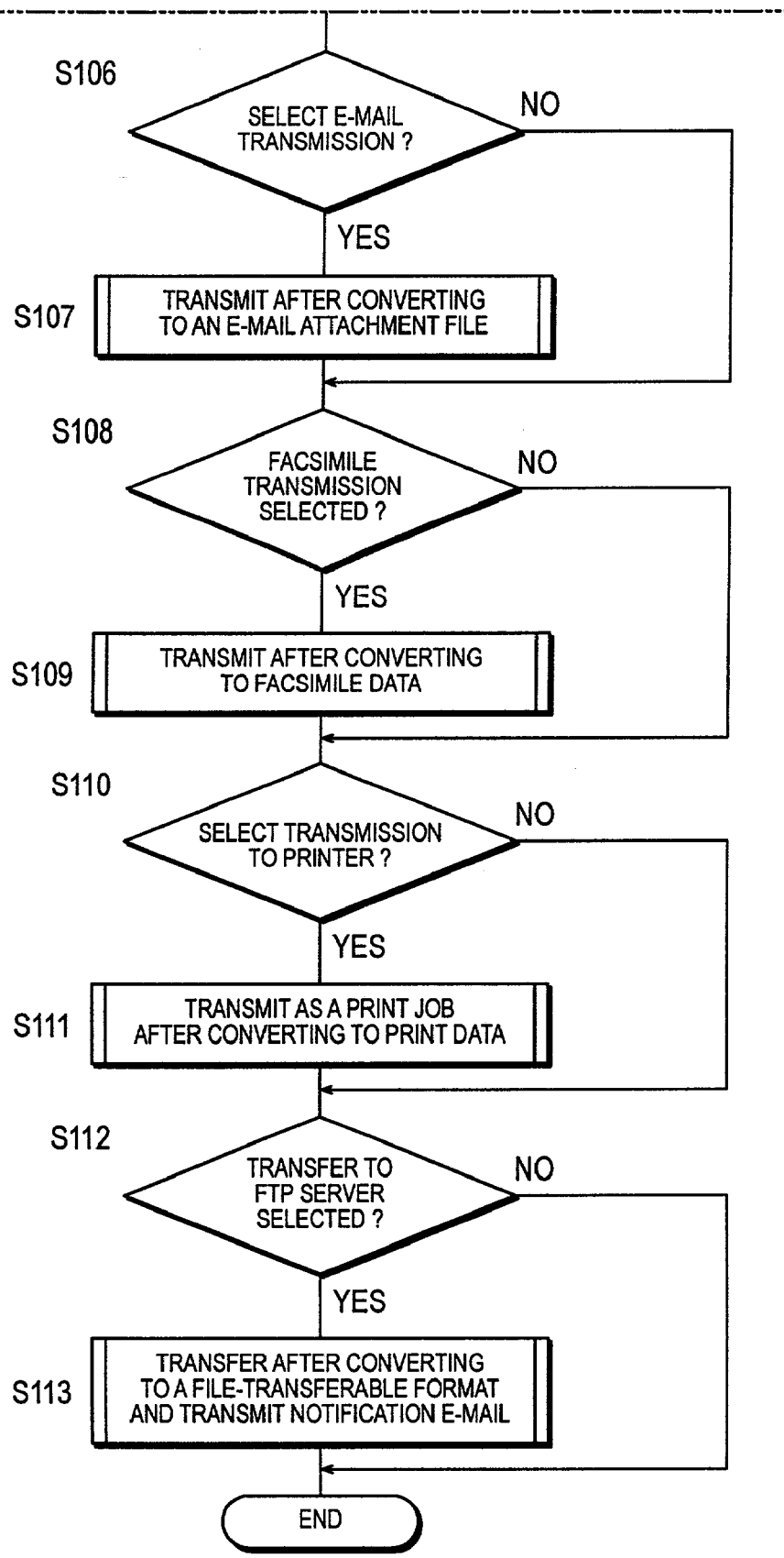

FIG. 22A and FIG. 22B are flowcharts of the multicasting process of the data communication apparatus 100 according to the second embodiment. The algorithm shown in the flowcharts of FIG. 22A and FIG. 22B is stored in the ROM 102 or the storage unit 103 as a control program, and is executed by the CPU 101.

When selection of various formats and destination attributes corresponding to different communication systems is completed in the step S100 (step S100: YES), the process of the step S101 is executed.

Figure 23:
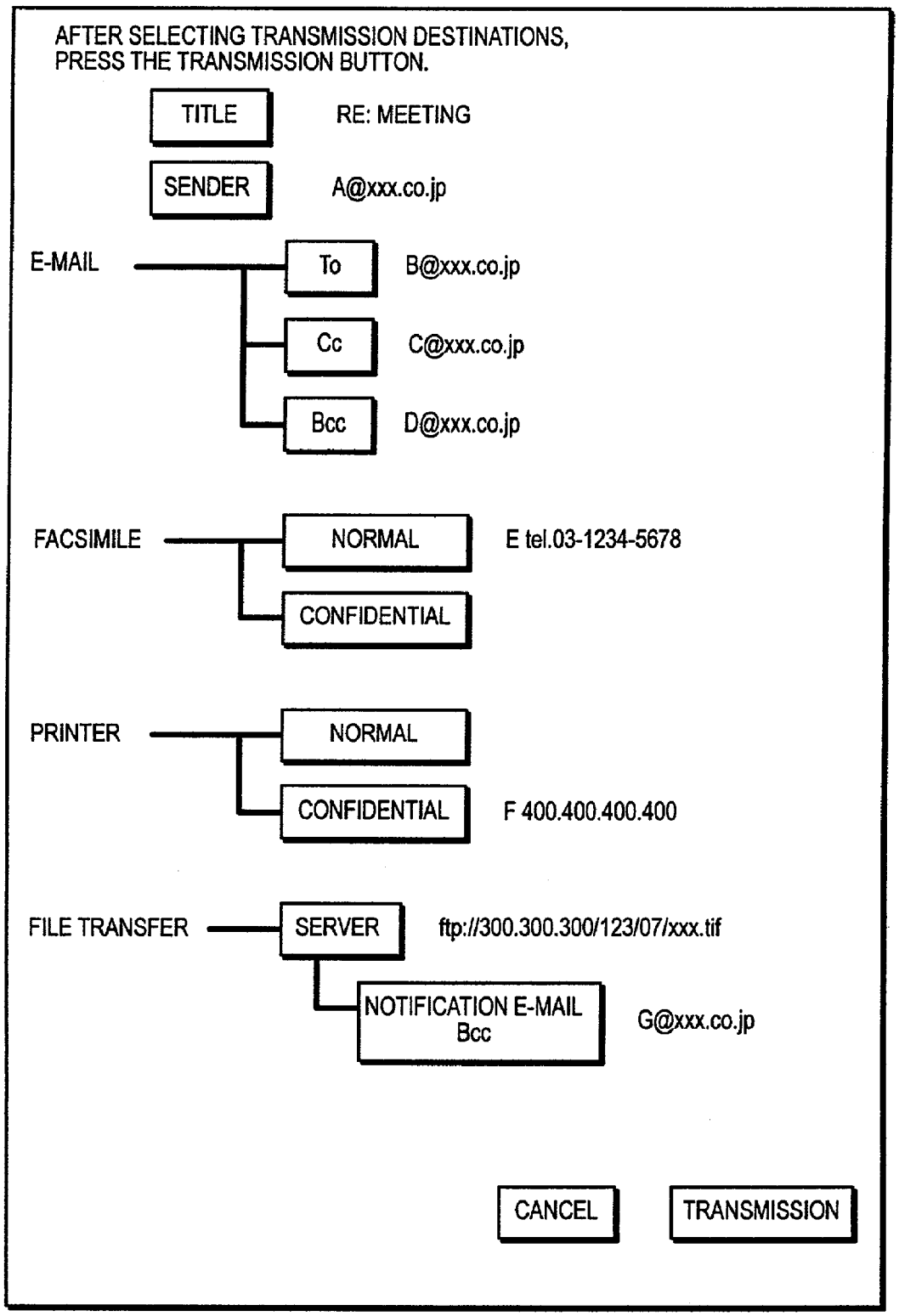
FIG. 23 shows an example of selection screen displayed on the operating panel of the data communication apparatus for selecting formats and types for multicasting.

FIG. 23 shows a selection screen for selecting destination attributes and various formats corresponding to different communication systems (hereinafter called "selection screen"). The selection screen is displayed on the operating panel 104. It is detected whether the area provided for each destination attribute is pressed in the selection screen.

More specifically, as for various formats corresponding to different communication systems, four kinds of communication, i.e., e-mail transmission, facsimile transmission, transmission to a printer, and file transfer, are available for selection by the user. As for the attributes of e-mail destinations, three types, i.e., To destination, Cc (carbon copy) destination, and Bcc (blind carbon copy) destination, are available for selection by the user. To destinations are basic destinations. Cc destinations are destinations to which e-mail with the same contents as those for the basic destinations are transmitted. Bcc destinations are destinations to which e-mail with the same contents as those for the basic destinations are transmitted without disclosing the fact of the transmission to other destinations.

The destinations of facsimile transmissions include the destinations to which normal facsimile transmissions are designated and the destinations to which confidential facsimile transmissions are designated. The destinations of print job transmissions include the destinations to which normal print transmissions are designated and the destinations to which confidential print transmissions are designated.

In the step S101, destinations such as e-mail addresses are inputted for each of the formats and attributes of destinations selected in the step S100. Furthermore, the information concerning image data to be transmitted (hereinafter called "properties") is inputted. When the input of destinations and properties is completed (step S101: YES), the process of the step S102 is executed.

Figures 24, 25:
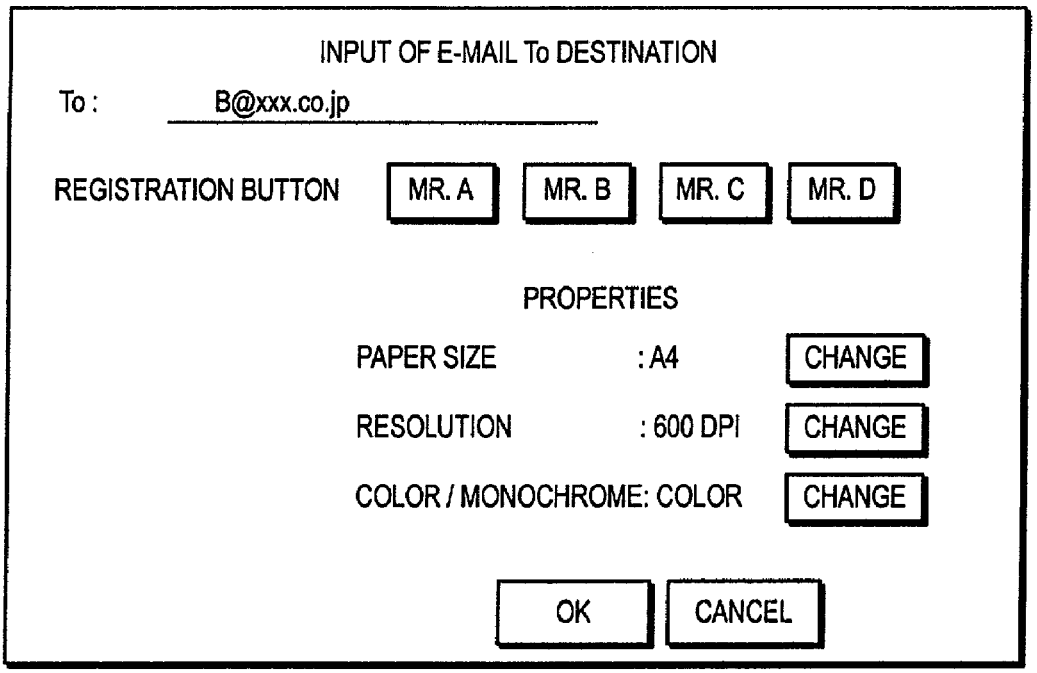
FIG. 24 shows an, example of input screen displayed on the operating panel of the data communication apparatus for entering a destination.
FIG. 25 shows an example of data table where multicasting destinations are stored.

When the To destination on the selection screen of FIG. 23 is designated, the input screen shown in FIG. 24 is displayed. The e-mail addresses corresponding to the e-mail To destinations are inputted on the input screen. It is possible to register destination information such as e-mail addresses of a plurality of recipients in advance. By doing so, the destination information can be inputted by pressing the registration button once.

The properties are inputted by means of the keyboard 105 on the same screen. The properties include paper size when printing is to be executed based on the image data being transmitted and the resolution of image data.

Destinations and properties are inputted on the input screen of FIG. 24 for each format and destination attribute selected on the selection screen of FIG. 23 in a similar manner as described above.

If e-mail transmission is selected, e-mail addresses are inputted as destinations. If facsimile transmission is selected, facsimile numbers are inputted as destinations. If printer transmission is selected, IP addresses for printers are inputted as destinations. If file transfer is selected, IP addresses for the FTP server are inputted. If file transfer is selected, a notification e-mail address is inputted separately as it is necessary to notify the user of the fact that the file is transferred and of the file transfer destination.

A judgment is made in the step S102 shown in FIG. 22A as to whether the transmission is instructed. When the transmission is instructed (step S102: YES), the process of the step S103 is executed. Specifically, the transmission is instructed when the transmission button is pressed on the selection screen shown in FIG. 23.

In the step S103, the document is read by the reading unit 106 to generate document image data.

In the step S104, a control code is issued each time a multicasting transmission is processed.

In the step S105, the destinations and properties for each multicasted data are stored in a data table by each control code. The storing location where the destination and properties are stored is the storage unit 103 of the data communication apparatus 100 in case of the second embodiment. However, different from the second embodiment, it is also possible to use as a storage location a device such as a server provided outside of the data communication apparatus 100.

FIG. 25 shows an example of the data table. E-mail addresses, facsimile numbers, and IP addresses for a plurality of communication destinations to which image data are multicasted as well as image data properties which are to be transmitted to each destination are stored attached with a control code, "123."

In the step S106, a judgment is made as to whether the e-mail transmission is selected. If the e-mail transmission is selected (step S106: YES), the process of the step S107 is executed; if the e-mail transmission is not selected (step S106: NO), the process of the step S107 is skipped.

In the step S107, an e-mail is prepared and the image data obtained in the step S103 is converted into the image file format data that is attachable to e-mail. The e-mail now attached with the image file is transmitted.

In the step S108, a judgment is made as to whether the facsimile transmission is selected. If the facsimile transmission is selected (step S108: YES), the process of the step S109 is executed; if the facsimile transmission is not selected (step S108: NO), the process of the step S109 is skipped.

In the step S109, the image data obtained in the step S103 is converted into the facsimile data and facsimile transmission is executed.

In the step S110, a judgment is made as to whether the transmission to printers is selected. If the transmission to printers is selected (step S110: YES), the process of the step Sill is executed; if the transmission to printers is not selected (step S110: NO), the process of the step S111 is skipped.

In the step S111, the image data obtained in the step S103 is converted into the print format data to be transmitted as a print job and is transmitted as a print job.

In the step S112, a judgment is made as to whether the file transfer to the FTP server is selected. If the file transfer is selected (step S112: YES), the process of the step S113 is executed; if the file transfer is not selected (step S112: NO), the process of the step S113 is skipped and the process is terminated.

In the step S113, the image data obtained in the step S103 is converted into the data format that is file-transferable to the FTP server, file-transferred, and the aforementioned e-mail for notification is transmitted.

The order of e-mail transmission, facsimile transmission, transmission to printers, and file transfer described above does not have to be the particular order shown in FIG. 22A and FIG. 22B, but can be arbitrarily changed. It is also possible to execute the process of reading the document in the step S103 prior to executing the processes for the steps S100 through S102.

Figure 26:
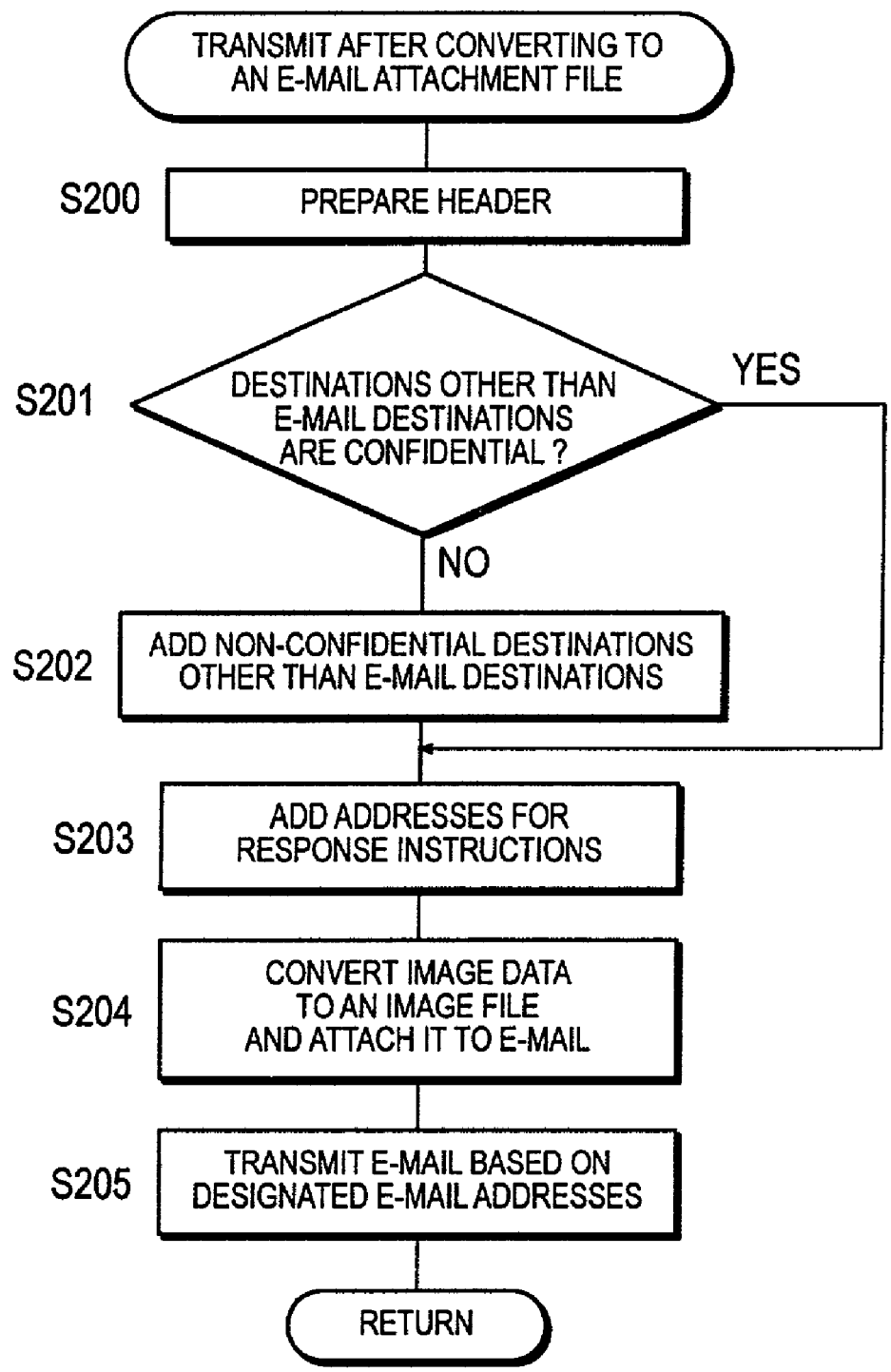
FIG. 26 is a flowchart of "transmit after converting to an e-mail attachment file" process of the step S107 in FIG. 22B.

FIG. 26 is a flowchart of the "transmit after converting to an e-mail attachment file" process of the step S107 in FIG. 22B.

In the step S200, the e-mail header is prepared. The settings of the To destination, the Cc destination, and the Bcc destination are similar to the case of normal e-mail, so that detail descriptions will not be repeated here.

In the step S201, a judgment is made as to whether the destinations corresponding to the formats other than the e-mail format are destinations where confidentiality is designated. In other words, a judgment is made whether they are the destinations ("confidential destinations") to which the data is transmitted without disclosing the fact of transmissions to other destinations. For the destinations except the confidential destinations (step S201: NO), the process of the step S202 is executed; for the confidential destinations (step S201: YES), the process of the step S202 is skipped. The confidential addresses include the addresses to which confidential facsimile output or confidential printing is designated as well as the Bcc destinations.

In the step S202, the destinations, which correspond to the formats other than the e-mail format and are not the confidential addresses, are added to the e-mail body. Consequently, the addresses that correspond to the formats other than the e-mail format are notified to the e-mail recipients. However, since the confidential addresses are not added to the e-mail body, confidentiality can be maintained.

In the step S203, the address information for instructing responses concerning the image data transmitted from the data communication apparatus 100 (hereinafter called "response instruction address") is added to the e-mail body. For example, the address information can be an address for making an access to the data table shown in FIG. 25.

In the step S204, image data is converted into a designated image file and is attached to an e-mail. For example, image data obtained by reading a document is converted into an image file of the JPEG format or the PDF (Portable Document Format) format. The image file is further converted by means of a mail extension function such as MIME (Multipurpose Internet Mail Extensions) into the ASCII code file before being attached to an e-mail.

In the step S205, e-mail is transmitted based on the designated e-mail addresses.

FIG. 27 shows an example of e-mail addressed to B, who is a "To" addressee of the multicasting transmission based on the data table shown in FIG. 25. FIG. 28 shows an example of e-mail addressed to D, who is a "Bcc" addressee. As can be seen from FIG. 25, an e-mail addressed to C's address, which is a Cc destination, also exists, but the description for it is omitted as it is substantially identical to the e-mail message shown in FIG. 27.

The facsimile number of E, which is a facsimile destination, is automatically added to the e-mail bodies shown in FIG. 27 and FIG. 28 as a destination that corresponds to a format other than the e-mail format. In reality, there also exists as shown in FIG. 25 a printer address for transmission to F, which is another destination that corresponds to a format other than the e-mail format. However, the transmission destination to F's printer is not added to the e-mail bodies shown in FIG. 27 and FIG. 28 as it is a confidential destination designated for confidential printing.

The e-mail contains a URL (Uniform Resource Locator) as the response instruction address. The URL contains the control code "123." The portions "02" and "04" following the control code "123" are identifiers for identifying individual destinations. The URL is preferably added in a format that contains link information such as hypertext. In such a case, it is arranged in such a way that the contents of the e-mail message are displayed on the screen so that the requesting party can be automatically connected by clicking the URL area. Different from the second embodiment, a non-URL style response instruction address can be used as well.

Figure 29:
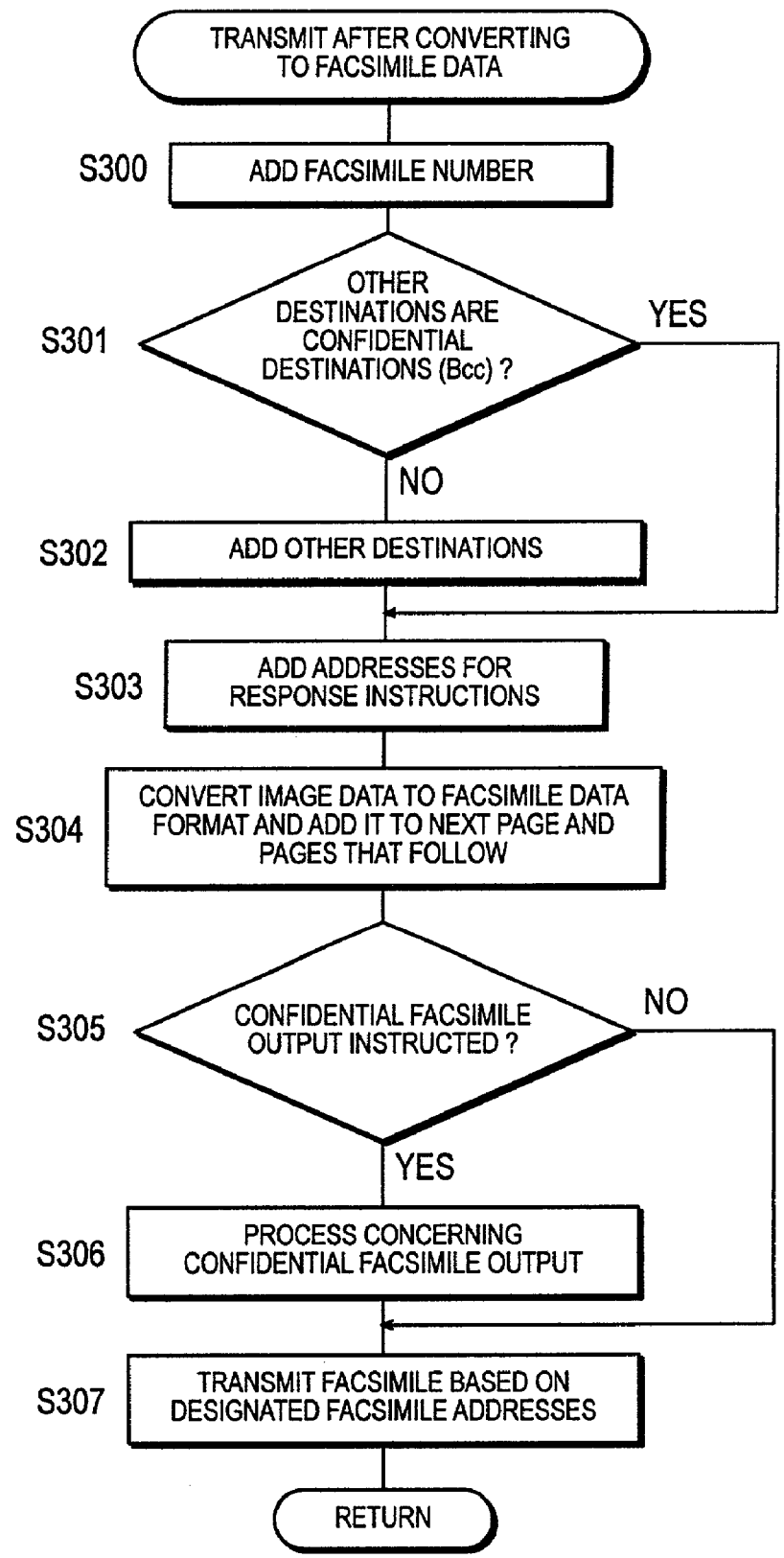
FIG. 29 is a flowchart of "transmit after converting to facsimile data" process of the step S109 in FIG. 22B.

FIG. 29 is a flowchart of "transmit after converting to facsimile data" process of the step S109 in FIG. 22B.

In the step S300, the facsimile number of the data communication apparatus 100, which is the transmission source of the facsimile data, and the facsimile number of the destination are added to the front-page of the facsimile data. The process of the step S300 is similar to the conventional process, so that its detail description is omitted.

In the step S301, a judgment is made as to whether the destinations corresponding to the formats other than the facsimile format are destinations where confidentiality is designated. For the destinations that are not the confidential destinations (step S301: NO), the process of the step S302 is executed; for the destinations that are the confidential destinations (step S301: YES), the process of the step S302 is skipped.

In the step S302, the destinations that correspond to the formats other than the facsimile format and are non-confidential destinations are added to the front page of the facsimile data. Therefore, the facsimile recipients are also notified of the destinations that correspond to the formats other than the facsimile format via facsimile transmissions. However, since the confidential destinations are not added to the front-page of the facsimile data, their confidentialities are maintained.

In the step S303, the response instruction address is added to the front-page of the facsimile data.

In the step S304, the image data is converted to the facsimile format data and is added to the next page and the pages thereafter. For example, the image data obtained by reading the document is converted into facsimile format data that corresponds to the G3 (Group 3) standard that can be used on an analog line or the high quality G4 (Group 4) standard that can be used on an ISDN line.

In the step S305, a judgment is made as to whether a confidential facsimile output is designated. If a confidential facsimile output is designated (step S305: YES), the process of the step S306 is executed; if a confidential facsimile output is not designated (step S305: NO), the process of the step S306 is skipped.

In the step S306, the process concerning the confidential facsimile output is executed.

In the step S307, the facsimile data is transmitted based on the designated facsimile number.

Figure 30:
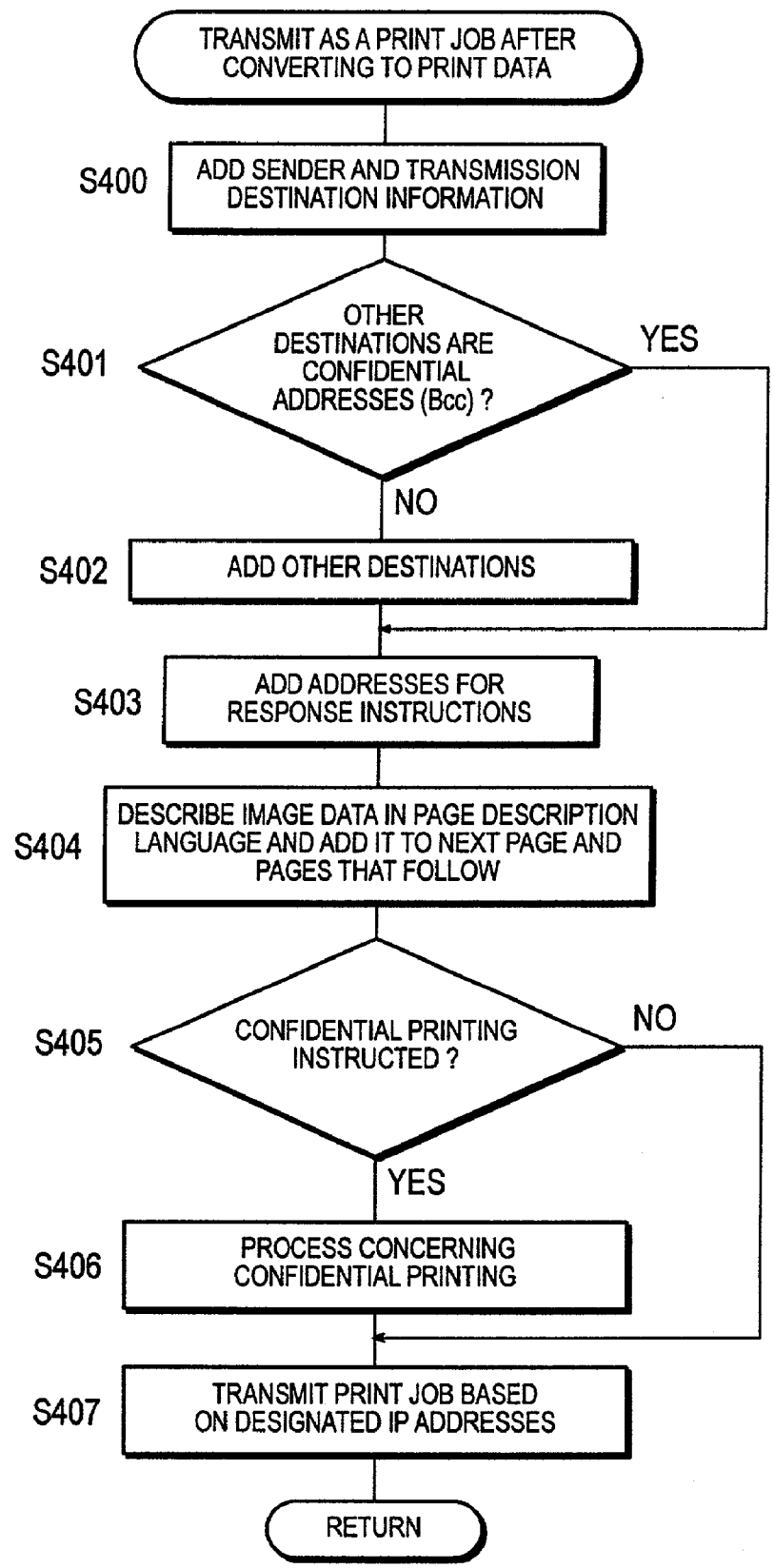
FIG. 30 is a flowchart of "transmit as a print job after converting to print data" process of the step Sill in FIG. 22B.

FIG. 30 is a flowchart of "transmit as a print job after converting to print data" process of the step Sill in FIG. 22B.

In the step S400, the IP address of the data communication apparatus 100, which is the transmission source of the print job, and the IP address of the transmission destination are added to the print data. If the IP address and the equipment name are related on the network, the equipment name can be displayed instead of the IP address.

The processes from the step S401 through the step S403 are identical to those of the processes from the step S301 through the step S303 shown in FIG. 29. In the step S404, the image data is converted to the print data. For example, the image data is described in the page description language and added to the next page and the pages thereafter. For example, PostScript® can be used as a page descriptive language.

In the step S405, a judgment is made as to whether confidential printing is designated. If confidential printing is designated (step S405: YES), the process of the step S406 is executed; if confidential printing is not designated (step S405: NO), the process of the step S406 is skipped.

In the step S406, the process concerning the confidential printing is executed.

In the step S407, the print job is transmitted to the printer 300 that corresponds to the designated IP address.

FIG. 31 shows an example of facsimile data transmitted by multicasting based on the data table shown in FIG. 25.

On the front-page of the facsimile data, the e-mail addresses of B and C, which are the e-mail To destination and the Cc destination respectively, are added automatically as the addresses that correspond to the formats other than the facsimile format. In reality, there also exists as shown in FIG. 25 a printer address for transmission to F and an e-mail address, i.e., which is D's Bcc destination, both of which are destinations that correspond to formats other than the facsimile format. However, these destinations are not added to the facsimile data shown in FIG. 31 as they are confidential destinations. Moreover, the front-page of the, facsimile data contains a URL (Uniform Resource Locator) as the response instruction address.

FIG. 32 shows an example of print data that is transmitted based on the data table of FIG. 25. E-mail addresses and facsimile addresses are added to the front-page as addresses corresponding to formats other than the print data format in the same way as FIG. 31. Furthermore, a URL is added to the front-page as the response instruction address. The "123" portion of the URL shown in FIG. 31 and FIG. 32 denotes the control code and the portions "05" and "06" following the control code "123" are identifiers attached for identifying individual destinations.

Figure 33:
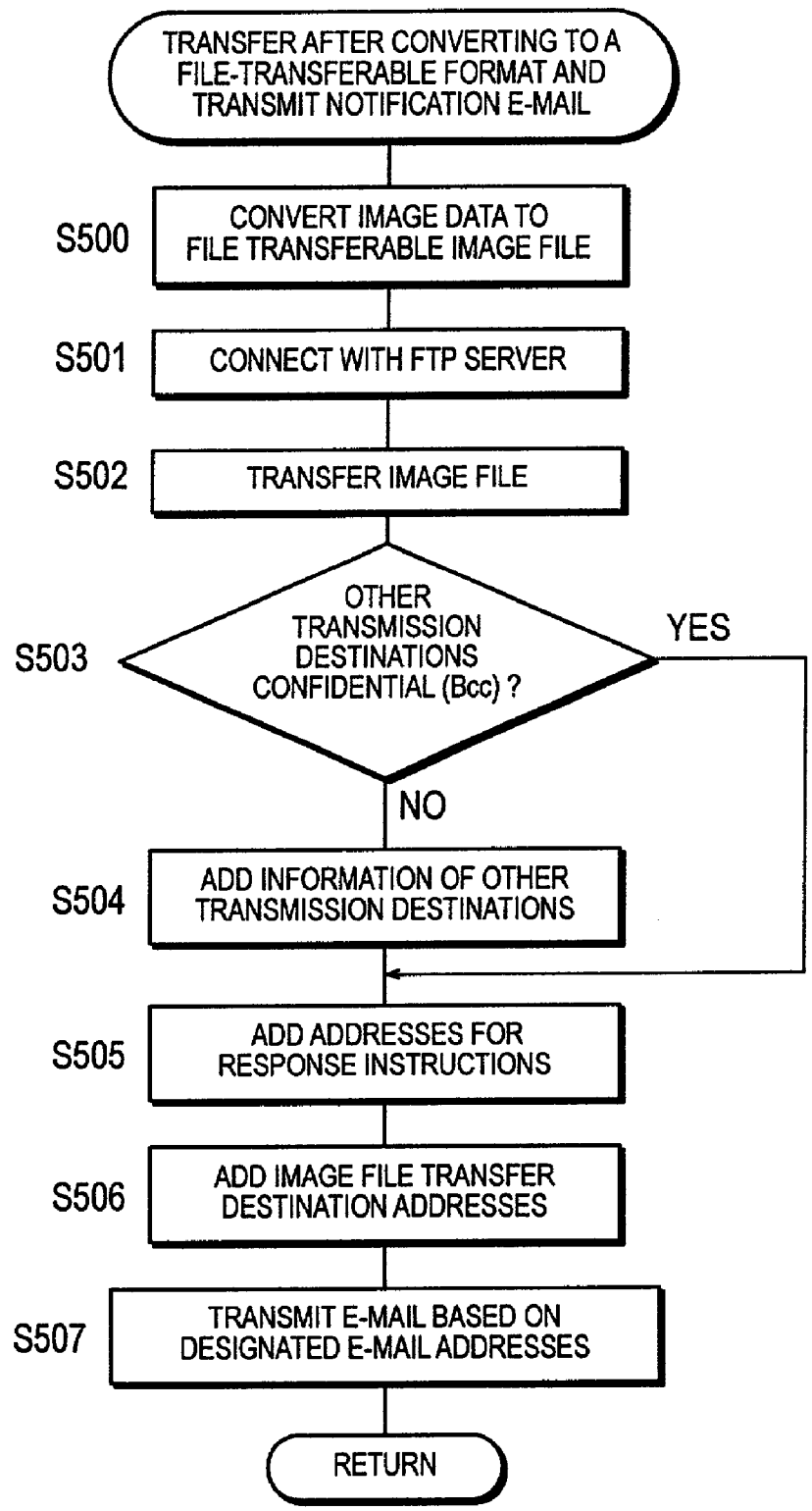
FIG. 33 is a flowchart of "transfer after converting to a file-transferable format and transmit notification e-mail"process of the step S113 in FIG. 22B.

FIG. 33 is a flowchart of "transfer after converting to a file-transferable format and transmit notification e-mail" process of the step S113 in FIG. 22B.

In the step S500, the image data is converted to an image file of a file transfer format such as a GIF (Graphics Interchange Format) file or a TIFF (Tagged Image File Format) file.

In the step S501, a communication connection is established with the FTP server 500.

In the step S502, the image file is transferred to the FTP server 500.

The steps S503 through the step S507 constitute the process of preparation and transmission of the notification e-mail. In the step S503, a judgment is made as to whether an address that corresponds to a format other than the format for the file transfer to the FTP server is a confidential address. If the address is not a confidential address (step S503: NO), the process of the step S504 is executed; if it is a confidential address (step S503: YES), the process of the step S504 is skipped.

The processes of the step S504 and the step S505 are similar to the processes of the step 202 and the step S203 shown in FIG. 26, their descriptions are omitted here.

In the step S506, the address of the FTP server 600, which is the destination of the image file transfer, is added to the notification e-mail body. Thus, the user can be notified of the fact that the image file was transferred to the FTP server 600.

In the step S507, the notification e-mail is transmitted based on the designated e-mail address.

FIG. 34 shows an example of notification e-mail addressed to G in a multicasting transmission based on the data table shown in FIG. 25. In the second embodiment, the destination of the notification e-mail is processed as a Bcc destination. The notification e-mail body is added automatically with the addresses corresponding to formats other than the format of the file transfer to the FTP server and also with the URL as the response instruction address.

A case of transmitting the notification e-mail at the time of the file transfer to the FTP server 500 was described in the above with reference to FIG. 33. However, different from the second embodiment, it can be constituted in such away that the FTP server 500 is notified only of the destination e-mail address of the notification e-mail transmission and the FTP server 500 transmits the notification e-mail to the destinations.

As described in the above, the multicasting process according to the second embodiment transmits the image data obtained by reading the document after converting them into data of a plurality of formats such as the e-mail attachment file format and the facsimile data format according to the communication systems, to which the designated destinations correspond. During this process, the destination of each multicasted data is stored. Moreover, the multicasted data will be automatically added with the response instruction address for the data.

Next, the process of multicasting response concerning the second embodiment will be described.

Figures 35, 35A:
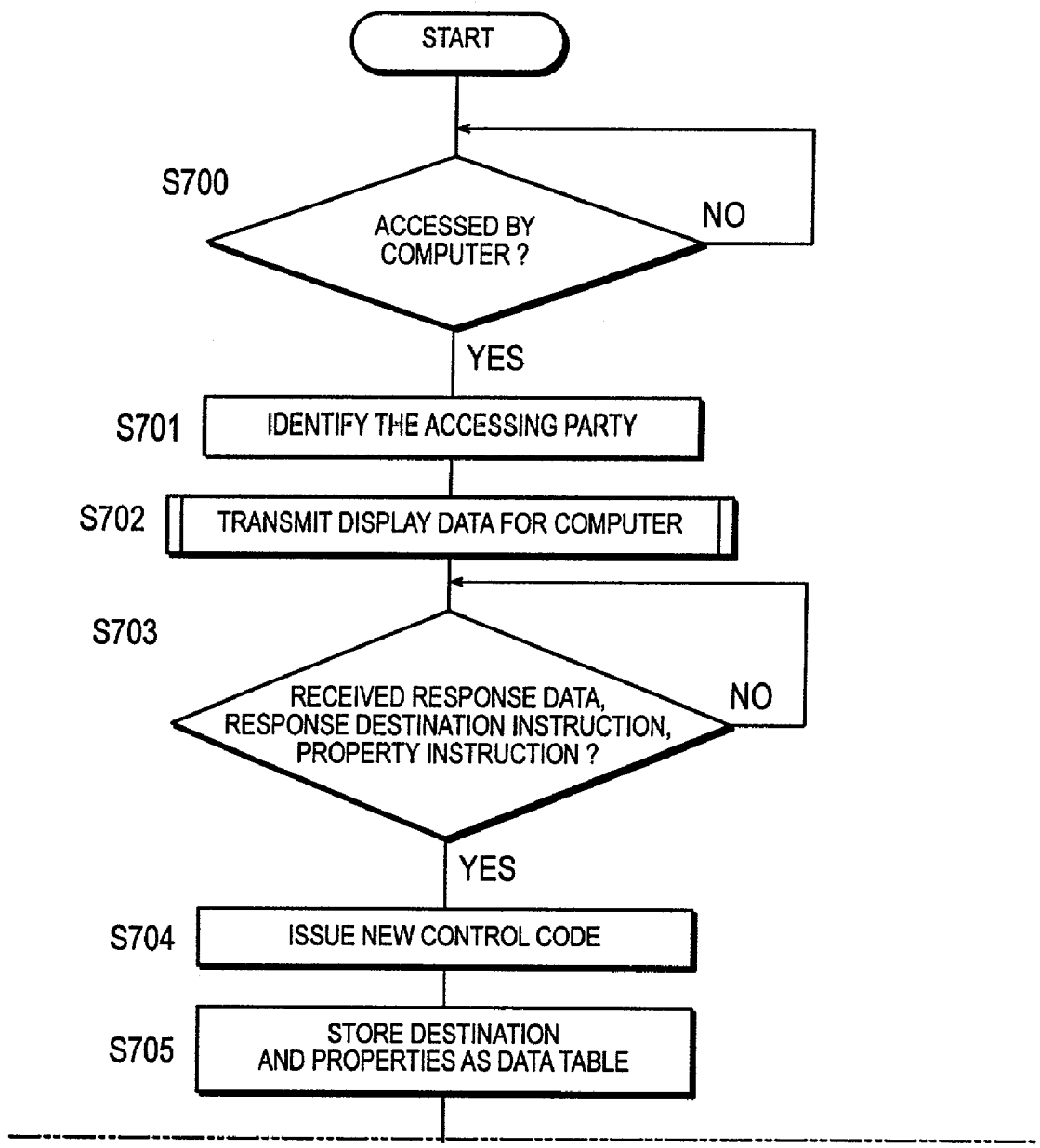
FIG. 35A and FIG. 35B are flowcharts of multicasting process of the data communication apparatus according to the second embodiment.
Figure 35B:
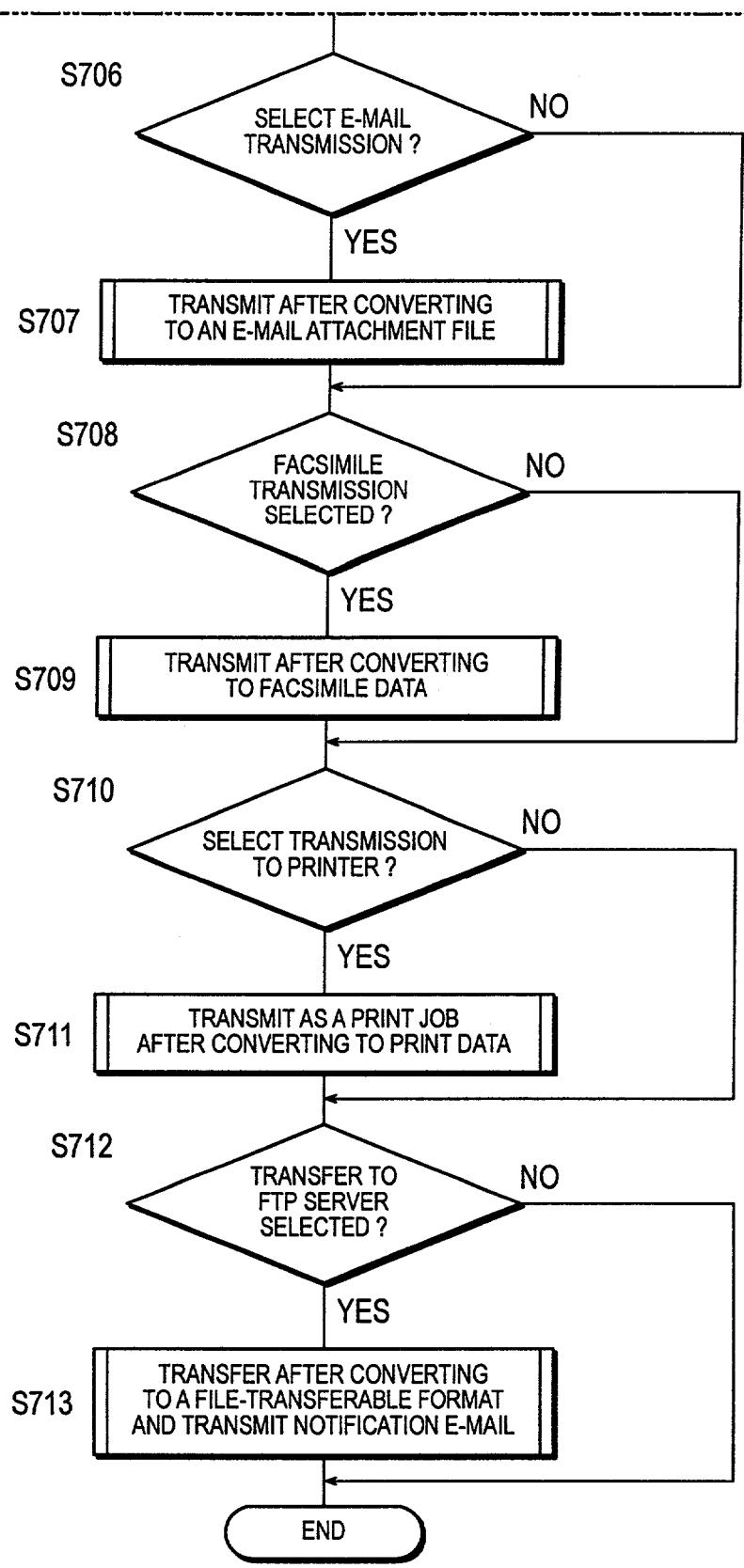

FIG. 35A and FIG. 35B are flowcharts of the multicasting response of the data communication apparatus according to the second embodiment. The algorithm shown in the flowcharts of FIG. 35A and FIG. 35B is stored as a control program in the ROM 102 or in the storage unit 103 and executed by the CPU 101.

In the step S700, a judgment is made whether the response instruction address is accessed by the computers 200a, 200b or 200c (hereinafter integrally called "computer 200"). In other words, it is judged whether the data response is instructed by the computer 200. When the response instruction address is accessed (step S700: YES), the process of the step S701 is executed.

Moreover, when the computer 200 receives the e-mail attached with the image file via the mail server 400, it can access the response instruction address based on the URL attached to the e-mail body. When the printer 300 or the facsimile machine 600 receives the image data, the recipient can find out the response instruction address from the printout. Moreover, the recipient can use the browser of the computer 200 and enter the URL through the input device 205 to let the computer 200 to access the designated response instruction address.

In the step S701, the party who is making an access is identified. In other words, the party who made an access is identified based on the recipients of the multicasting of the image data converted into several formats. More specifically, the URL is obtained during the access, and the control code and the identifier contained in the URL are identified. As a result of this identification, the party who made an access can be identified. For example, a data table is recognized by the control code "123" shown in FIG. 25, and the party who made the access can be identified by such a reasoning that the access was made by A who is the originator of the multicasting of the image data using the data communication apparatus 100 if the identifier is "01" or that the access was made by B who is an e-mail To destination if the identifier is "02."

In the step S702, the display data is prepared. The prepared display data is transmitted to the computer 200, which made the access.

In the step S703, a response data concerning the multicasted image data, an instruction for the response destinations of the response data, an instruction for properties of the response data to be transmitted to each response is received from the computer 200, which is the responding party, are received. When the information is received (step S703: YES), the process of the step S704 is executed. The properties of the response data include the paper size if printing is to be performed based on the response data to be transmitted to each response destination, and the resolution of the response data to be transmitted.

In the step S704, a new control code is issued for each response to be multicasted. As signing a new control code of "123-1" to the multicasting response, which is a response to a multicasted message with a control code of "123," makes it easy to be identified that it is a multicasting response to the multicasted message with the control code of "123."

The processes of the step S705 through the step S713 are substantially similar to those of the steps S105 through S113 shown in FIG. 22A and FIG. 22B. However, the process shown in FIG. 35A and FIG. 35B as one is a process based on the response data received from a transmission destination of the multicasted image data, while the process shown in FIG. 22A and FIG. 22B in a body is the process based on the image data obtained by reading the document. The received response data is converted into a plurality of types of data formats. The conversion includes the conversion into the attached file format for transmitting it by e-mail, the conversion into the facsimile format for facsimile transmission, the conversion into the page description language format for transmitting it as a print job, and the conversion to the file format for file transfer. The response data converted into a plurality of types of data formats are multicasted to response recipients.

Figure 36:
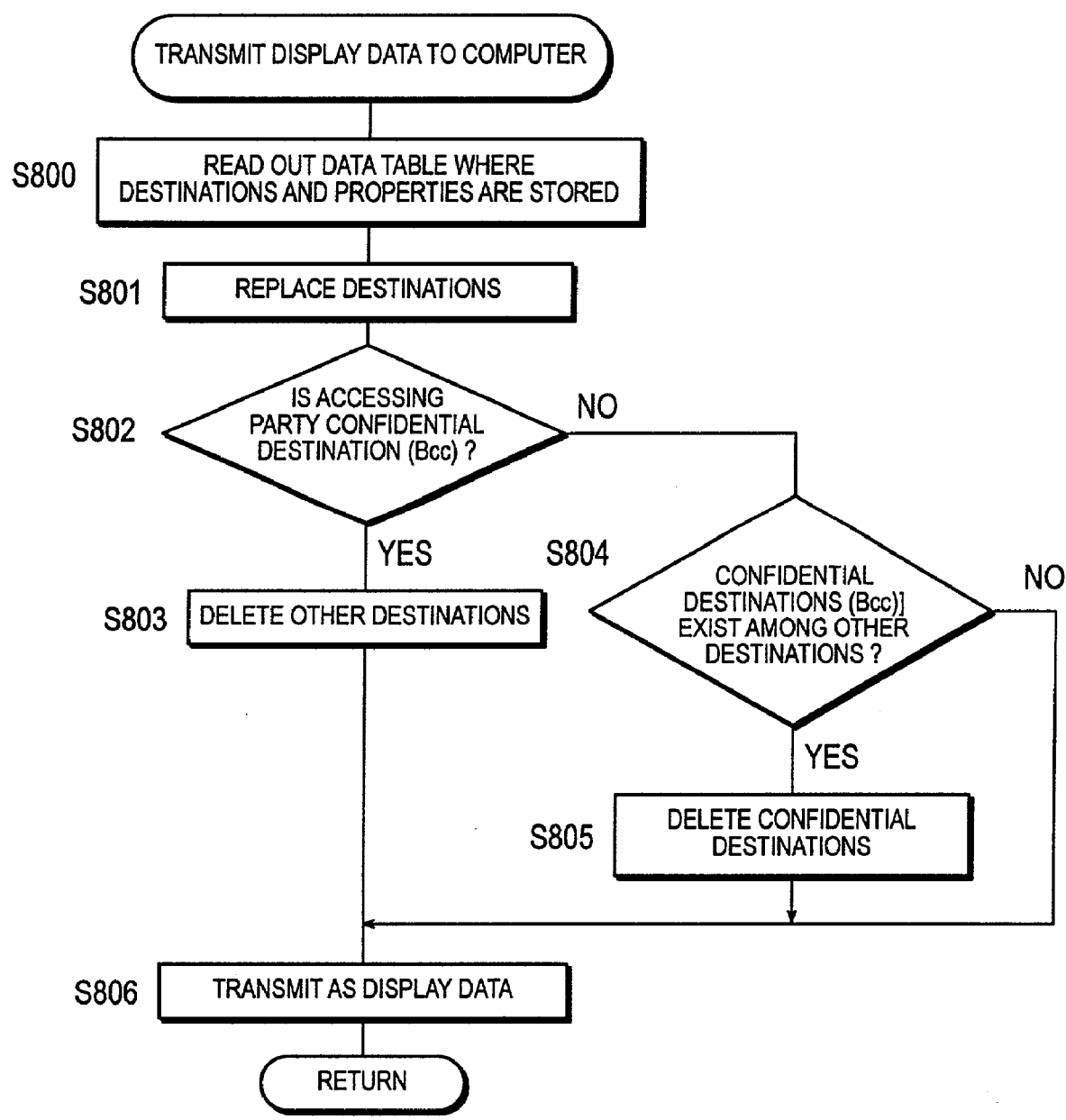
FIG. 36 is a flowchart of "transmitting display data to computers" process of the step S702 in FIG. 35A.
Figure 37:
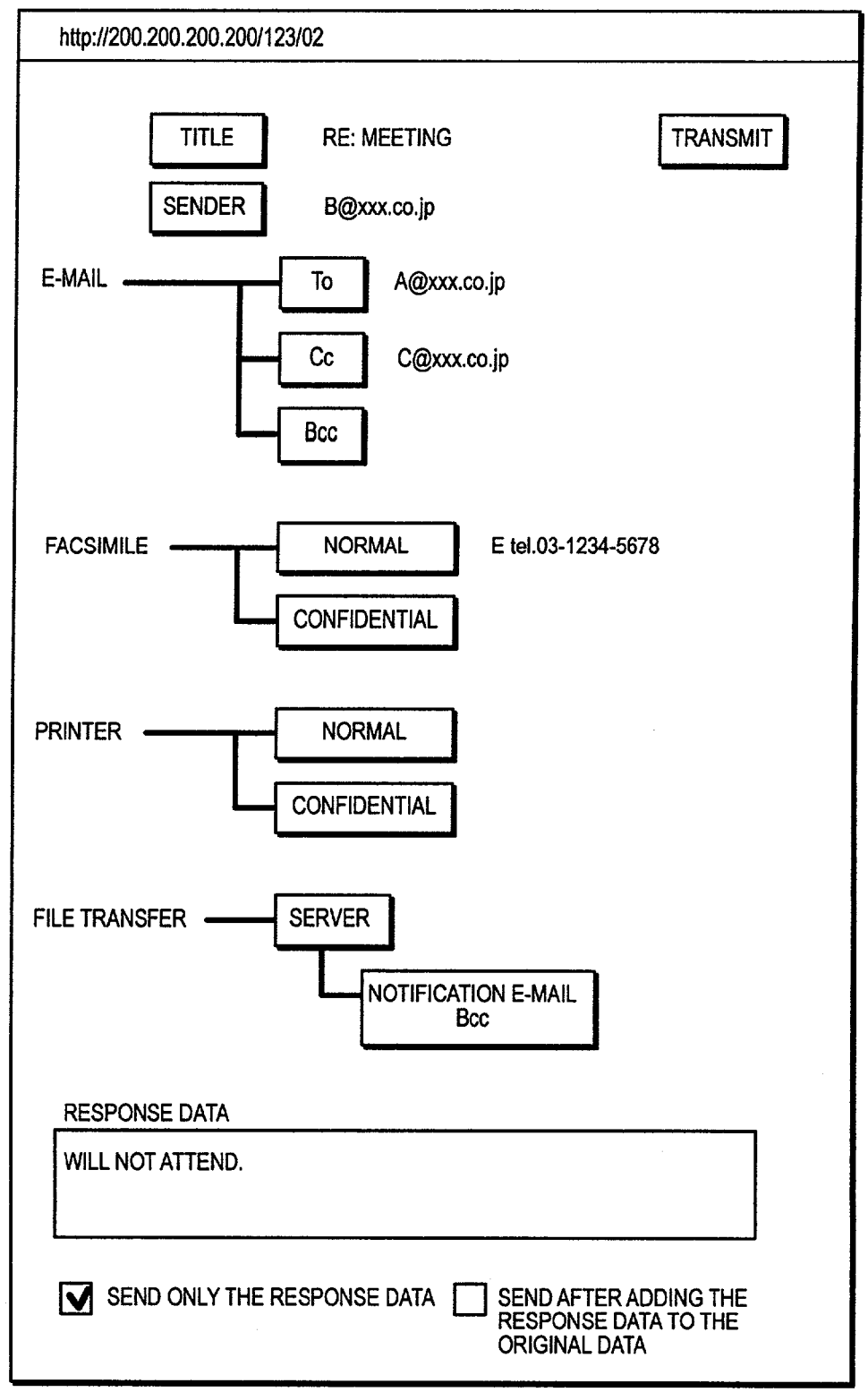
FIG. 37 shows an example of response data designating screen for e-mail "To" destinations to be displayed on computer display for designating response data and response destinations.
Figure 38:
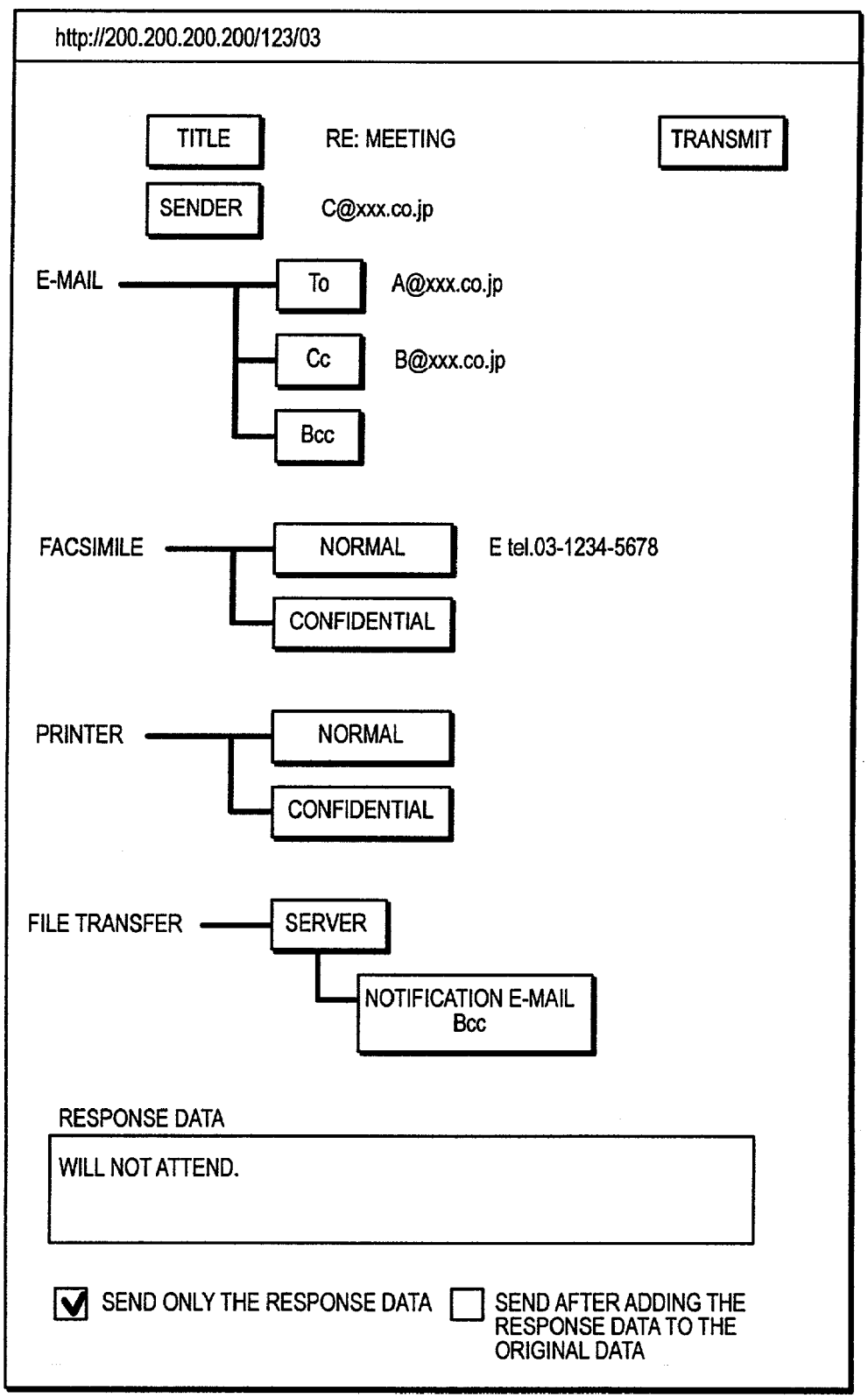
FIG. 38 shows an example of response data designating screen fore-mail "Cc" destinations to be displayed on computer display for designating response data and response destinations.
Figure 39:
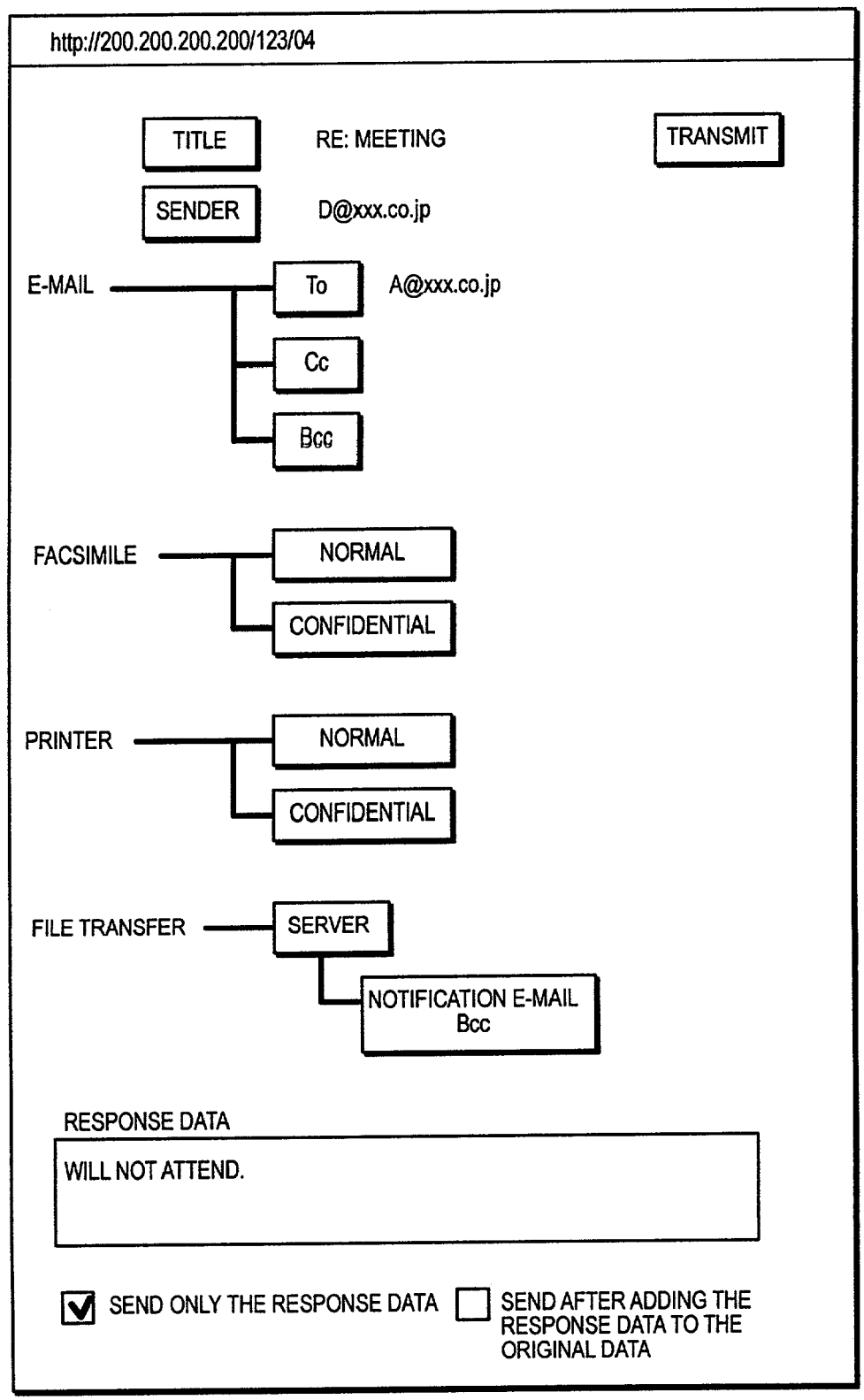
FIG. 39 shows an example of response data designating screen for e-mail "Bcc" destinations to be displayed on computer display for designating response data and response destinations.
Figure 40:
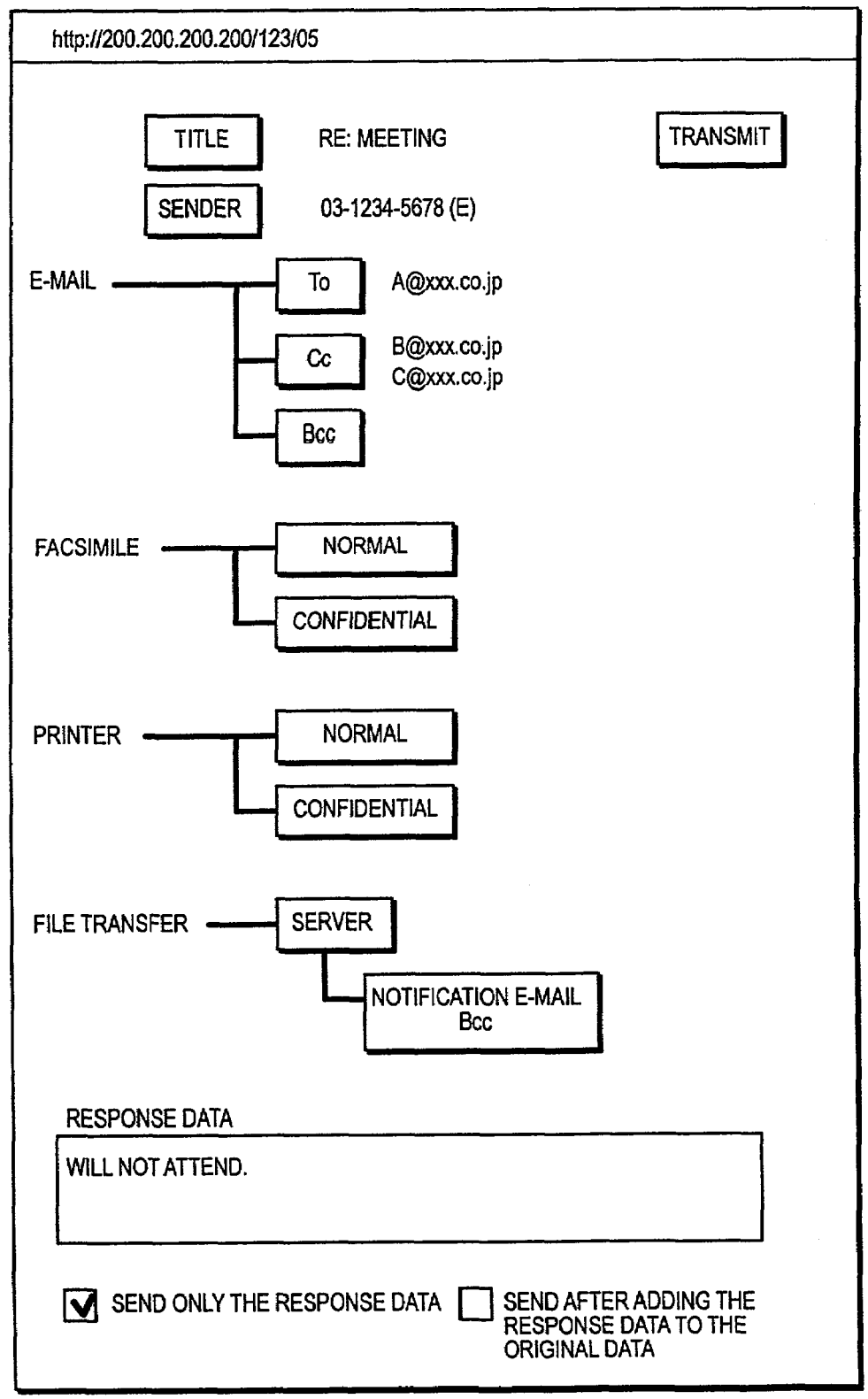
FIG. 40 shows an example of response data designating screen for normal facsimile destinations to be displayed on computer display for designating response data and response destinations.
Figure 41:
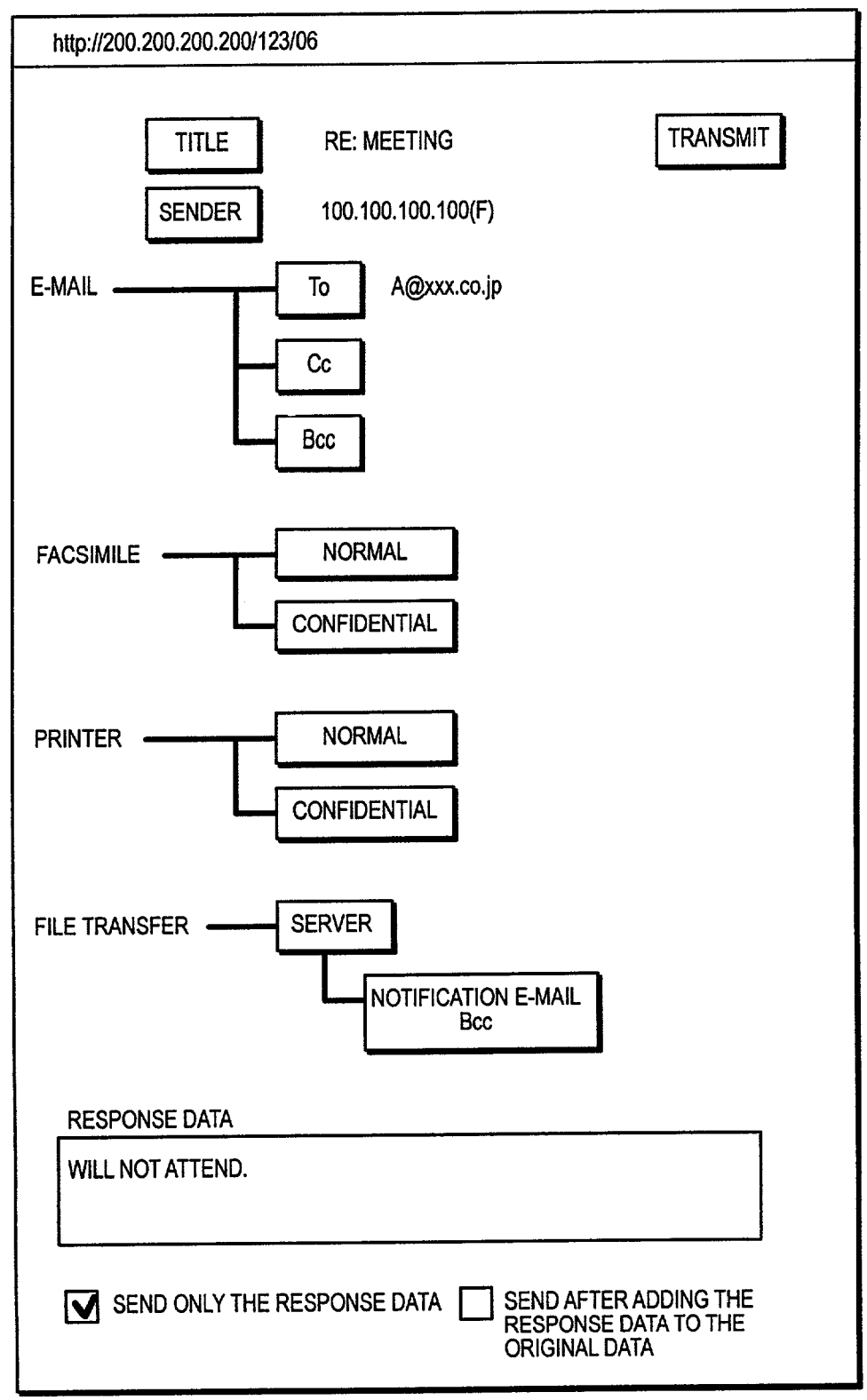
FIG. 41 shows an example of response data designating screen for confidential printer destinations to be displayed on computer display for designating response data and response destinations.
Figure 42:
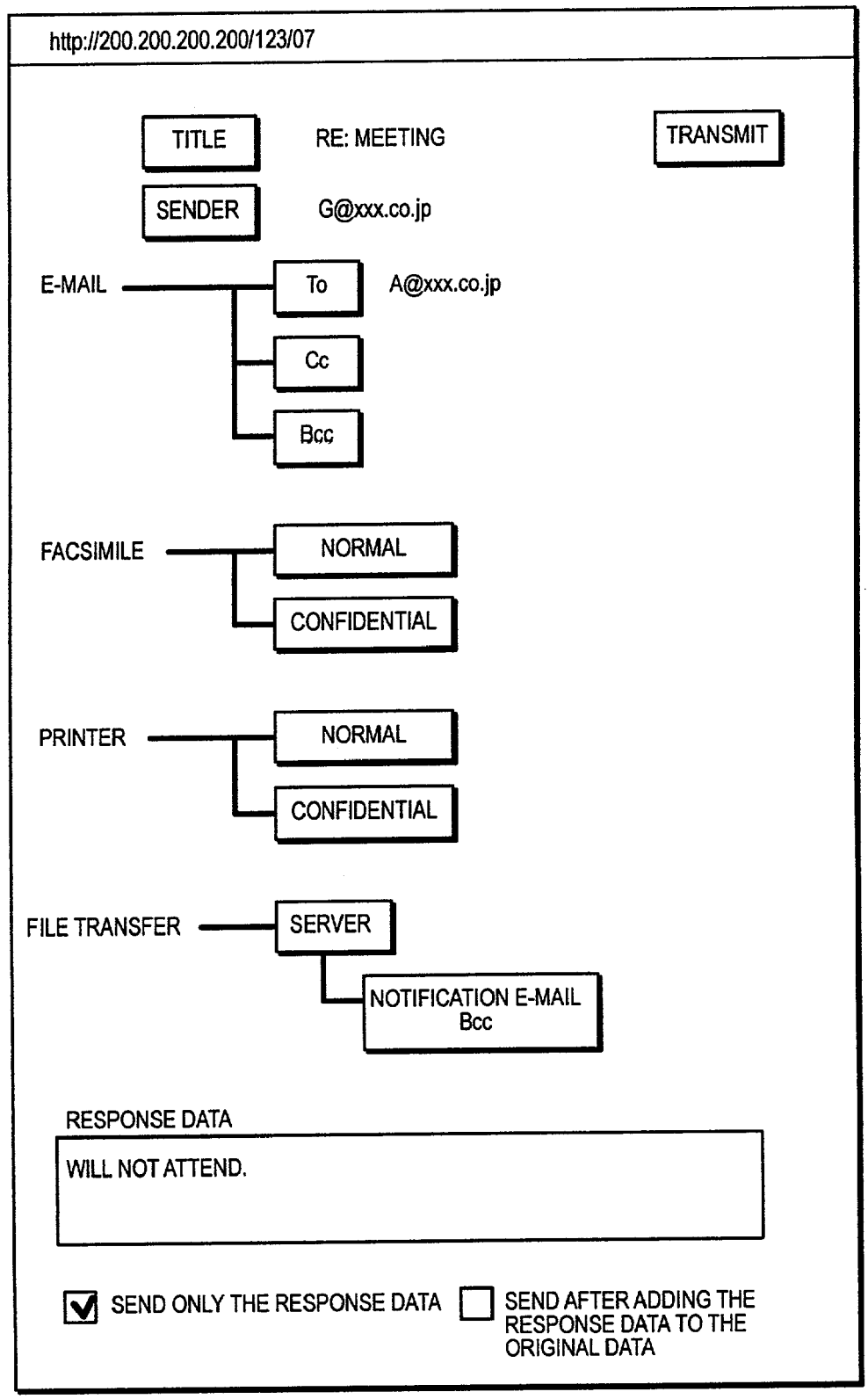
FIG. 42 shows an example of response data designating screen for file transfer notification e-mail destinations to be displayed on computer display for designating response data and response destinations.

FIG. 36 is a flowchart of "transmitting display data to computers" in the step S702 of FIG. 35A. The display data for computers are data for instructing the computers the response data multicasting destinations available, i.e., the range that can be designated as the response recipients and for displaying a response data instruction screen. The response data instruction screen is the screen for inputting the response data and instructing the response destinations.

FIG. 37 through FIG. 43 show examples of response data instruction screen to be displayed on the display unit 204 based on the display data transmitted to the computer 200 in the multicasting response to the multicasting transmission based on the data table shown in FIG. 25.

The flowchart of FIG. 36 will be described below comparing the response data instruction screens shown in FIG. 37 through FIG. 43 with the selection screen shown in FIG. 23 mentioned above.

In the step S800, the data table shown in FIG. 25 storing the destination and the properties for each control code (e.g., "123") is read out.

In the step S801, the destinations are replaced according to the data table. More specifically, the addresses of the parties who accessed the response instruction address are added to the "sender" field as shown in FIG. 37 through FIG. 43, while the original sender's address becomes the To destination.

In the step S802, a judgment is made whether the party who made an access to the response instruction address is a confidential address. If the address of the party who made an access to the response instruction address is a confidential address (step S802: YES), the process of the step S803 is executed; if it is not a confidential address (step S802: NO), the process of the step S804 is executed.

In the step S803, other addresses are deleted. For example, as can be seen clearly by comparing the screens of FIG. 39 and FIG. 41 with the selection screen of FIG. 23, all other addresses except the e-mail address of A, who is the original sender.

In the step S804, a judgment is made as to whether there are any confidential addresses contained in other addresses. If there are any confidential addresses contained in other addresses (step S804: YES), the process of the step S805 is executed.

In the step S805, confidential addresses contained in other addresses are deleted. For example, as can be seen clearly by comparing the screens of FIG. 37, FIG. 38, and FIG. 40 with the selection screen of FIG. 23, the e-mail address of D, who is an e-mail Bcc destination, as well as the IP address of the destination F, to which confidential printing is instructed.

Figure 43:
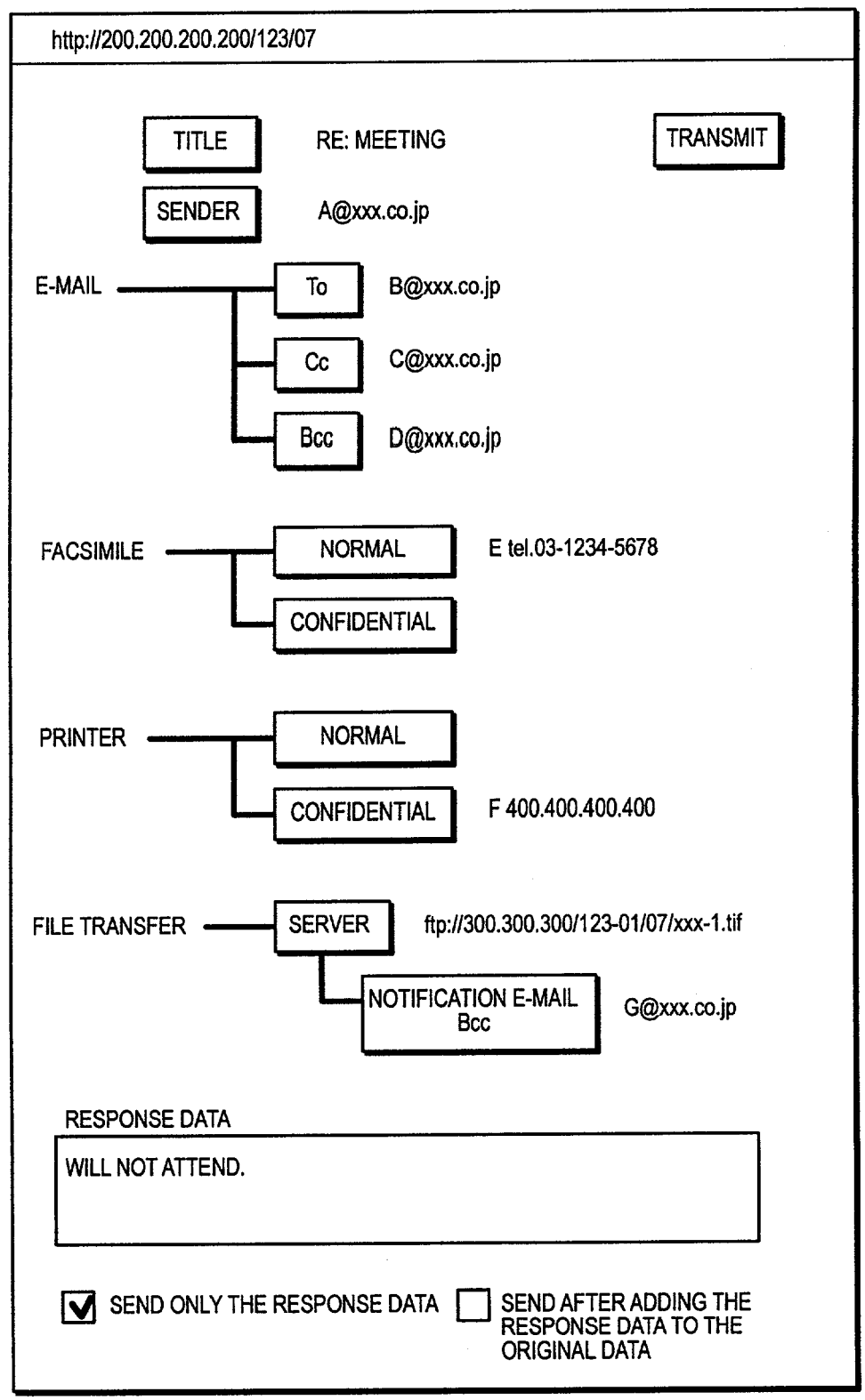
FIG. 43 shows an example of response data designating screen for the original transmitter to be displayed on computer display for designating response data and response destinations.

In the step S806, display data prepared by the processes of the step S800 through the step S805 are transmitted to the parties who made accesses to the response instruction address. FIG. 43 shows a display data in case the party who accessed the response instruction address is A, who is the original sender. In order for the original sender can respond to all the destinations, the response shown in FIG. 43 contains information for all the addresses.

FIG. 44 shows an example of e-mail for multicasting response data obtained from the destinations the image data was originally multicasted to. Since there is a possibility that the response data may be further responded, the URL is added as a new response instruction address. The URL contains a new control code "123-1." The "02" portion following the control code "123-1" is an identifier to be added for each destination.

The process shown in FIG. 36 can be realized by activating a program based on, for example, the CGI (Common Gateway Interface) technology, for retrieving the data table shown in FIG. 25 in response to the request by the browser installed in each-computer 200.

The flow chart of FIG. 36 shows a case when the data communication apparatus 100 prepares and transmits a display data based on the data table shown in FIG. 25. Different form the second embodiment, however, it is possible to transmit the data stored as the data table shown in FIG. 25 and prepares a display data by the computer 200 using it.

Figure 45:
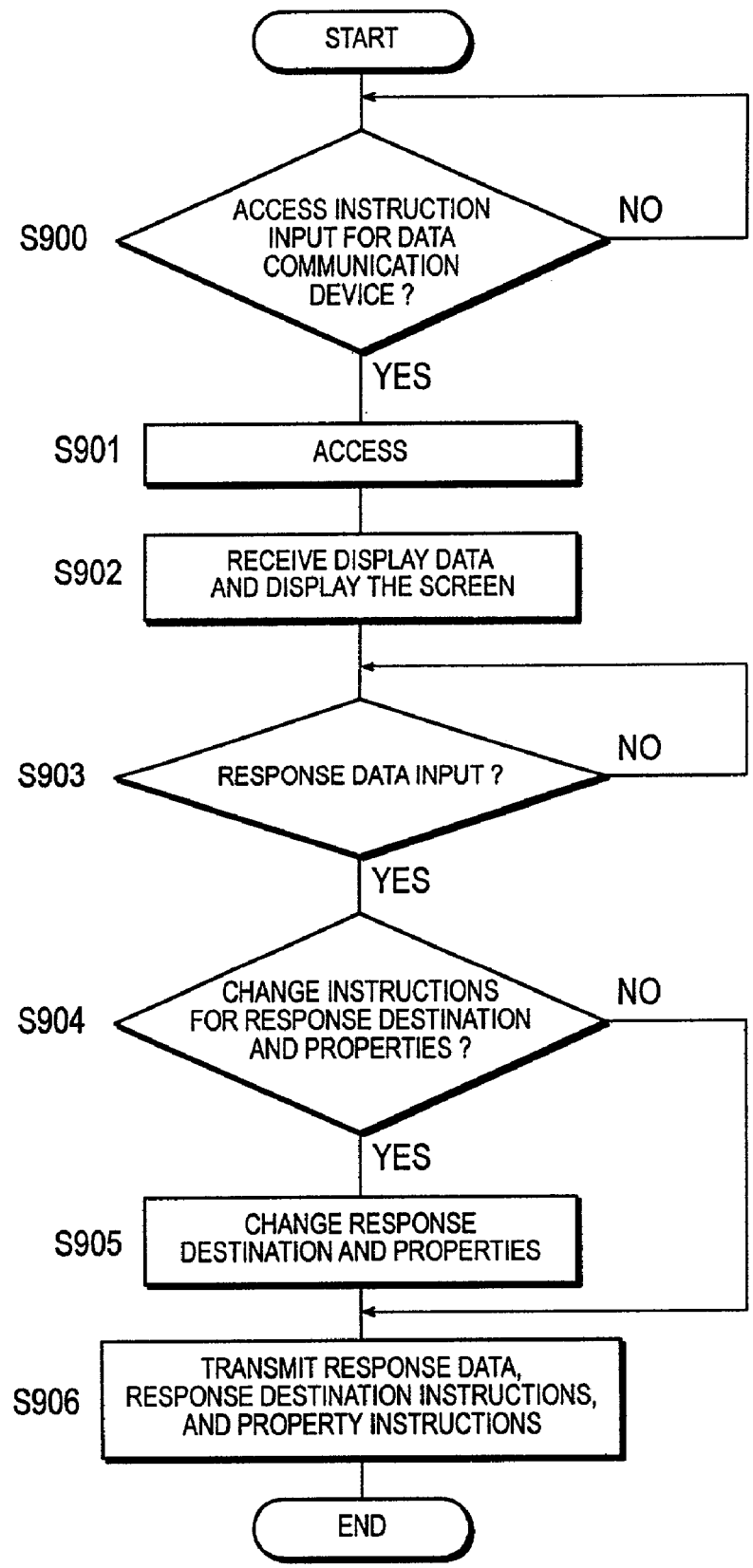
FIG. 45 is a flowchart of a computer according to the second embodiment.

Next, the computer processing of instructing a response and transmitting the response data in response to the multicasted image data will be described referring to FIG. 45 and using a case as an example where the computer 200a is to instruct a response.

In the step S900, a judgment is made whether an access instruction is inputted into the data communication apparatus 100. When the access instruction is inputted (step S900: YES), the process of the step S901 is executed. For example, it is judged that an access instruction is inputted when clicking of the URL area (link area) that corresponds to the response instruction address is detected while the e-mail transmitted by the data communication apparatus 100 via the mail server 400 (see FIG. 27 and FIG. 28) is displayed on the display unit 204.

In the step S901, the data communication apparatus is accessed.

In the step S902, the display data is-received and the response data instruction screens shown in FIG. 37 through FIG. 43 are displayed on the display unit 204.

In the step S903, a judgment is made as to whether the response data is inputted. When the response data is inputted (step S903: YES), the process of the step S904 is executed. The response data is inputted into the input column of the response data on the response data instruction screens shown in FIG. 37 through FIG. 43 using the input device 205. It is also possible to attach an image file, etc., as the response data.

In the step S904, a judgment is made whether changes of the response destination for the response data or the properties are instructed. If a change is instructed (step S904: YES), the process of the step S905 is executed; if no change is instructed (step S904: NO), a response destination is automatically selected from a plurality of transmission destinations to which the image data is originally multicasted. The process of the step S906 is executed as is.

In the step S905, the response destination and the properties of the response data are newly instructed. For example, corresponding areas are clicked on the response data instruction screen shown in FIG. 37. As a result, a screen similar to the input screen shown in FIG. 24 is displayed. The response destination for the response data can be updated by adding or deleting the response destinations on the input screen. Moreover, the printing properties for printing the response data such as paper size and resolution can also be updated for each response destination of the response data. Thus, the user can add new response destinations as the user wishes. Therefore, the response destination can include a portion or all of the destinations to which the image data was originally transmitted.

In the step S906, the response data, the instruction for the response destination, and the instruction for the properties such as paper size and resolution for printing the response data are transmitted to the data communication apparatus 100 for each response transmission as the transmission button is clicked on the response data instruction screen shown in FIG. 37 through FIG. 43.

As shown in the above, even in case of multicasting the data converted into a plurality of formats, the second embodiment enables it to multicast the response data concerning the data.

Next, the third embodiment according to the present invention will be described.

In the second embodiment, it is necessary to use a computer to instruct the response for multicasted data if the data is received by a facsimile machine. On the other hand, different from the second embodiment, it is possible to transmit the response data for multicasted data directly from the facsimile machine to the data communication apparatus in case of the third embodiment.

Since the construction of the data communication system in the third embodiment including the data communication apparatus, computers, the mail server, the FTP server, printers, and facsimile machines is identical to the construction shown in FIG. 17 through FIG. 21, its description is omitted here. Members that are identical to those in the second embodiment are identified by using the same signs.

Next, the multicasting process will be described.

Figures 46, 46A:
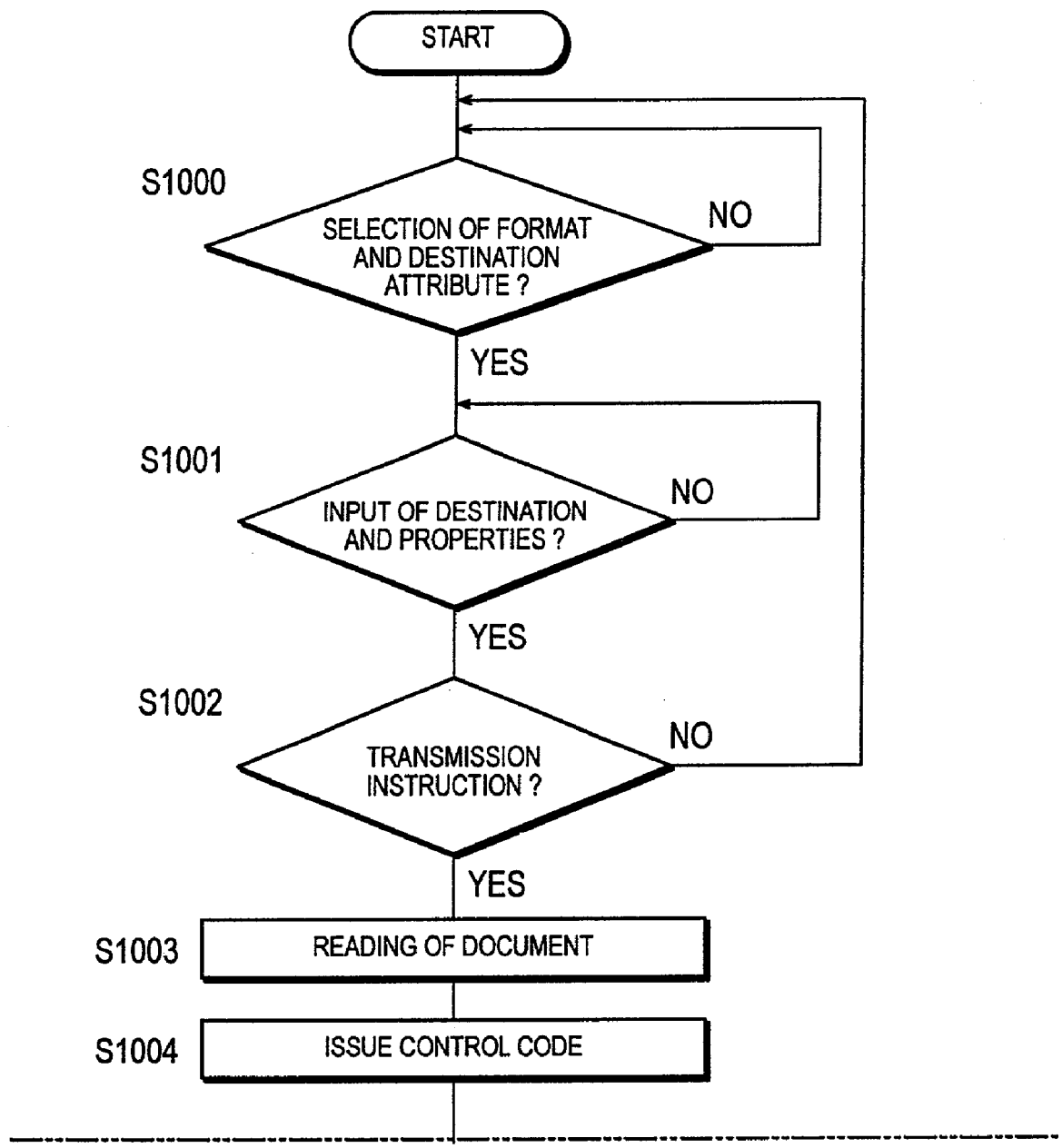
FIG. 46A and FIG. 46B are flowcharts of multicasting process of a data communication apparatus according to the third embodiment of the present invention.
Figure 46B:
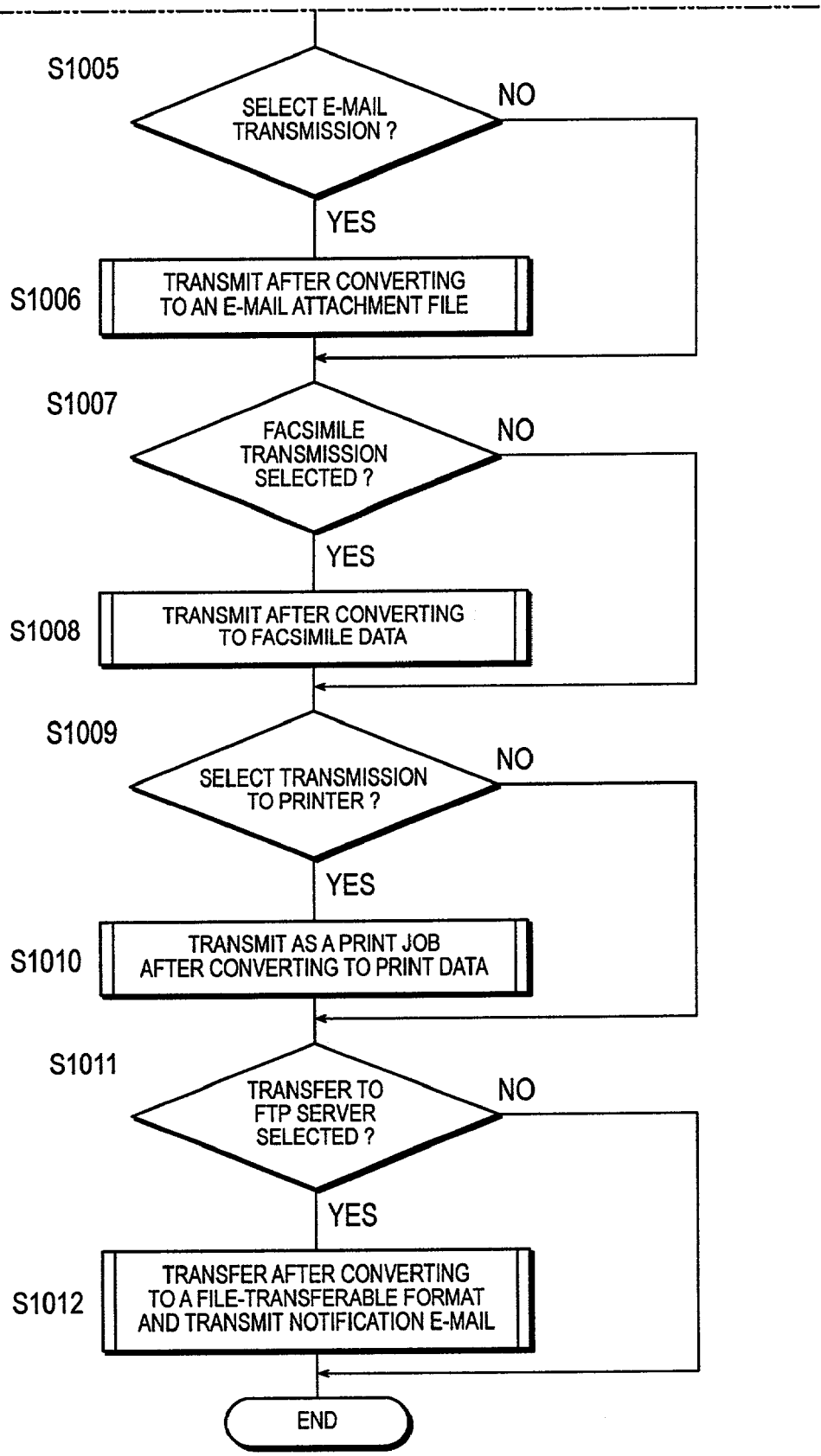

FIG. 46A and FIG. 46B are flowcharts of multicasting process by the data transmission apparatus according to the third embodiment. The algorithm shown in the flowcharts of FIG. 46A and FIG. 46B is stored in the ROM 102 or the storage unit 103 as the control program and is executed by the CPU 101.

The processes of the steps S1000 through S1004, S1005, S1007, S1009 and S1011 are similar to the processes of the steps S100 through S104, S106, S108, S110 and S112, so that their descriptions are omitted.

The contents of the steps S1006, S1008, S1010, and S1012 are different from those in the second embodiment.

Figure 47:
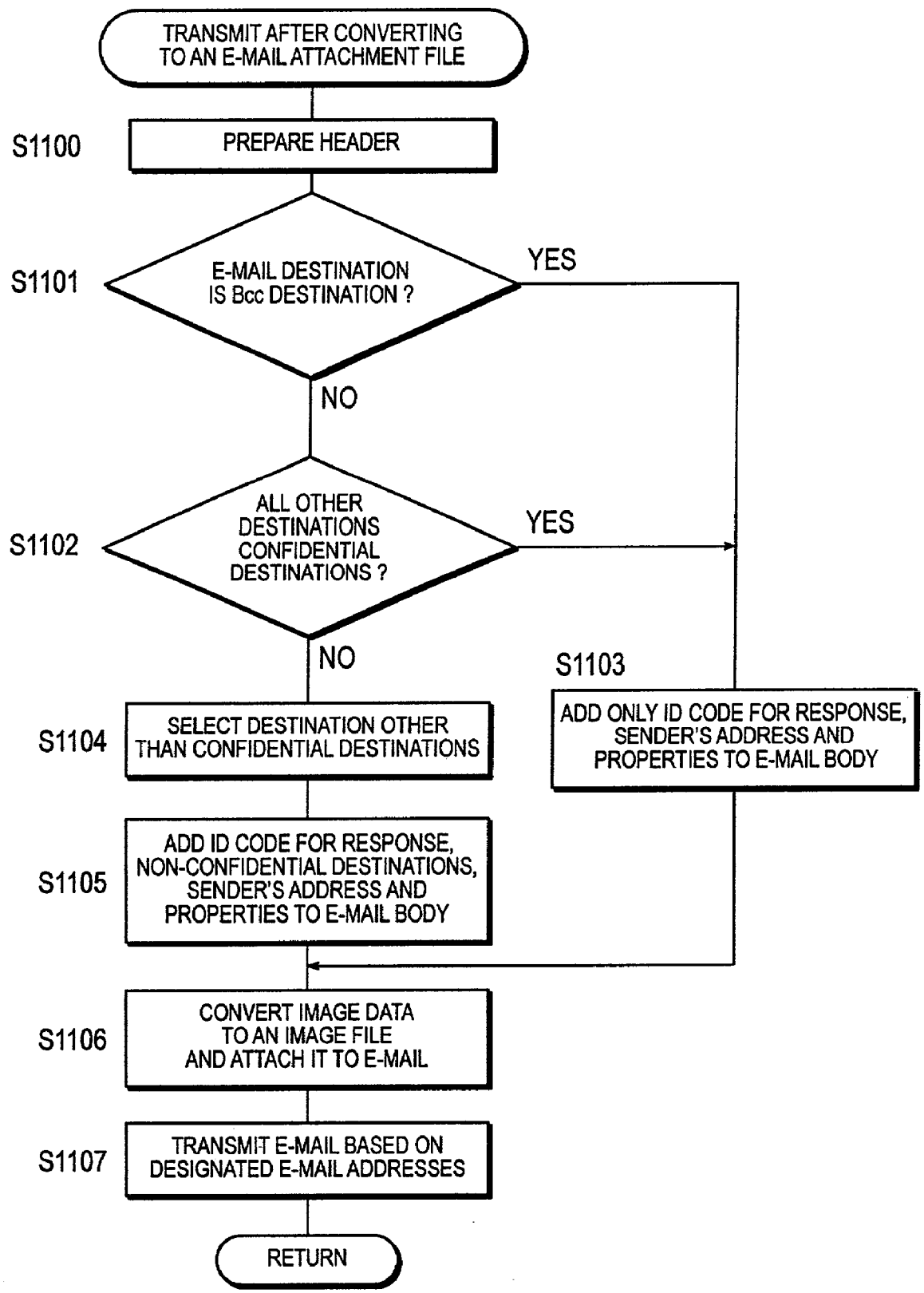
FIG. 47 is a flowchart of "transmit after converting to e-mail attachable format" process of the step S1006 in FIG. 46B.

FIG. 47 is a flowchart of "transmit after converting to e-mail attachable format" process of the step S1006 in FIG. 46B.

In the step S1100, the e-mail header is prepared.

In the step S1101, a judgment is made whether the destination of the e-mail is a Bcc destination. If it is judged that the destination of the e-mail is not a Bcc destination (step S1101: NO), the process of the step S1102 is executed; if the destination of the e-mail is a Bcc destination, (step S1101: YES), the process of the step S1103 is executed.

In the step S1102, a judgment is made whether all the destinations other than the destination of the e-mail are confidential destinations. If all the other destinations are confidential (step S1102: YES), the process of the step S1103 is executed. If, on the other hand, the other destinations include at least one destination other than the confidential address (step S1102: NO), the process of the step S1104 is executed.

In the step S1103, the identification code for the response as well as the sender's destination and properties are added to the e-mail body. None of the other destinations is added to the e-mail body. The identification code for the response is the code identified by the data communication apparatus 100 when the response is instructed to the data communication apparatus 100, and may consist of the control code itself or the control code added with other symbols. The identification code for response can be used as the password as well. In the third embodiment, the portion made up of a combination of the control code and the dotted line is used as the identification code for the response.

In the step S1104, all the destinations except the confidential destinations are selected.

In the step S1105, the identification code for the response and the sender's destination and properties, as well as all the destinations and properties selected in the step S1104 are added to the e-mail body.

The processes of the step S1106 and the step S1107 are similar to those of the step S204 and the step S205 shown in FIG. 26, so that their descriptions are omitted.

In the process related to the preparation and transmission of the notification e-mail for the file transfer to the FTP server in the step S1012 shown in FIG. 46B, the information concerning the identification code and the destination of the response is added to the notification e-mail body according to the same procedure as shown in FIG. 47.

FIG. 48 shows an example of e-mail addressed to B's e-mail address, which is a "To" destination. FIG. 49 shows an example of e-mail addressed to C's e-mail address, which is a "Cc" destination. FIG. 50 shows an example of e-mail addressed to D's e-mail address, which is a "Bcc" destination.

In the examples shown in FIG. 48, FIG. 49 and FIG. 50, the combination of the control code and the dotted line function as the identification code. In each case shown in FIG. 48 and FIG. 49, the destination of the e-mail is not a Bcc destination. Therefore, the destinations that are not confidential and the properties of the image data transmitted to each destination are added to the e-mail body by means of the process shown in the flowchart of FIG. 47. In reality, the confidential print destination and the e-mail Bcc destination exist in other destinations, but these destinations are not added to the e-mail body. Moreover, the e-mail address of the sender A, is added as the To address.

On the other hand, the destination of the e-mail is a Bcc destination in the case shown in FIG. 50. Therefore, only the e-mail address of A, the sender, and the properties of the image data to be transmitted to A are to be added to the e-mail body. With such a process, it can prevent the possibility of unintentionally disclosing the existence of the Bcc destination widely by accidentally transmitting the response data to other destinations.

Figure 51:
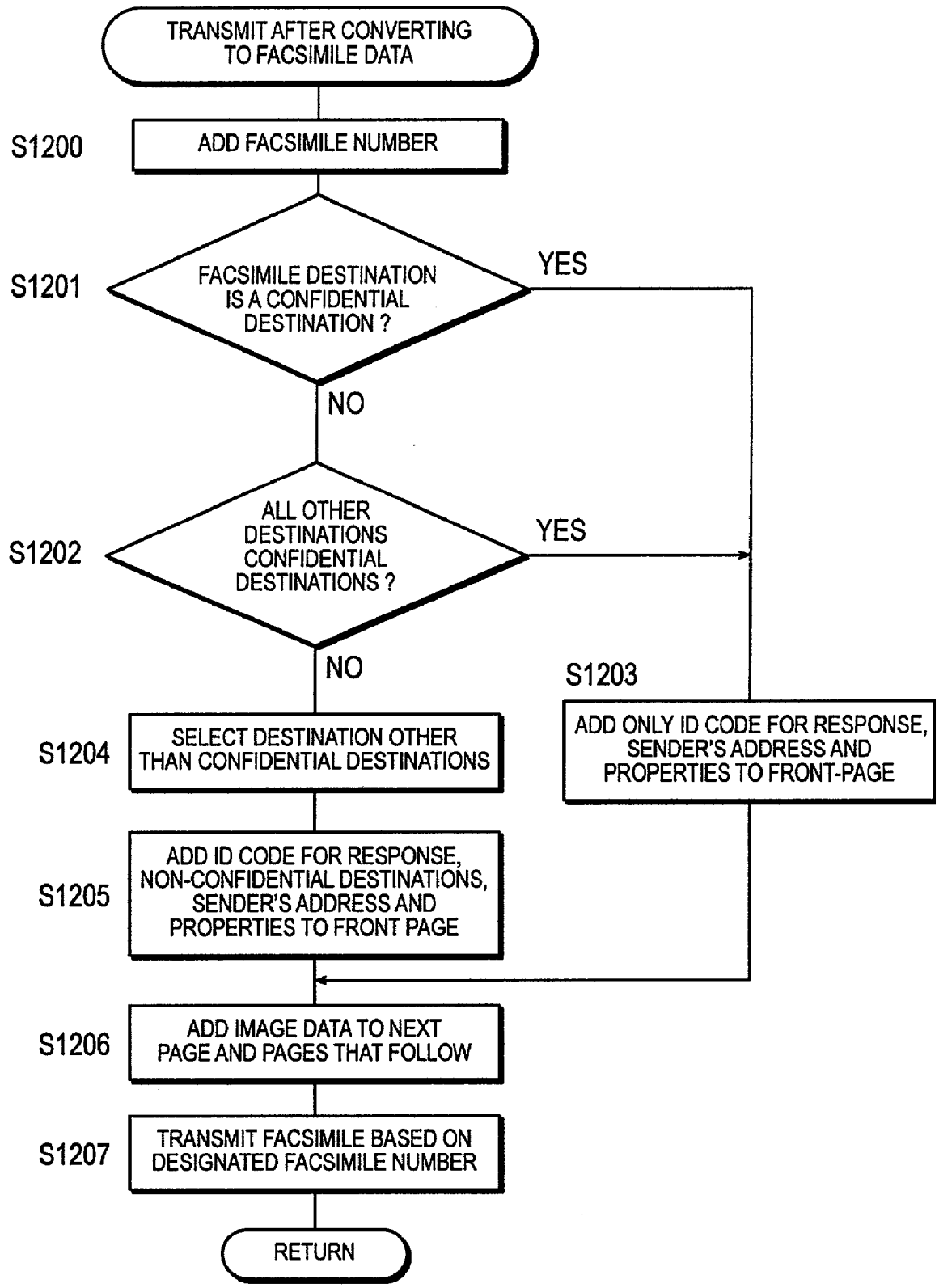
FIG. 51 is a flowchart of "transmit after converting to facsimile data" process of the step S1008 in FIG. 46B.

FIG. 51 is a flowchart of "transmit after converting to facsimile data" process of the step S1008 shown in FIG. 46B.

In the step S1200, the facsimile number of the data communication apparatus 100, which is the transmission source of the facsimile data, and the facsimile number of the destination are added to the facsimile data.

In the step S1201, a judgment is made as to whether the facsimile destination is a confidential destination. If the facsimile destination is not a confidential destination (step S1201: NO), the process of the step S1202 is executed; if the facsimile destination is a confidential destination (step S1201: YES) the process of the step S1203 is executed.

In the step S1202, a judgment is made as to whether all destinations other than the facsimile destination are confidential. If all other destinations are confidential (step S1202: YES), the process of the step S1203 is executed. On the other hand, if there is at least one non-confidential destination among the other destinations (step S1202: NO), the process of the step S1204 is executed.

In the step S1203, a page containing the identification code for the response, the destination of the sender, and the properties is prepared as the front-page separate from the pages of response data.

In the step S1204, all destinations other than confidential destinations are selected.

In the step S1205, all the destinations selected in the step S1204 and their properties are added to the front-page in addition to the identification code for the response, the destination of the sender, and the properties.

In the step S1206, the image data is added as the facsimile data to the next page and the pages thereafter.

In the step S1207, a facsimile data containing the page with the information concerning the identification code for the response, etc., and the image data page are transmitted.

The process of preparing the print data and transmission in the step S101 shown in FIG. 46B also prepares an independent front-page containing the information concerning the identification code and destination for the response similar to the process shown in FIG. 51.

FIG. 52 shows an example of the facsimile data to be transmitted. FIG. 53 shows an example of the print data to be transmitted.

In the examples shown in FIG. 52 and FIG. 53, the combination of the control code and dotted line function as the identification code. The destination is not a confidential destination in case of the example shown in FIG. 52. As a result, a page containing the non-confidential addresses and the properties of the image data transmitted to each destination is prepared as the front-page through the process shown in the flowchart of FIG. 51.

Although, in reality, the other addresses contain confidential printing destinations and e-mail Bcc destinations, these confidential destinations are not added to the front-page. Also, the e-mail address of the sender A, is added as the To destination. On the other hand, as the confidential print is instructed in FIG. 53, the destination is a confidential destination. Therefore, only the e-mail address of the sender A, and the properties of the image data transmitted to this e-mail address are added to the front-page.

Furthermore, as shown in FIG. 52 and FIG. 53, a check mark area for adding response destinations is provided for the recipients of the multicasted image data to instruct the response, and a note area for instructing the properties of the response data to be transmitted to each response destination are provided.

As can be seen from the above, in the multicasting process of the third embodiment, the contents similar to the display data in the second embodiment are added, in addition to the identification code for the response, to the e-mail and facsimile data.

The multicasting response process in the third embodiment will be described below.

Figure 54:
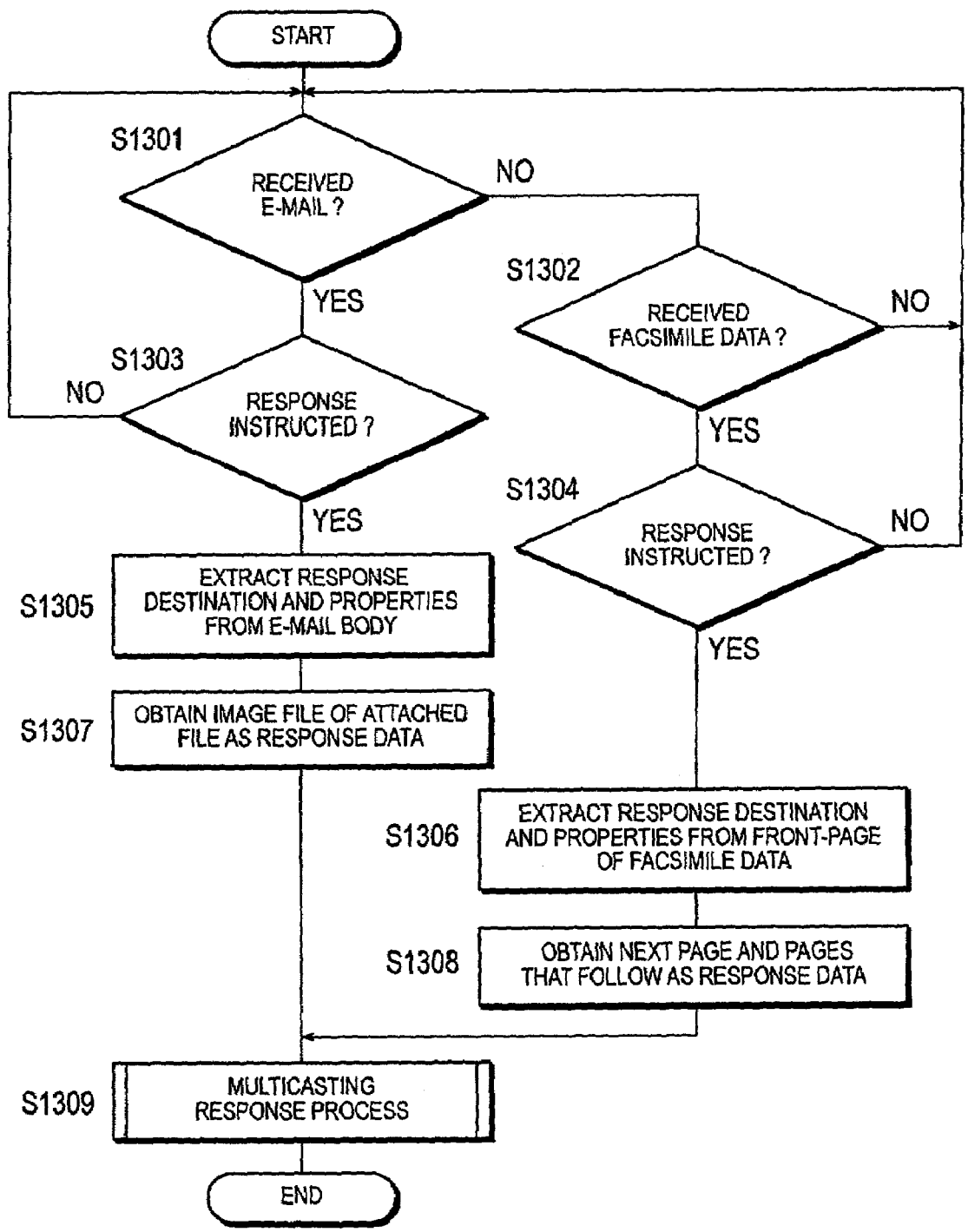
FIG. 54 is a flowchart of a multicasting response process of the data communication apparatus according to the third embodiment.

FIG. 54 is a flowchart of the multicasting response process of the data communication apparatus according to the third embodiment. The algorithm shown in the flowchart of FIG. 54 is stored in the storage unit 103 or in the ROM 102 as a control program and is executed by the CPU 101.

In the step S1301, a judgment is made as to whether the e-mail is received. If the e-mail is not received (step S1301: NO), the process of the step S1302; if the e-mail is received (step S1301: YES), the step S1303 is executed.

In the step S1302, a judgment is made as to whether the facsimile data is received. If the facsimile data is received (step S1302: YES), the process of the step S1304 is executed; if the facsimile data is not received (step S1302: NO), the control returns to the process of the step S1301. The process of the step S1301 and the process of the step S1302 can be executed simultaneously, or the processing order can be reversed.

Next, the process to be executed when e-mail is received will be described below.

In the steps S1303, a judgment is made whether the response for the multicasted image data is received as a process to be executed after e-mail is received. If the response is instructed (step S1303: YES), the process of the step S1305 is executed; if the response is instructed (step S1303: NO), the control returns to the process of the step S1301.

FIG. 55 shows an example of e-mail for instructing responses. More specifically, FIG. 55 shows an e-mail transmitted from the e-mail address of B, which is a To destination of a multicasted e-mail.

The e-mail is transmitted from the computer 200 to the data communication apparatus 100 as a response mail for the e-mail shown in FIG. 48. More specifically, the e-mail shown in FIG. 55 is prepared by deleting the portion ahead of the dotted line of the e-mail body shown in FIG. 48 using the document editing program (editor) or the editor function of the e-mail preparation program on the computer 200, and transmitted. The e-mail shown in FIG. 55 can also be prepared by copying the portion after the dotted line to another e-mail body.

The response data for the multicasted e-mail is attached as an image file to the response mail. Therefore, in case of the example shown in FIG. 55, the data communication apparatus 100 obtains via e-mail the response data, the instruction of the response destination, and the instruction of the properties for the response data being transmitted.

When the e-mail shown in FIG. 55 is received by the data communication apparatus 100, the identification code (the combination of the dotted line and the control code in this case) in the e-mail body is character-recognized. Therefore, it is judged that the response is instructed in the step S1303 when the existence of the identification code, i.e., the combination of the dotted line and the control code, is recognized in the e-mail body. Since the character recognition can be performed with the known character code retrieval algorithm, its detailed description is omitted.

In the step S1305, the instruction for response destinations of the response data and the instruction of the response data properties are extracted from the e-mail body. The process of the step S1305 can be executed with the known character code retrieval algorithm.

Moreover, in the step S1307, the image file attached to the e-mail is obtained as the response data.

Next, the process to be executed when the facsimile data is received will be described below.

In the step S1304, a judgment is made whether a response to the multicasted image data is instructed as a process after a facsimile data is received. If a response is instructed (step S1304: YES), the process of the step S1306 is executed; if no response is instructed (step S1304: NO), the control returns to the step S1301.

FIG. 56 shows an example of facsimile data when response instructions are designated. The facsimile data shown in FIG. 56 is prepared by the facsimile machine 600 as shown below.

First, as shown in FIG. 52, the user enters a check mark by hand writing in the check mark area of the desired response destination on the page with the identification code printed out by the printing unit 605 of the facsimile machine 600. Further, if the user wants to add response destinations, the user enters the attribute of the desired destinations, the destinations (e-mail addresses, etc.) and the properties of the image data by hand writing. The sheet of paper where the check marks and the information about the added response destinations are entered by hand writing is prepared as the front-page and the documents for the response data are prepared as the following pages.

The facsimile data is prepared by reading these documents with the reading unit 605 shown in FIG. 56. Therefore, in the example shown in FIG. 56, the data communication apparatus 100 receives the response data, the response destination instructions and the instructions for the properties of the response data to be transmitted as facsimile data.

When the data communication apparatus 100 receives the facsimile data shown in FIG. 56, the identification code shown in the front-page (a combination of the dotted line and the control code) is character-recognized. Thus, it is judged in the step S1304 that the response is instructed if the identification code on the front-page of the facsimile data is recognized. Since the character recognition can be performed with the known character recognition program (OCR program), its detailed description is omitted.

In the step S1306, the response destination instructions and the instructions for the response data properties are extracted from the front-page. More specifically, the response destination instructions are extracted by recognizing the check marks entered into the check mark area by hand writing. When the response data properties are instructed by hand writing, the contents are extracted. For example, in the case of FIG. 56 described above, the response data addressed to the e-mail address of C, which is a Cc destination, is transmitted as a 300 dpi color image under the normal setting, but it can be transmitted as a 400 dpi monochromatic image by changing the setting by handwriting. It is of course possible to add completely new response destinations other than the default response destinations.

In the step S1308, the facsimile data of the next page and the following pages are obtained as the response data. If the response data is obtained in the step S1307 and the step S1308, the process of the step S1309 will be executed.

In the step S1309, the response data format is converted based on the properties designated for each response destination. More specifically, the response data is converted into a format that suits the communication system corresponding to a specific destination as well as to match the resolution and paper size designated for printing. The converted response data are multicasted to the designated response destinations. Since the process of the step S1309 is similar to the process contents shown in FIG. 46A and FIG. 46B other than the fact that the response data that is not the image data obtained by reading the document is converted into various formats, its detail description is omitted.

FIG. 57 shows an example of e-mail wherein the response data obtained from a transmission destination, to which the image data was multicasted. Since there is a possibility that the response data may be further responded, a new identification code (a combination of the dotted line and the control code "123-1"), the destination and the properties are added to the e-mail body.

As described above, in both the second embodiment and the third embodiment, even when the data converted into a plurality of formats according to different communication systems are multicasted, a recipient can multicast its response to other recipients of other communication systems.

Moreover, even if in a case of converting an image data obtained by reading a document by a scanner into various formats corresponding to different communication systems and multicasting it, the recipients can multicast responses to other recipients of other communication systems.

It is obvious that this invention is not limited to the particular embodiments shown and described above but may be variously changed and modified without departing from the technical concept of this invention.

For example, although the description of the first embodiment was done using a digital copying machine as an example of the data transmission apparatus, the invention can be applied to facsimile machines and image scanners that have network capabilities. It can also be applied to a system including computers that have network capabilities and image scanners connected thereto by interfaces such as SCSI (Small Computer System Interface) and USB (Universal Serial Bus). In general, the present invention is applicable to any device capable of executing multicasting over a mixture of e-mail and facsimile transmissions.

It is also possible to offer the data transmission program as application software that causes a computer to function as a data transmission apparatus and to offer it by building it into a facsimile or a scanner as a function thereof.

The application software can be offered by being stored on a computer readable storage medium, for example, a flexible disk or a CD-ROM. It is also possible to store the application software into a server, download the application software via a computer network or a telephone network, and install it into a computer.

Moreover, it is possible to activate the application software stored in the server via the computer network from the client computer side and to execute it directly.

It is also possible to form the image file to be multicasted from an image data generated using graphics software, rather than an image data obtained by reading a document. The image data does not have to be limited to something generated by the data transmission apparatus itself, but also can be something that is inputted from the outside via a network, etc.

Moreover, although it was described for the second and third embodiments that the paper size and the resolution can be changed on computers and facsimile machines in printing based on image data and response data, the invention is not limited to such a case.

The image data multicasted by the data communication apparatus 100 can be stored in the storage unit 103 of the data communication apparatus 100. Therefore, in a case where a response is instructed for a response data generated by adding new data to the originally multicasted image data by means of the computer 200 or the facsimile machine 600, the original data is stored in the storage unit 103 so that there is no need for receiving it from the computer 200 or the facsimile machine 600. Consequentially, it is possible to reduce the amount of data to be transmitted and prevent the increase of network traffic.

Further, although a process of recognizing the identification code from the front-page of the facsimile data as an example of the process of instructing a response to the data communication apparatus 100 from the facsimile machine 600 in the third embodiment, the invention is not limited to it. For example, a response can be instructed by adding a specific extension number to the facsimile number itself.

Furthermore, although it was described for the second and third embodiments that a response data can be transmitted as an image file attached to an e-mail, the invention is not limited to it. For example, the response data itself can be written onto the e-mail body.

Moreover, although a case was described wherein the data transmission apparatus 100 multicasts an image data obtained by reading a document and then the response data to the multicasted image data is distributed, the invention is not limited to such a case. For example, the data communication apparatus 100 does not have to have a reading unit. The invention can be applied to the above mentioned process when a data communication apparatus 100 without a reading unit multicasts a data stored in the storage unit and then further distributes the response data to the multicasted image data. The above process of the invention can be applied for exchanging only the body portion of the e-mail.

Various means of controlling the data communication system and apparatus, and the data communication method according to the second and third embodiments can be realized by a computer where the program is installed or a dedicated hardware circuit.

The program for operating the computer can be offered by means of a computer readable storage medium, for example, a flexible disk or a CD-ROM, or via a network. The program is normally transferred to and stored in the hard disk. The program can be offered as an independent application software or by building into the software of the computer as a function of the computer.

What is claimed is:

1. A data communication apparatus comprising:
a transmission means for multicasting specific data to a plurality of destinations corresponding to different communication system;
a receiving means for receiving response data transmitted by some of the destinations in response to the multicasted specific data;
a response data transmission means for multicasting the response data to response destinations that include some of or all of the destinations to which the specific data was multicasted by said transmission means; and
a conversion means for conveying the specific data and the response data to data of a plurality of kinds of formats corresponding to communication systems to which the destinations and the response destinations respectively correspond.

2. A data communication apparatus as claimed in claim 1, further comprising a storage means for storing destinations to which each data is multicasted by said transmission means, wherein said response data transmission means multicasts each response data based on the destinations stored in said storage means.

3. A data communication apparatus as claimed in claim 2, wherein said storage means stores at least one of e-mail addresses, facsimile numbers and IP addresses of a plurality of destinations to which each data is multicasted by said transmission means.

4. A data communication apparatus as claimed in claim 1, further comprising a reading means for obtaining image data by reading documents, wherein said specific data to be multicasted includes image data obtained by said reading means.

5. A data communication apparatus as claimed in claim 1, wherein said transmission means multicasts the specific data, which have been converted into a plurality of kinds of formats by said conversion means, after adding information for instructing a response to said data communication apparatus.

6. A data communication apparatus as claimed in claim 1, wherein said conversion means converts the specific data and the response data into a format for e-mail transmission and a format for facsimile transmission.

7. A data communication apparatus as claimed in claim 1, wherein said conversion means converts the specific data and the response data into a format for e-mail transmission and a format for file transfer.

8. A data communication apparatus as claimed in claim 1, wherein said conversion means converts the specific data and the response data into a format for e-mail transmission and a format for print job transmission.

9. A data communication apparatus as claimed in claim 1, wherein said receiving means receives the response data via e-mail.

10. A data communication apparatus as claimed in claim 1, wherein said receiving means receives the response data as facsimile data.

11. A data communication apparatus as claimed in claim 1, wherein said receiving means receives a response destination instruction from some of the destinations, and said response data transmission means multicasts the response data according to the response destination instruction received by said receiving means.

12. A data communication apparatus as claimed in claim 11, wherein said receiving means receives the response destination instruction via e-mail.

13. A data communication apparatus as claimed in claim 11, wherein said receiving means receives the response destination instruction as facsimile data.

14. A data communication apparatus as claimed in claim 13, further comprising a first extraction means for extracting the response destination instruction from the received facsimile data.

15. A data communication apparatus as claimed in claim 1, wherein said receiving means further receives an instruction about properties of the response data from some of the destinations, and said conversion means converts the response data into data having the instructed properties.

16. A data communication apparatus as claimed in claim 15, wherein said receiving means receives the instruction about properties via e-mail.

17. A data communication apparatus as claimed in claim 15, wherein said receiving means receives the instruction about properties as facsimile data.

18. A data communication apparatus as claimed in claim 17, further comprising a second extraction means for extracting the instruction about properties from the received facsimile data.

19. A data transmission apparatus with a first transmission means for transmitting data via Internet and a second transmission means for transmitting data using facsimile protocol via telephone line, said data transmission apparatus comprising:
   a first destination setting means for setting a first destination related to said first transmission means;
   a second destination setting means for setting a second destination related to said second transmission means;
   a multicasting means for multicasting data to the first destination and the second destination using said first transmission means and said second transmission means; and
   a destination adding means for adding second destination information to data being transmitted to the first destination, and adding first destination information to data being transmitted to the second destination when multicasting transmission is executed using said first transmission means and said second transmission means.

20. A data communication system comprising:
   a plurality of kinds of equipment corresponding to different communication systems; and
   a data communication apparatus for multicasting specific data to said equipment, wherein said data communication apparatus comprises a transmission means for multicasting the specific data to said equipment, a receiving means for receiving response data transmitted by some of said equipment in response to the multicasted specific data, a response data transmission means for multicasting the response data to response destinations that include some of or all of said equipment, and a conversion means for converting the specific data and the response data to data of a plurality of kinds of formats corresponding to communication systems to which said equipment correspond, and
   each of said equipment comprises a multicasting transmission data receiving means for receiving the specific data multicasted by said transmission means of said data communication apparatus, and an equipment response data transmission means for transmitting the response data corresponding to the multicasted specific data to said data communication apparatus.

21. A data communication method comprising the steps of:
   converting a specific data into data of a plurality of kinds of formats used by data communication systems corresponding to a plurality of destinations to which the specific data is multicasted;
   multicasting the specific data converted into the plurality of kinds of formats to the destinations;
   receiving response data transmitted from some of the destinations in response to the multicasted specific data;
   converting the response data into data of a plurality of kinds of formats corresponding to communication systems to which response destinations including some of or all of the destinations correspond; and
   multicasting the response data converted into data of a plurality of kinds of formats to a plurality of response destinations.

22. A control program stored on a computer readable medium for causing a computer to execute process of the steps of:
   multicasting specific data to a plurality of destinations corresponding to different communication systems;
   receiving response data transmitted from some of the destinations in response to the multicasted specific data;
   multicasting the response data to response destinations including some of or all of the destinations to which the specific data was multicasted in said step of multicasting specific data; and
   converting the specific data and the response data to data of a plurality of kinds of formats corresponding to communication systems to which the destinations and the response destinations correspond.

23. A control program as claimed in claim 22, wherein said process further comprises a step of storing destinations of each data multicasted in said step of multicasting specific data, wherein in said step of multicasting the response data each response data is multicasted based on destinations stored in said step of storing destinations.

24. A control program as claimed in claim 23, wherein at least one item of e-mail addresses, facsimile numbers, and IP addresses of the plurality of destinations for each data multicasted in said step of multicasting specific data is stored in said step of storing destinations.

25. A control program as claimed in claim 22, wherein said process further comprises a step of obtaining image data by reading documents, wherein said specific data to be multicasted includes image data obtained in said step of obtaining image data.

26. A control program as claimed in claim 22, wherein said specific data, which have been converted into a plurality of kinds of formats in said step of converting the specific data and the response data, are multicasted after being added with information for instructing a response to the data communication apparatus in said step of multicasting specific data.

27. A control program as claimed in claim 22, wherein said specific data and said response data are converted into a format for e-mail transmission and a format for facsimile transmission in said step of converting the specific data and the response data.

28. A control program as claimed in claim 22, wherein said specific data and said response data are converted into a format for e-mail transmission and a format for file transfer in said step of converting the specific data and the response data.

29. A control program as claimed in claim 22, wherein said specific data and said response data are converted into a format for e-mail transmission and a format for transmission as a print job in said step of converting the specific data and the response data.

30. A control program as claimed in claim 22, wherein said response data are received via e-mail in said step of receiving response data.

31. A control program as claimed in claim 22, wherein said response data are received as facsimile data in said step of receiving response data.

32. A control program as claimed in claim 22, wherein a response destination instruction is further received from some of the destinations in said step of receiving response data, and the response data are, in said step of multicasting the response data, multicasted according to the response destination instruction received in said step of receiving response data.

33. A control program as claimed in claim 32, wherein said response destination instruction is received via e-mail in said step of receiving response data.

34. A control program as claimed in claim 32, wherein said response destination instruction is received as facsimile data in said step of receiving response data.

35. A control program as claimed in claim 34, wherein said process further comprises a step of extracting the response destination instruction from the received facsimile data.

36. A control program as claimed in claim 22, wherein an instruction about properties of the response data are further received from some of the destinations in said step of receiving response data, and the response data are converted into data having the instructed properties in said step of converting the specific data and the response data.

37. A control program as claimed in claim 36, wherein said instruction about properties is received via e-mail in said step of receiving response data.

38. A control program as claimed in claim 36, wherein said instruction about properties is received as facsimile data in said step of receiving response data.

39. A control program as claimed in claim 38, wherein said process further comprises a step of extracting the instruction about properties from the received facsimile data.

40. A data transmission apparatus comprising:
a first transmission unit which transmits data via Internet;
a second transmission unit which transmits data using facsimile protocol via a telephone line;
a user interface from which a user sets a first destination and a second destination for multicasting, wherein said first transmission unit and said second transmission unit are respectively used for the first destination and the second destination when multicasting;
a controller which sends data to which information regarding the second destination is added by using said first transmission unit, and sends data to which information on the first destination is added by using said second transmission unit.

41. A data communication apparatus comprising:
a transmission unit which multicasts specific data to a plurality of destinations corresponding to different communication systems;
a receiving unit which receives response data transmitted by some of the destinations in response to the multicasted specific data;
a response data transmission unit which multicasts the response data to response destinations that include some of or all of the destinations to which the specific data was multicasted by said transmission unit; and
a conversion unit for converting the specific data and the response data to data of a plurality of kinds of formats corresponding to communication systems to which the destinations and the response destinations respectively correspond.

42. A data communication apparatus as claimed in claim 41, further comprising a storage unit which stores destinations to which each data is multicasted by said transmission unit, wherein said response data transmission unit multicasts each response data based on the destinations stored in said storage unit.

43. A data communication apparatus as claimed in claim 42, wherein said storage unit stores at least one of e-mail addresses, facsimile numbers and IP addresses of a plurality of destinations to which each data is multicasted by said transmission unit.

44. A data communication apparatus as claimed in claim 41, further comprising a reading unit for obtaining image data by reading documents, wherein said specific data to be multicasted includes image data obtained by said reading unit.

45. A data communication apparatus as claimed in claim 41, wherein said transmission unit multicasts the specific data, which have b4en converted into a plurality of kinds of formats by said conversion unit, after adding information for instructing a response to said data communication apparatus.

46. A data communication apparatus as claimed in claim 41, wherein said conversion unit converts the specific data and the response data into a format for e-mail transmission and a format for facsimile transmission.

47. A data communication apparatus as claimed in claim 41, wherein said conversion unit converts the specific data and the response data into a format for e-mail transmission and a format for file transfer.

48. A data communication apparatus as claimed in claim 41, wherein said conversion unit converts the specific data and the response data into a format for e-mail transmission and a format for print job transmission.

49. A data communication apparatus as claimed in claim 41, wherein said receiving unit receives the response data via e-mail.

50. A data communication apparatus as claimed in claim 41, wherein said receiving unit receives the response data as facsimile data.

51. A data communication apparatus as claimed in claim 41, wherein said receiving unit receives a response destination instruction from some of the destinations, and said response data transmission unit multicasts the response data according to the response destination instruction received by said receiving unit.

52. A data communication apparatus as claimed in claim 51, wherein said receiving unit receives the response destination instruction via e-mail.

53. A data communication apparatus as claimed in claim 51, wherein said receiving unit receives the response destination instruction as facsimile data.

54. A data communication apparatus as claimed in claim 53, further comprising a first extraction unit which extracts the response destination instruction from the received facsimile data.

55. A data communication apparatus as claimed in claim 41, wherein said receiving unit further receives an instruction about properties of the response data from some of the destinations, and said conversion unit converts the response data into data having the instructed properties.

56. A data communication apparatus as claimed in claim 55, wherein said receiving unit receives the instruction about properties via e-mail.

57. A data communication apparatus as claimed in claim 55, wherein said receiving unit receives the instruction about properties as facsimile data.

58. A data communication apparatus as claimed in claim 57, further comprising a second extraction unit for extracting the instruction about properties from the received facsimile data.

59. A data communication apparatus as claimed in claim 41, wherein said data communication apparatus comprises a controller which executes a computer program to function at least a part of said transmission unit, said receiving unit, said response data transmission unit, and said conversion unit.

60. A data communication system comprising:
a plurality of kinds of equipment corresponding to different communication systems; and
a data communication apparatus for multicasting specific data to said equipment, wherein said data communication apparatus comprises a transmission unit which multicasts the specific data to said equipment, a receiving unit which receives response data transmitted by some of said equipment in response to the multicasted specific data, a response data transmission unit which multicasts the response data to response destinations that include some of or all of said equipment, and a conversion unit which converts the specific data and the response data to data of a plurality of kinds of formats corresponding to communication systems to which said equipment correspond, and each of said equipment comprises a multicasting transmission data receiving unit which receives the specific data multicasted by said transmission unit of said data communication apparatus, and an equipment response data transmission unit which transmits the response data corresponding to the multicasted specific data to said data communication apparatus.

61. A data communication system as claimed in claim 60, wherein said data communication apparatus comprises a controller which executes a computer program to function at least a part of said transmission unit, said receiving unit, said response data transmission unit, and said conversion unit.

* * * * *